(12) United States Patent
Aizawa et al.

(10) Patent No.: US 12,139,887 B2
(45) Date of Patent: Nov. 12, 2024

(54) WORK MACHINE, INFORMATION PROCESSING APPARATUS, AND INFORMATION PROCESSING METHOD

(71) Applicant: SUMITOMO HEAVY INDUSTRIES, LTD., Tokyo (JP)

(72) Inventors: Susumu Aizawa, Kanagawa (JP); Yoshihisa Kiyota, Kanagawa (JP); Shunsuke Otsuki, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 940 days.

(21) Appl. No.: 17/012,493

(22) Filed: Sep. 4, 2020

(65) Prior Publication Data

US 2020/0399863 A1    Dec. 24, 2020

Related U.S. Application Data

(63) Continuation of application No. PCT/JP2019/009351, filed on Mar. 8, 2019.

(30) Foreign Application Priority Data

Mar. 8, 2018 (JP) ................................. 2018-042232
Mar. 9, 2018 (JP) ................................. 2018-043383
Mar. 9, 2018 (JP) ................................. 2018-043384

(51) Int. Cl.
*E02F 9/26*    (2006.01)

(52) U.S. Cl.
CPC .................... *E02F 9/261* (2013.01)

(58) Field of Classification Search
CPC ....................................................... E02F 9/261
See application file for complete search history.

(56) References Cited

U.S. PATENT DOCUMENTS

| 10,021,303 | B2 * | 7/2018 | Iwaizumi | H04N 7/142 |
| 10,385,542 | B2 * | 8/2019 | Shike | G01B 11/245 |
| 10,685,494 | B2 * | 6/2020 | Coleman | G06T 19/006 |
| 10,848,720 | B2 * | 11/2020 | Zhang | B60R 25/102 |
| 2017/0187957 | A1 | 6/2017 | Iwaizumi | |
| 2017/0198459 | A1 | 7/2017 | Stratton | |

(Continued)

FOREIGN PATENT DOCUMENTS

| JP | H08-319640 | 12/1996 |
| JP | 2002-173004 | 6/2002 |
| JP | 2006-076489 | 3/2006 |

(Continued)

OTHER PUBLICATIONS

International Search Report for PCT/JP2019/009351 mailed on May 7, 2019.

*Primary Examiner* — Michael A Berns
(74) *Attorney, Agent, or Firm* — IPUSA, PLLC

(57) ABSTRACT

A work machine includes a sensor configured to acquire information relating to a status of a surrounding area of the work machine; a transmitting unit configured to transmit, to an external apparatus, the information relating to the status of the surrounding area of the work machine, which may be acquired by the sensor or generated based on the information acquired by the sensor; and an activating unit configured to activate a monitoring unit including at least the sensor and the transmitting unit, while the work machine is stopped.

21 Claims, 33 Drawing Sheets

(56) References Cited

U.S. PATENT DOCUMENTS

2018/0245311 A1  8/2018 Shike et al.
2020/0399863 A1* 12/2020 Aizawa ................. G06Q 50/08

FOREIGN PATENT DOCUMENTS

| | | |
|---|---|---|
| JP | 2008-248657 | 10/2008 |
| JP | 2011-163835 | 8/2011 |
| JP | 2014-181508 | 9/2014 |
| JP | 2015-045144 | 3/2015 |
| JP | 2015-188957 | 11/2015 |
| JP | 2017-076938 | 4/2017 |
| JP | 2017-118306 | 6/2017 |
| JP | 2017-195513 | 10/2017 |
| WO | 2013/111184 | 8/2013 |
| WO | 2017/061518 | 4/2017 |

* cited by examiner

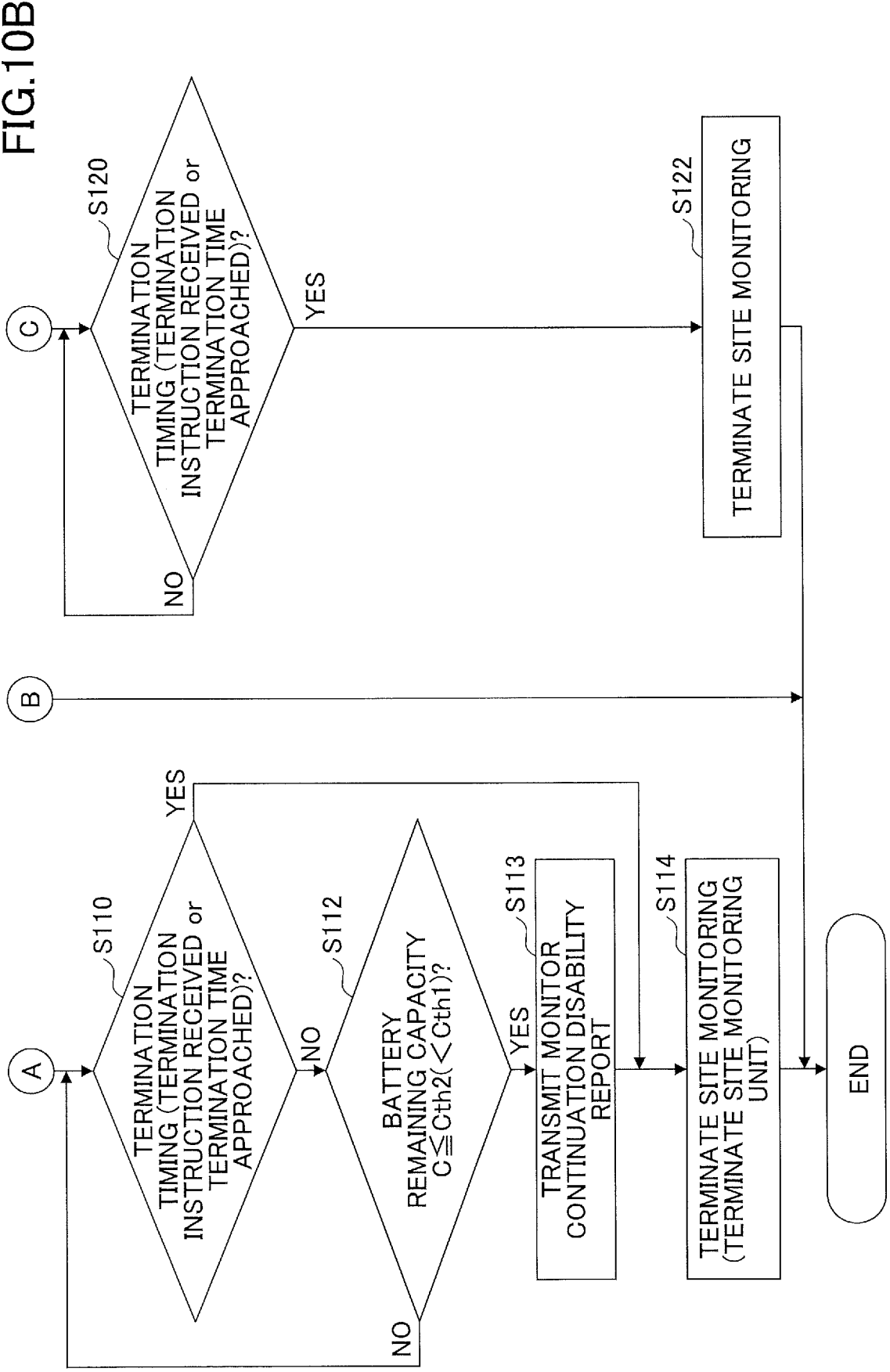

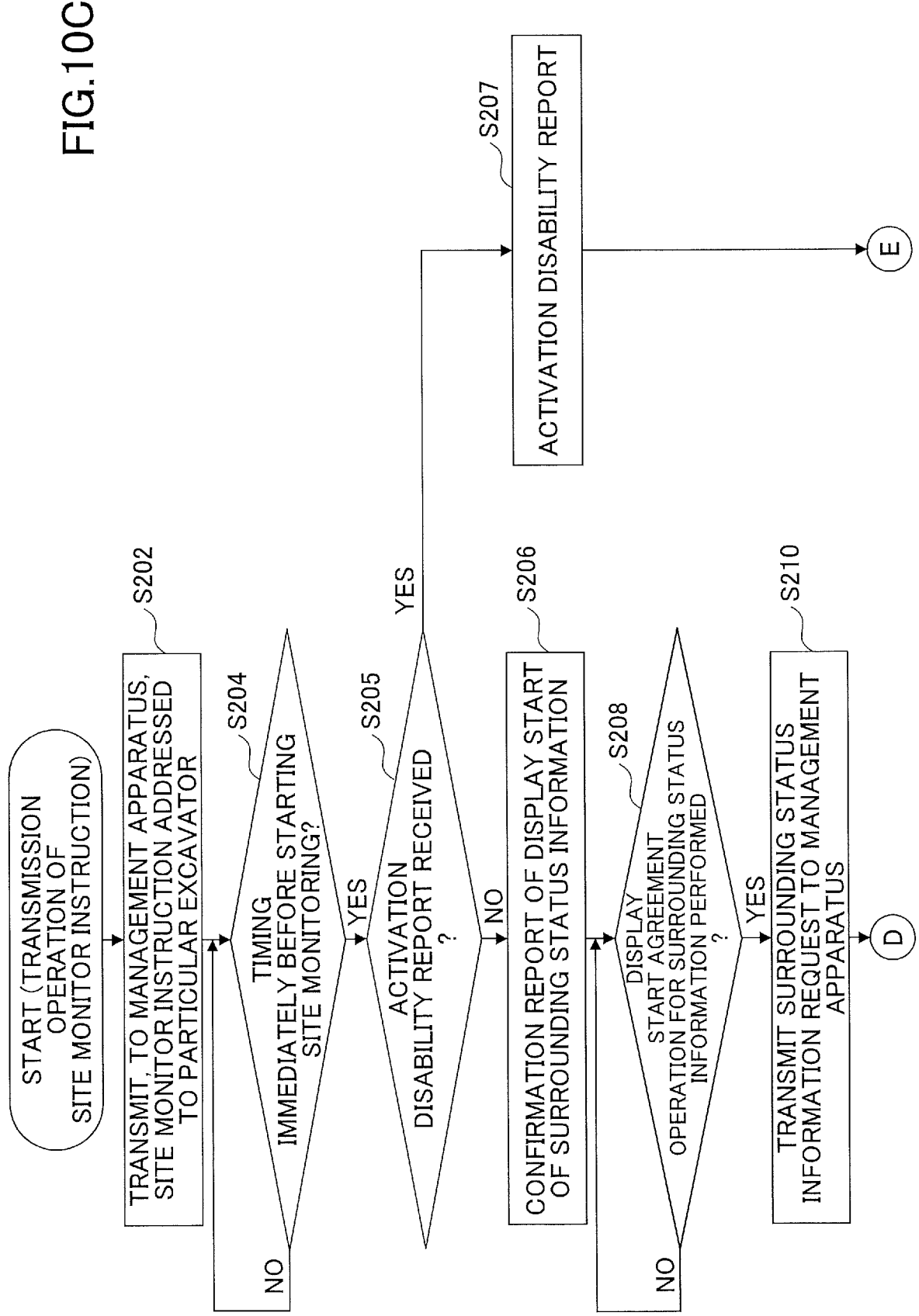

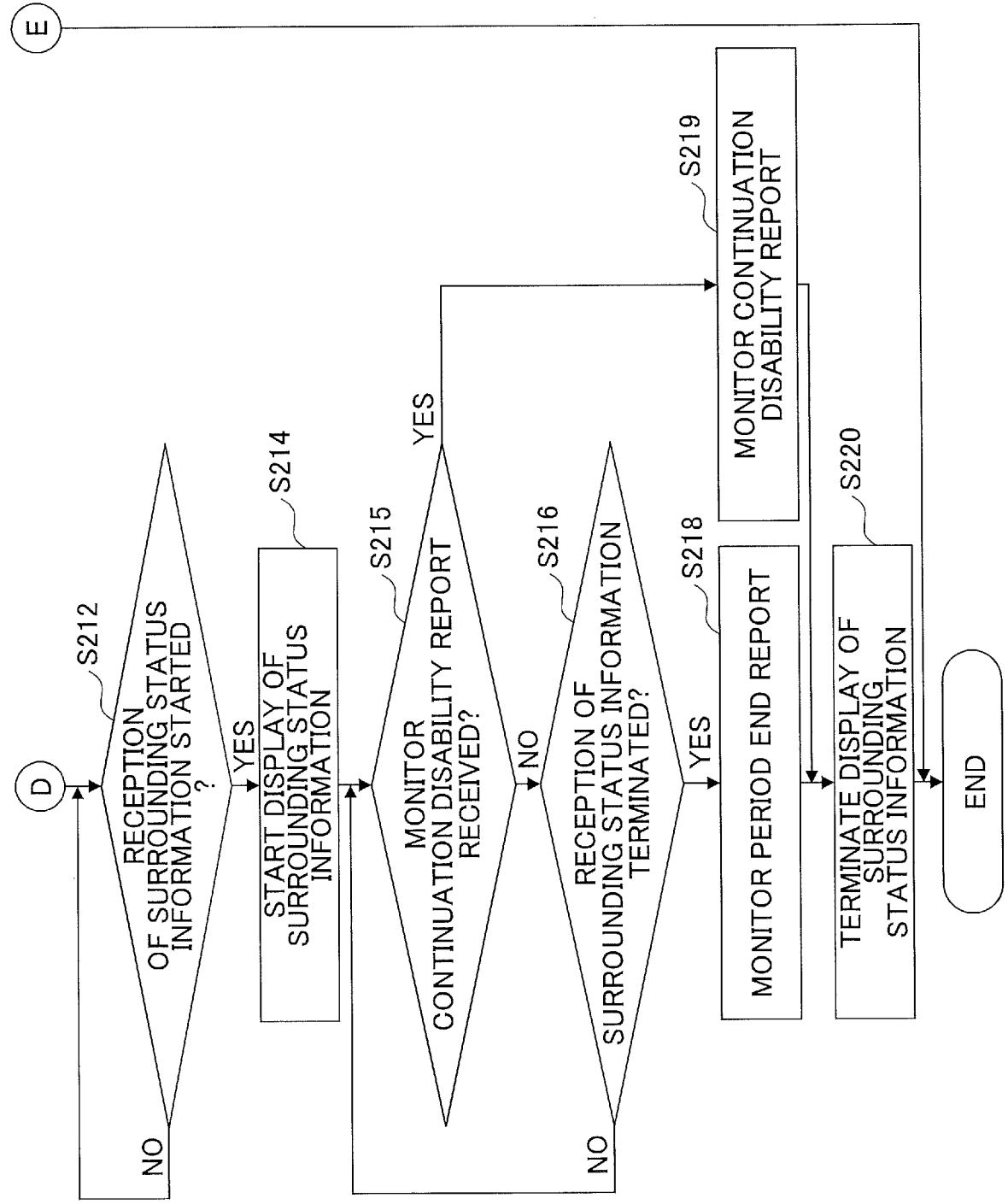

WORK MACHINE, INFORMATION PROCESSING APPARATUS, AND INFORMATION PROCESSING METHOD

RELATED APPLICATION

The present application is a continuation application of International Application No. PCT/JP2019/009351 filed on Mar. 8, 2019, which claims priority to Japanese Patent Application No. 2018-042232, filed on Mar. 8, 2018, Japanese Patent Application No. 2018-043383, filed on Mar. 9, 2018, and Japanese Patent Application No. 2018-043384, filed on Mar. 9, 2018. The contents of these applications are incorporated herein by reference in their entirety.

BACKGROUND

1. Technical Field

The present invention relates to a work machine and the like.

2. Description of the Related Art

A work machine such as an excavator is known.

SUMMARY

According to an embodiment of the present invention, there is provided
a work machine including:
a sensor configured to acquire information relating to a status of a surrounding area of the work machine;
a transmitting unit configured to transmit, to an external apparatus, the information relating to the status of the surrounding area of the work machine, which is acquired by the sensor or generated based on the information acquired by the sensor; and
an activating unit configured to activate a monitoring unit including at least the sensor and the transmitting unit, while the work machine is stopped.

Further, according to another embodiment of the present invention, there is provided
an information processing apparatus capable of communicating with a work machine including a monitoring unit configured to acquire information relating to a status of a surrounding area of the work machine and to transmit the information outside the work machine, the information processing apparatus including:
a transmitting unit configured to transmit, to the work machine, an instruction for requesting the information relating to the status of the surrounding area of the work machine, in response to a predetermined operation from a user;
a first acquiring unit configured to acquire the information relating to the status of the surrounding area of the work machine, transmitted from the work machine in response to the instruction; and
a first reporting unit configured to report, to the user, the information relating to the status of the surrounding area of the work machine acquired by the first acquiring unit.

Further, according to yet another embodiment of the present invention, there is provided
an information processing method executed by an information processing apparatus capable of communicating with a work machine including a monitoring unit configured to acquire information relating to a status of a surrounding area of the work machine and to transmit the information outside the work machine, the information processing method including:
transmitting, to the work machine, an instruction for requesting the information relating to the status of the surrounding area of the work machine, in response to a predetermined operation from a user;
acquiring the information relating to the status of the surrounding area of the work machine, transmitted from the work machine in response to the instruction; and
reporting, to the user, the information relating to the status of the surrounding area of the work machine that has been acquired.

Further, according to yet another embodiment of the present invention, there is provided
a non-transitory computer-readable recording medium storing a program that causes a computer to execute a process performed in a an information processing apparatus, which is capable of communicating with a work machine including a monitoring unit configured to acquire information relating to a status of a surrounding area of the work machine and to transmit the information outside the work machine, the process including:
transmitting, to the work machine, an instruction for requesting the information relating to the status of the surrounding area of the work machine, in response to a predetermined operation from a user;
acquiring the information relating to the status of the surrounding area of the work machine, transmitted from the work machine in response to the instruction; and
reporting, to the user, the information relating to the status of the surrounding area of the work machine that has been acquired.

BRIEF DESCRIPTION OF THE DRAWINGS

FIG. 10B is a flowchart schematically illustrating an example of the operation of a site monitoring system;

FIG. 10C is a flowchart schematically illustrating an example of the operation of a site monitoring system;

FIG. 10D is a flowchart schematically illustrating an example of the operation of a site monitoring system;

DETAILED DESCRIPTION

Workers, supervisors, and the like may wish to confirm the status of the worksite from outside the worksite. For example, when it rains early in the morning on the day of work, workers, supervisors, and the like may want to know whether it is possible to carry out the work on the day. Therefore, it is desirable to acquire information on the status of the worksite by using a work machine and confirm the corresponding information from outside the worksite by workers, supervisors, and the like.

Therefore, it is desirable to provide a work machine, etc., which enables a user, such as a worker, a supervisor, and the like, to confirm the status of the worksite from outside the worksite.

Hereinafter, an embodiment for carrying out the present invention will be described with reference to the drawings.

First Embodiment

First, the first embodiment will be described.

<Outline of Site Monitoring System>

First, a site monitoring system SYS according to the present embodiment will be described with reference to FIG. 1.

Figure 1:
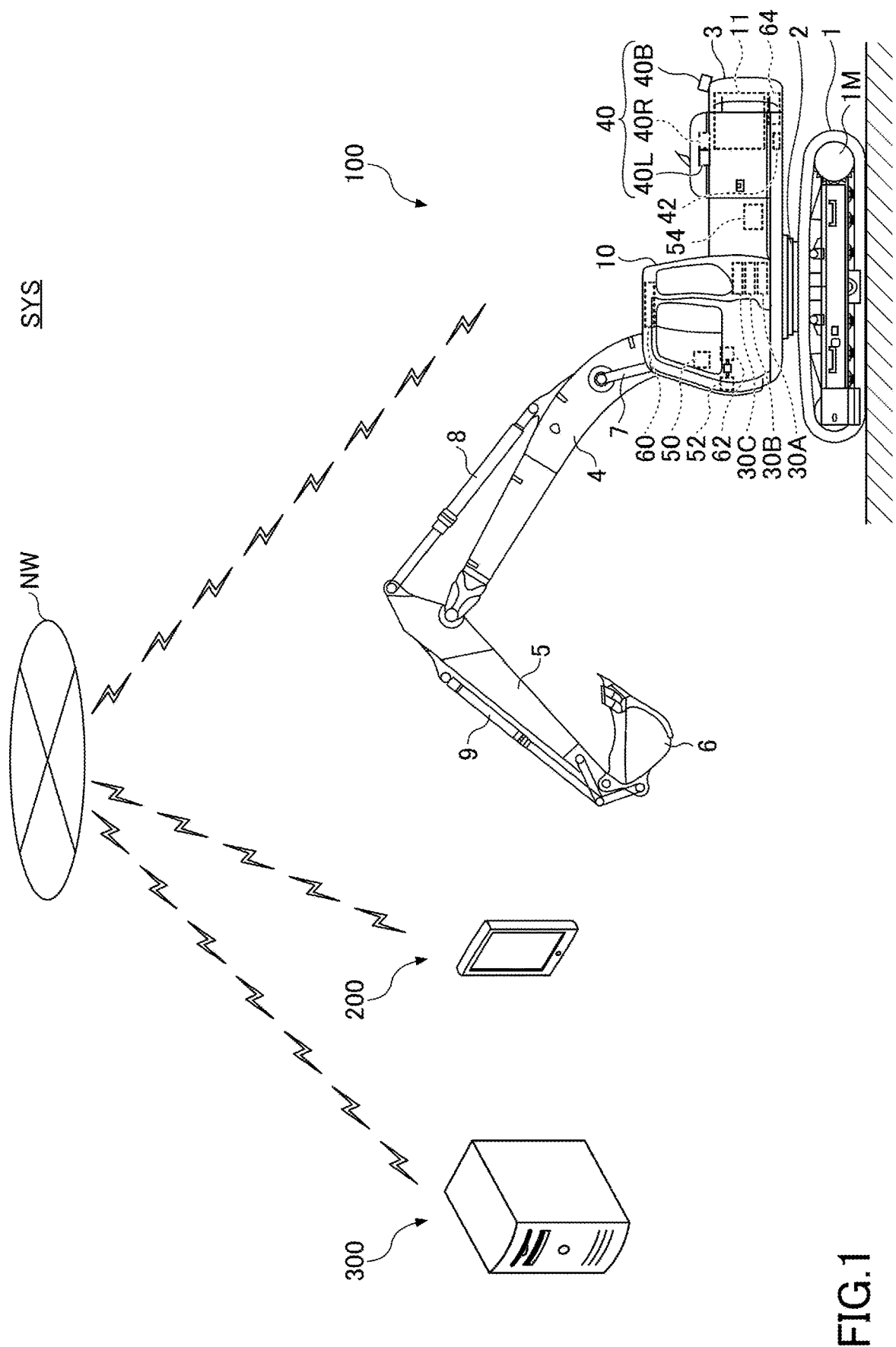
FIG. 1 is a schematic diagram illustrating an example of a site monitoring system.

FIG. 1 is a schematic diagram illustrating an example of a configuration of the site monitoring system SYS.

The site monitoring system SYS includes an excavator 100, a support apparatus 200, and a management apparatus 300, and acquires information about the status of the surroundings of the excavator 100 (hereinafter, "surrounding status information", as a matter of convenience), i.e., information about the status of the worksite where the excavator 100 is to carry out work, and provides the user with the surrounding status information through the support apparatus 200. Accordingly, the user of the support apparatus 200 can confirm the status of the worksite even when the user is outside of the worksite. Hereinafter, the operation of the excavator 100, of acquiring the surrounding status information and transmitting the surrounding status information to the support apparatus 200, is referred to as "site monitoring" as a matter of convenience. There may be one or more of the excavators 100 included in the site monitoring system SYS. Similarly, there may be one or more of the support apparatuses 200 included in the site monitoring system SYS.

Figure 2:
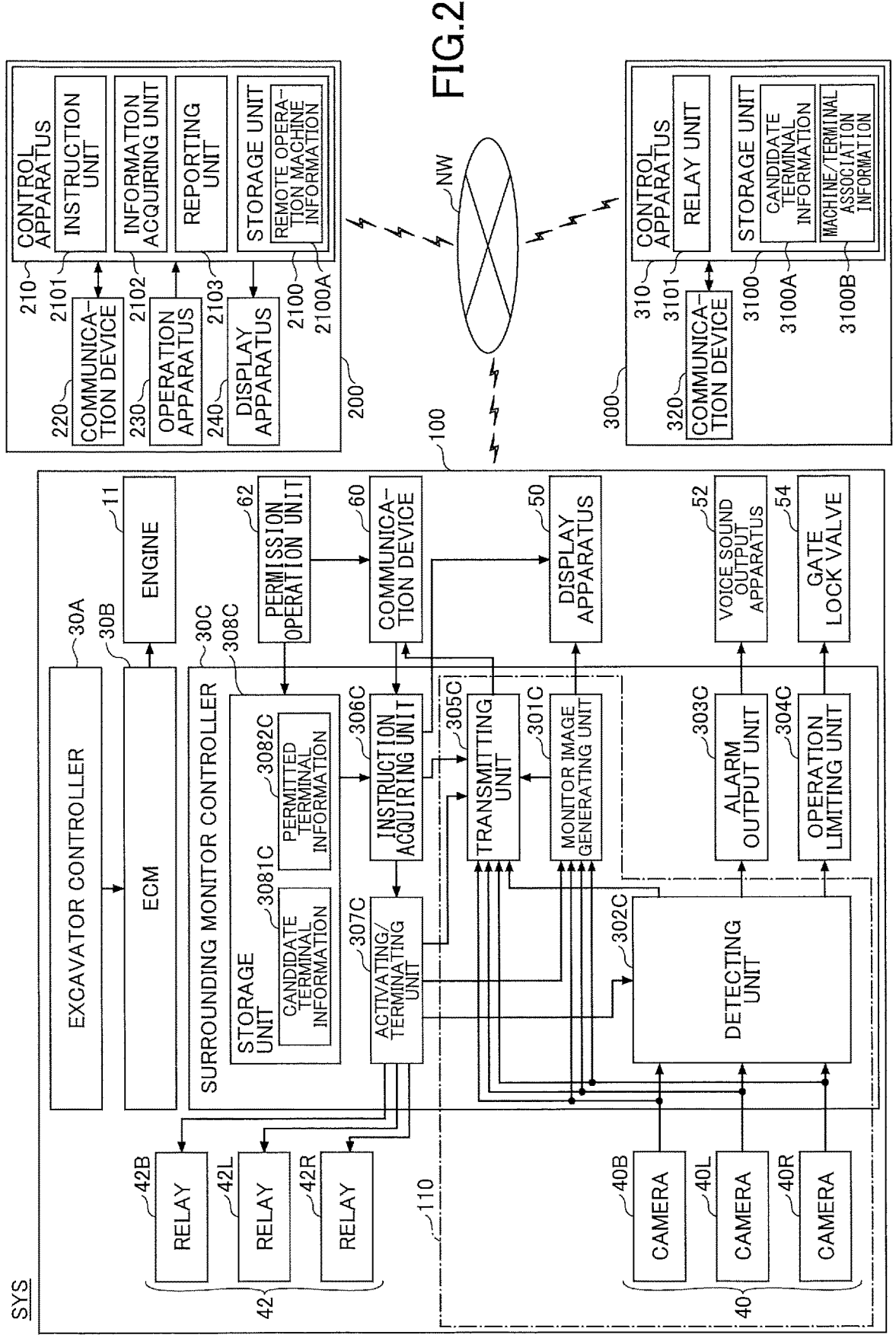
FIG. 2 is a configuration diagram illustrating an example of a configuration of a site monitoring system.

Note that in FIGS. 1 and 2, as a matter of convenience, one excavator 100 and one support apparatus 200 are illustrated. The site monitoring system SYS may also include other types of work machines in place of or in addition to the excavator 100. For example, the site monitoring system SYS may include a lifting magnet machine with a lifting magnet attached as an end attachment, a bulldozer, a wheel loader, an asphalt finisher, a forestry machine, a crawler crane, and the like.

<Overview of Excavator>

The excavator 100 (an example of a work machine) includes a lower traveling body 1, an upper turning body 3 that is turnably mounted to the lower traveling body 1 via a turning mechanism 2, a boom 4 as an attachment (working apparatus), an arm 5, a bucket 6, a cabin 10, and an engine 11.

The lower traveling body 1 includes, for example, a pair of crawlers on the left and right, and each crawler travels by being hydraulically driven by a traveling hydraulic motor 1M.

The upper turning body 3 is driven by a turning hydraulic motor and the like to rotate relative to the lower traveling body 1.

The boom 4 is vertically pivotably mounted to the front center of the upper turning body 3, the arm 5 is vertically pivotably mounted to the front end of the boom 4, and the bucket 6 is vertically pivotably mounted to the front end of the arm 5. The boom 4, the arm 5, and the bucket 6 are hydraulically driven by a boom cylinder 7, an arm cylinder 8, and a bucket cylinder 9, respectively.

The cabin 10 is an operator compartment in which an operator rides and is mounted on the front left side of the upper turning body 3.

The engine 11 is the driving source of the excavator 100 and is mounted, for example, on the rear of the upper turning body 3. The engine 11 is, for example, a diesel engine fueled with diesel oil. The engine 11 operates to maintain a predetermined revolution speed under the control of, for example, an engine controller (Engine Control Module (ECM)) 30B, which will be described below. The rotating shaft of the engine 11 is coupled to a main pump which supplies hydraulic oil to a hydraulic actuator including the traveling hydraulic motor 1M, a turning hydraulic motor, the boom cylinder 7, the arm cylinder 8, and the bucket cylinder 9, and a pilot pump which generates a pilot pressure source for operating the hydraulic actuator.

The excavator 100 may be powered by an external commercial power supply and the like connected through a battery or a cable. That is, the excavator 100 may be an electric excavator, such as a so-called battery excavator or cable excavator.

The excavator 100 may communicate with the management apparatus 300 through a predetermined communication network NW including, for example, a mobile communication network having a base station as a terminal or the Internet. Therefore, the excavator 100 can transmit (upload) various kinds of information to the management apparatus 300 and provide (transmit) various kinds of information to the support apparatus 200 via the management apparatus 300. Details are described below.

The excavator 100 is connected to the support apparatus 200 through the communication network NW by P2P (peer-to-peer). Various kinds of information may be directly exchanged between the excavator 100 and the support apparatus 200 without involving the management apparatus 300.

<Overview of Support Apparatus>

The support apparatus 200 (an example of an external apparatus, an information processing apparatus, or a user terminal) is a mobile terminal possessed by a user (e.g., a worker or supervisor of a worksite of the excavator 100). The support apparatus 200 may be, for example, a general-purpose notebook PC, a tablet terminal, a smartphone, and the like possessed by a user. The support apparatus 200 may be an exclusive-use terminal for confirming the surrounding status information regarding the excavator 100.

The support apparatus 200 can communicate with the management apparatus 300 via the communication network NW. Accordingly, the support apparatus 200 can transmit, to the excavator 100 via the management apparatus 300, an instruction requesting the excavator 100 to transmit the surrounding status information (hereinafter, referred to as the "site monitor instruction"). The support apparatus 200 can receive various kinds of information, such as the surrounding status information transmitted from the excavator 100 in response to the site monitor instruction, and provide (report) a user with various kinds of information, such as the received surrounding status information, through a display apparatus 240 mounted in the support apparatus 200. Details are described below.

<Overview of Management Apparatus>

The management apparatus 300 (an example of an information processing apparatus) is a terminal apparatus installed in a location that is geographically remote from the excavator 100 and the support apparatus 200. The management apparatus 300 is, for example, a server apparatus that is installed in a management center provided outside the worksite where the excavator 100 carries out the work and is configured mainly by one or more server computers. In this case, the server apparatus may be an in-house server operated by a business worker operating the site monitoring system SYS or a related business worker related to the business worker, or the server apparatus may be a so-called cloud server. The management apparatus 300 may also be a stationary or mobile computer terminal disposed at a management office and the like within the worksite of the excavator 100.

The management apparatus 300 can communicate with the excavator 100 and the support apparatus 200 through the communication network NW as described above. Accordingly, the management apparatus 300 can receive and store various kinds of information uploaded from the excavator 100. The management apparatus 300 can receive various requests transmitted from the support apparatus 200 and provide (transmit) various kinds of information (for example, surrounding status information) acquired from the excavator 100 in accordance with various requests.

<Configuration of Site Monitoring System>

Figure 3:
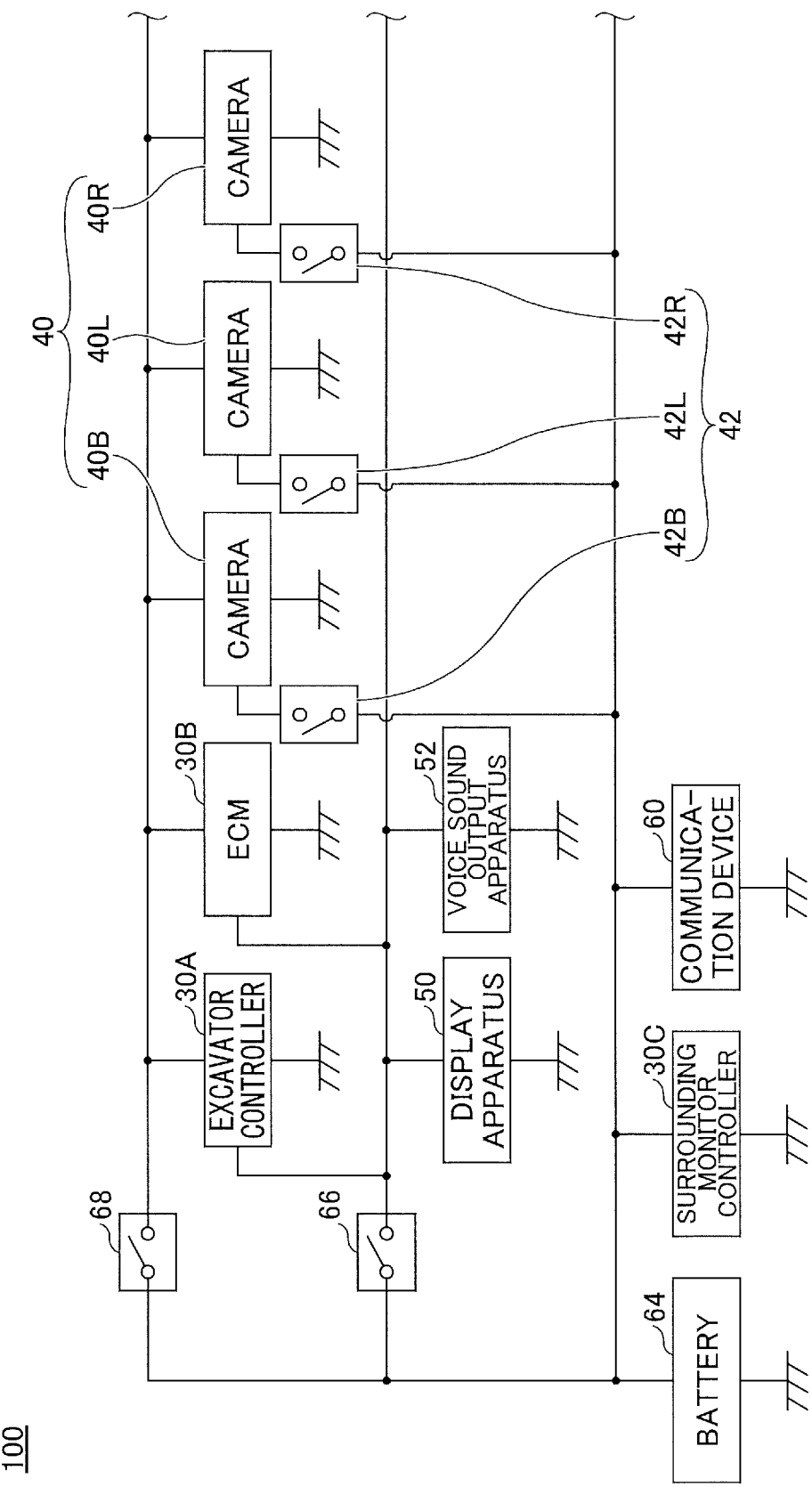
FIG. 3 is a diagram illustrating an example of a power supply system of an excavator.

Next, a specific configuration of the site monitoring system SYS according to the present embodiment will be described with reference to FIGS. 2 and 3 in addition to FIG. 1.

FIG. 2 is a configuration diagram illustrating an example of the configuration of the site monitoring system SYS. FIG. 3 is a diagram illustrating an example of a power supply system of the excavator 100.

The position of the key cylinder of the excavator 100 (hereinafter, "key position") is set to be in four stages of an OFF position, an accessory position (hereinafter, "ACC position"), an ignition position (hereinafter, "IG position"), and a start position, in the stated order. In this case, the ACC position is a key position that operates in conjunction with an accessory switch (hereinafter referred to as an "ACC switch") 66, which will be described later, to supply power to only some of the devices of the excavator 100 without activating the excavator 100 (i.e., without starting the engine 11). The IG position is a key position that operates in conjunction with the ignition switch (hereinafter referred to as an "IG switch") 68, which will be described later, to supply power to the device that is activated when the excavator 100 is activated (when starting the engine 11). The start position is a key position for activating the starter of engine 11 and for starting the engine 11, and at the start position, the ACC switch 66 is temporarily disconnected.

<Configuration of Excavator>

The excavator 100 includes an excavator controller 30A, an ECM 30B, a surrounding monitor controller 30C, an imaging apparatus 40, a display apparatus 50, a voice sound output apparatus 52, a gate lock valve 54, a communication device 60, and a permission operation unit 62.

The excavator controller 30A is mounted, for example, in the cabin 10 to provide integrated drive control of the excavator 100. The excavator controller 30A is supplied with power from a battery 64 (a power source, an example of a secondary battery) through both a system that passes through the ACC switch 66 ("ACC system") and a system that passes through the IG switch 68 ("IG system"). This causes the excavator controller 30A to be activated before the engine 11 starts and does not interrupt the power supply when engine 11 starts. Hereinafter, the same applies to the ECM 30B.

The battery 64 is charged, for example, by the alternator power generated by the engine 11.

The functions of the excavator controller 30A may be implemented by any hardware, software, or a combination thereof. The excavator controller 30A is mainly configured by a microcomputer including, for example, a CPU (Central Processing Unit), a RAM (Random Access Memory), a ROM (Read Only Memory), an auxiliary storage device, an RTC (Real-time Clock), various communication interfaces, and the like. Hereinafter, the same shall apply to the ECM 30B and the surrounding monitor controller 30C. Also, the same shall apply to a control apparatus 210 of the support apparatus 200 and a control apparatus 310 of the management apparatus 300, which will be described later.

The ECM 30B performs drive control of the engine 11 under control by the excavator controller 30A. For example, the ECM 30B controls various actuators (e.g., fuel injection devices, etc.) mounted to the engine 11 so that the engine 11 maintains a predetermined revolution speed, as described above, in response to an instruction from the excavator controller 30A.

The surrounding monitor controller 30C controls the monitoring of the surroundings of the excavator 100, including the site monitoring described above. For example, the surrounding monitor controller 30C controls the imaging apparatus 40 and acquires information about the status surrounding the excavator 100, i.e., a captured image indicating the status (appearance) surrounding the excavator 100. For example, the surrounding monitor controller 30C detects a predetermined monitor target within a predetermined monitor range in the surroundings of the excavator 100 based on the information (the captured image) acquired from the imaging apparatus 40. At this time, the monitor target may include any object, such as a stationary obstacle such as materials or earth and sand at the worksite, or a mobile obstacle such as another work machine or a truck at the worksite (i.e., a mobile object), as well as a worker or supervisor of the worksite working in the surroundings of the excavator 100. Further, the monitor target may include suspicious persons who enter the worksite outside the work hours.

The surrounding monitor controller 30C is constantly electrically connected to the battery 64 and may operate upon power being supplied from the battery 64 even while the excavator 100 is stopped. Specifically, the surrounding monitor controller 30C is in a state in which all of the functions are operated while the excavator 100 is in operation, and on the other hand, the surrounding monitor controller 30C is in a state in which minimum functions are operated while the excavator 100 is stopped (while the engine 11 is terminated). Details are described below.

The surrounding monitor controller 30C includes, for example, a monitor image generating unit 301C, a detecting unit 302C, an alarm output unit 303C, an operation limiting unit 304C, a transmitting unit 305C, an instruction acquiring unit 306C, and an activating/terminating unit 307C, as functional units implemented by executing one or more programs stored in a ROM or a non-volatile auxiliary storage device on the CPU. The surrounding monitor controller 30C includes a storage unit 308C as a storage area defined in a non-volatile internal memory, for example, an auxiliary storage device.

When the excavator 100 is stopped (i.e., the engine 11 is terminated), the surrounding monitor controller 30C activates (wakes up) only the instruction acquiring unit 306C among the monitor image generating unit 301C, the detecting unit 302C, the alarm output unit 303C, the operation limiting unit 304C, the transmitting unit 305C, the instruction acquiring unit 306C, and the activating/terminating unit 307C, and terminates the other functional units (to be in a sleep state). This allows the surrounding monitor controller 30C to minimize power consumption while the excavator 100 is stopped.

The imaging apparatus 40 (an example of a sensor) is mounted on the top of the upper turning body 3 to capture images of the surroundings of the excavator 100. The imaging apparatus 40 includes cameras 40B, 40L, and 40R.

The camera 40B, the camera 40L, and the camera 40R are mounted on the upper back end, the upper left end, and the upper right end of the upper turning body 3, respectively, to capture images of the back, the left side, and the right side of the upper turning body 3. For example, the camera 40B, the camera 40L, and the camera 40R are single-eye wide angle cameras each having a very wide angle of view. Specifically, the camera 40B, the camera 40L, and the camera 40R are respectively mounted so that the optical axis is directed obliquely downward at the upper portion of the upper turning body 3, and capture images of a vertical imaging range from the ground near the excavator to an area far away from the excavator. The camera 40B, the camera 40L, and the camera 40R each output captured images at a predetermined cycle (e.g., 1/30 second) while the excavator 100 is operating, and the output captured image is loaded into the surrounding monitor controller 30C.

The imaging apparatus 40 is powered from the battery 64 through the IG system. The imaging apparatus 40 may also be powered from the battery 64 through a branch system which branches out from a system which is constantly connected with the battery 64 (hereinafter, "constantly connected system") and which passes through a relay 42. Specifically, the cameras 40B, 40L, and 40R may be respectively powered from the battery 64 through a branch system which branches from the constantly connected system and passes through the relays 42B, 42L, and 42R. This allows the imaging apparatus 40 to be activated even when the excavator 100 (engine 11) is stopped. The cameras 40B, 40L, and 40R can be individually activated even when the excavator 100 (engine 11) is stopped.

Note that the excavator 100 may include a microphone capable of collecting sound in the surroundings of the excavator 100 in place of or in addition to the imaging apparatus 40. In this case, the microphone may be connected to a branch system that includes the same relays as the imaging apparatus 40. This allows the microphone to be activated even when the excavator 100 (engine 11) is stopped.

The display apparatus 50 is provided around the operator seat within the cabin 10, specifically at a position easily visible to an operator seated in the operator seat, and displays various kinds of image information to be reported to the operator. The display apparatus 50 is powered from the battery 64 through the ACC system. The same applies to the voice sound output apparatus 52. The display apparatus 50 is, for example, a liquid crystal display or an organic EL (Electroluminescence) display, and may be a touch panel display type which also serves as an operation unit. Specifically, as described below, the display apparatus 50 displays a captured image captured by the imaging apparatus 40 (hereinafter, sometimes referred to as a "through-image") or a composite image (for example, a viewpoint conversion image to be described later) that is generated (combined), based on a captured image captured by the imaging apparatus 40, by the surrounding monitor controller 30C, as a monitor image indicating the appearance of the surroundings of the excavator 100.

The voice sound output apparatus 52 is provided around the operator seat in the cabin 10 and outputs various kinds of voice sound information to be reported to the operator. The voice sound output apparatus 52 may be, for example, a speaker or a buzzer. Specifically, the voice sound output apparatus 52 outputs an alarm sound.

The gate lock valve 54 is provided at the most upstream side of the pilot line, which is for supplying pilot pressure from the pilot pump described above to an operation apparatus operated by an operator, etc., to operate various operation elements of the excavator 100 (i.e., the lower traveling body 1, the upper turning body 3, the boom 4, the arm 5, and the bucket 6, etc.), and switches between communication and non-communication of the pilot line.

For example, the gate lock valve 54 usually switches between communication and non-communication of the pilot line in accordance with an output signal (ON/OFF) of a gate lock switch in conjunction with the operation state of a gate lock lever provided at a portion corresponding to the entrance to the operator seat within the cabin 10. Specifically, the gate lock valve 54 switches the pilot line to a communication state when the output signal of the gate lock switch is a signal corresponding to a state in which the gate lock lever is pulled up (i.e., the operator is seated in the operator seat) (hereinafter, "OFF signal" as a matter of convenience). On the other hand, the gate lock valve 54 switches the pilot line to a non-communication state when the output signal of the gate lock switch is a signal corresponding to a state in which the gate lock lever is lowered (i.e., the operator has left the operator seat) (hereinafter, "ON signal" as a matter of convenience).

For example, the gate lock valve 54 is also configured to receive instruction signals input from the surrounding monitor controller 30C. Specifically, the gate lock valve 54 may have a signal input unit that is connected to a logic circuit into which an instruction signal from the surrounding monitor controller 30C can interrupt. This allows the gate lock valve 54 to switch between communication and non-communication of the pilot line in response to an instruction signal (OFF signal/ON signal) from the surrounding monitor controller 30C. That is, the gate lock valve 54, under the control of the surrounding monitor controller 30C, can switch the pilot line to a non-communication state even when the gate lock lever is pulled up.

The communication device 60 is any device that communicates with an external party, such as the management apparatus 300, through the communication network NW. The communication device 60 is constantly electrically connected to the battery 64 and can be operated with power supplied from the battery 64 even when the excavator 100 is stopped. Accordingly, the communication device 60 can receive various kinds of information from the outside even while the excavator 100 is stopped. The communication device 60 is a mobile communication module that corresponds to a mobile communication standard such as LTE (Long Term Evolution), 4G (4th Generation), and 5G (5th Generation).

The permission operation unit 62 accepts an operation from an operator and the like to permit remote operation relating to surrounding monitoring (site monitoring) of the excavator 100 by a particular support apparatus 200. The permission operation unit 62 may be implemented by a combination of, for example, a hardware operation unit such as buttons, toggles, levers, etc., and a touch panel mounted on the display apparatus 50 and a software operation unit such as a button icon on the operation screen displayed on the display apparatus 50.

Figure 4:
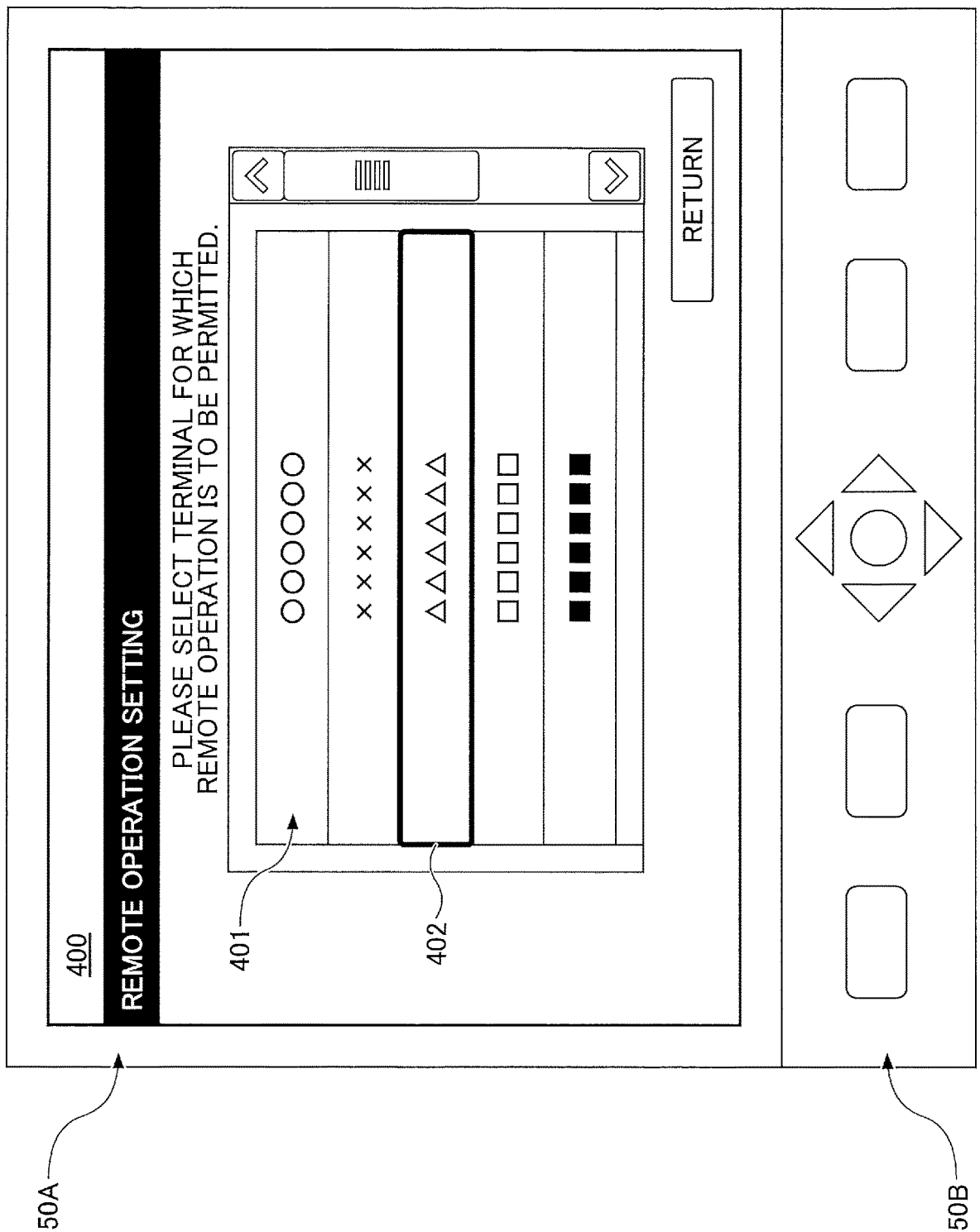
FIG. 4 is a diagram illustrating an example of a remote operation permission operation screen displayed on a display apparatus.

For example, FIG. 4 is a diagram illustrating an example of the permission operation unit 62. Specifically, FIG. 4 is a diagram illustrating an example (a remote operation permission operation screen 400) of an operation screen (hereinafter, the "remote operation permission operation screen") displayed on the display apparatus 50.

As illustrated in FIG. 4, the display apparatus 50 includes a display part 50A, which is a display region in which various kinds of information images are displayed, and an operation part 50B, which is hardware-based, such as a button switch, which can receive operations by an operator and the like with respect to the various kinds of information images displayed in the display part 50A.

The display part 50A is, for example, a horizontal rectangular display (e.g., a display having an aspect ratio of 4:3) of the display apparatus 50.

As illustrated in FIG. 4, the remote operation permission operation screen 400 displays a candidate list 401 of the support apparatuses 200 that are candidates for which remote operation for surrounding monitoring with respect to the excavator 100 may be permitted. The candidate list 401 is displayed based on candidate terminal information 3081C stored in a storage unit 308C to be described later. The candidate terminal information 3081C of the storage unit 308C is information concerning the support apparatus 200 previously registered in the management apparatus 300 and is updated by the latest candidate terminal information delivered from the management apparatus 300.

For example, an operator and the like suitably scrolls the candidate list 401 through a touch panel or the operation part 50B mounted on the display apparatus 50 and aligns one support apparatus 200 with a cursor 402. This allows one support apparatus 200 to be selected from among a plurality of the support apparatuses 200 included in the candidate list 401.

The operator and the like performs a determination operation through the touch panel or the operation part 50B as appropriate. Accordingly, remote operation for site monitoring of the excavator 100 is permitted to the selected support apparatus 200, by the permission operation unit 62. At this time, the support apparatus 200 for which the remote operation related to the surrounding monitoring of the excavator 100 is permitted, is registered in permitted terminal information 3082C of the storage unit 308C to be described later. Further, information regarding the support apparatus 200 for which the remote operation regarding the site monitoring of the excavator 100 is permitted, is reported to the management apparatus 300 through the communication device 60 by the permission operation unit 62 (the remote operation permission operation screen 400). Accordingly, the management apparatus 300 can recognize and manage the support apparatus 200 for which remote operation of the site monitoring is permitted, on a per-excavator 100 basis.

Note that the support apparatus 200 to be permitted may be identified (selected) by another method. For example, the support apparatus 200 possessed by an operator and the like may be identified (selected) as the support apparatus 200 to be permitted, by predetermined proximity communication such as Bluetooth (registered trademark) communication or Wi-Fi (registered trademark) communication between the excavator 100 and the support apparatus 200 possessed by the operator and the like. Further, the support apparatus 200 for which remote operation for site monitoring of each excavator 100 is permitted may be determined (registered) by the management apparatus 300. That is, the permission operation unit 62 may be provided in the management apparatus 300 and remote operation for site monitoring of each excavator 100 may be permitted to a particular support apparatus 200 by an administrator and the like of the management apparatus 300. The site monitor instruction from the support apparatus 200 is transmitted to the excavator 100 via the management apparatus 300, and, therefore, it is only necessary for the management apparatus 300 to determine whether remote operation relating to site monitoring of the excavator 100 is permitted. For example, the administrator of the management apparatus 300 may permit remote operation only to the support apparatus 200 associated with a particular site where the target excavator 100 is to carry out the work (e.g., the support apparatus 200 of a supervisor or a worker of the site) from among a plurality of pre-registered support apparatuses 200, for each excavator 100.

Returning to FIGS. 1 to 3, the monitor image generating unit 301C displays the monitor image on the display apparatus 50 based on the captured image captured by the imaging apparatus 40.

For example, the monitor image generating unit 301C displays an image captured by at least one of the cameras 40B, 40L, and 40R on the display apparatus 50 as a monitor image.

For example, the monitor image generating unit 301C generates a separate image (hereinafter, a "surroundings image" as a matter of convenience) representing the appearance of the surroundings of the excavator 100 as the monitor image, based on the captured image captured by the imaging apparatus 40. Specifically, the monitor image generating unit 301C may generate the surroundings image by combining the images captured by the cameras 40B, 40L, and 40R or by performing a process for converting the viewpoint. The monitor image generating unit 301C displays the monitor image including the generated surroundings image on the display apparatus 50.

More specifically, the monitor image generating unit 301C performs a known viewpoint conversion process on the basis of the images captured by the cameras 40B, 40L, and 40R, thereby generating, as the surroundings image, a viewpoint conversion image viewed from a virtual viewpoint, and displays the generated image on the display apparatus 50. When displaying the surroundings image on the display apparatus 50, the monitor image generating unit 301C displays an excavator image schematically representing the excavator 100 on the display apparatus 50 together with the surroundings image, in order to clearly indicate the relative positional relationship between the imaging range of the image capturing device 40 and the excavator 100. That is, the monitor image generating unit 301C generates the monitor image including the excavator image and the surroundings image disposed around the excavator image in accordance with the relative positional relationship between the excavator 100 and the imaging area of the imaging apparatus 40, and displays the monitor image on the display apparatus 50.

Figure 5A:
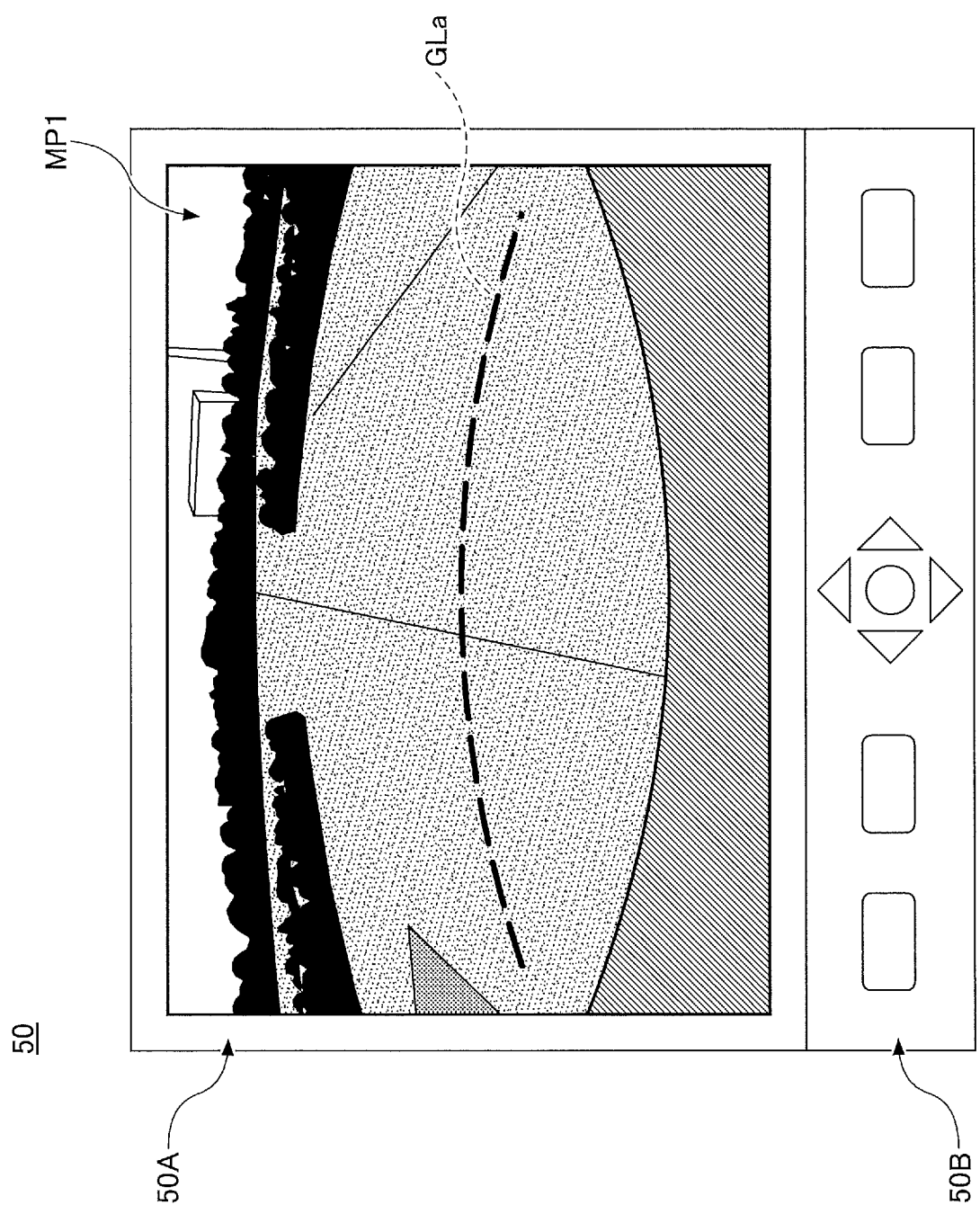
FIG. 5A is a diagram illustrating an example of a monitor image (through-image) displayed on a display apparatus.
Figure 5B:
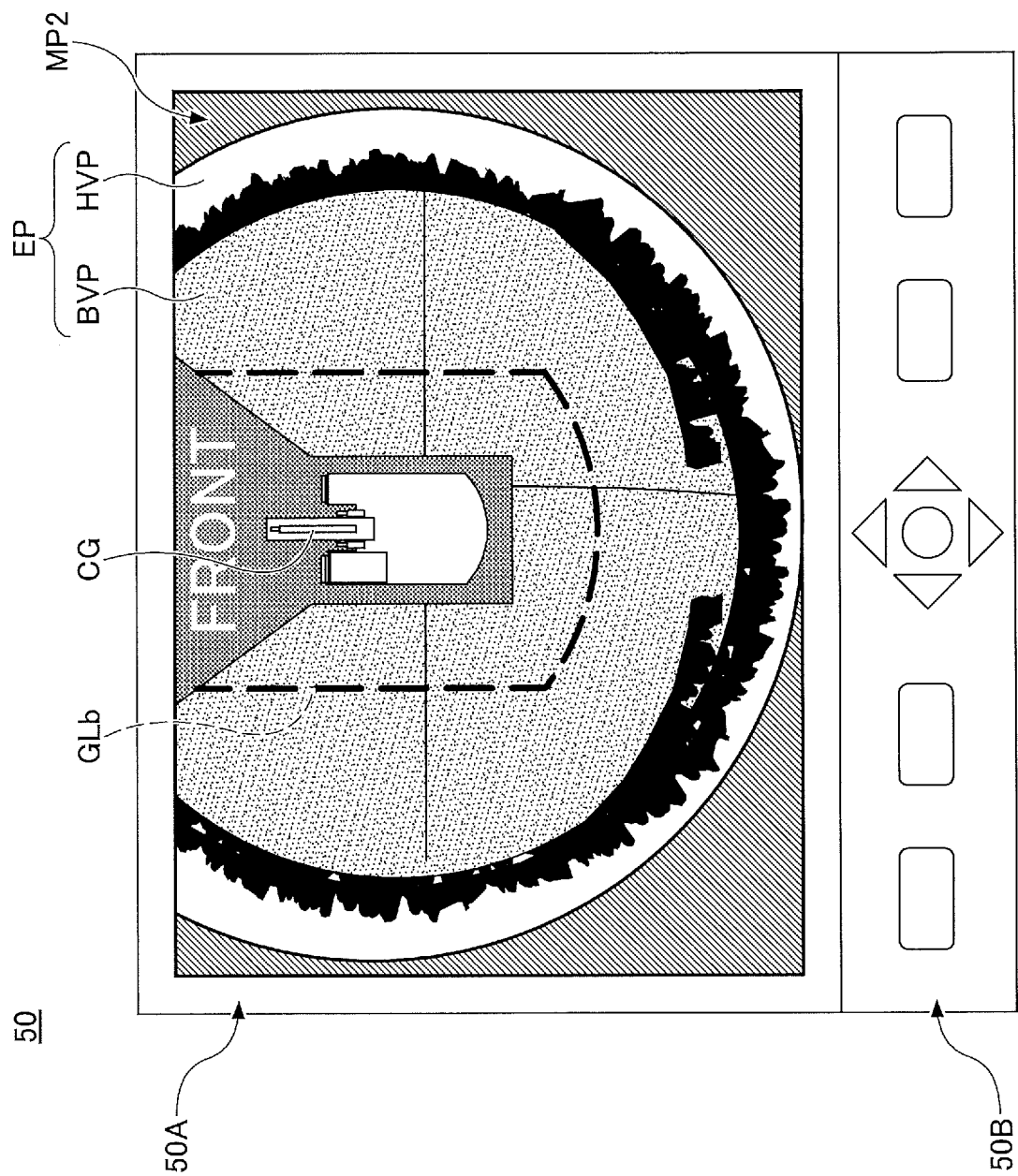
FIG. 5B is a diagram illustrating another example (surroundings image) of a monitor image displayed on a display apparatus.

For example, FIGS. 5A and 5B are diagrams illustrating an example of a monitor image displayed on the display apparatus 50 (a monitor image MP1 including a through-image) and another example (a monitor image MP2 including a surroundings image EP), respectively.

As illustrated in FIG. 5A, in this example, a through-image of any of the cameras 40B, 40L, and 40R is displayed in the display part 50A as the monitor image MP1 as described above.

In this example, a guide line GLa is superimposed on the monitor image MP1 (through-image). The guide line GLa represents, for example, a position where a distance D in the horizontal direction from the excavator 100, is a predetermined distance D1. Accordingly, the operator and the like can recognize how far away the position of a monitor target is from the excavator 100, when the monitor target appears (is included) in the through-image.

The position of the predetermined distance D1 may be suitably set within a predetermined distance D2 or less corresponding to the monitor area as described below.

As illustrated in FIG. 5B, in this example, the monitor image MP2, including the excavator image CG and the surroundings image EP disposed around the excavator image CG, is displayed in the display part 50A as described above. Accordingly, the operator and the like can appropriately recognize the positional relationship between the monitor target appearing in the surroundings image EP and the excavator 100.

The surroundings image EP of this example is a viewpoint conversion image which is a combination of a birds-eye image BVP that is a view from directly above the surrounding region that is adjacent to the excavator 100, and a horizontal image HVP of the surrounding region viewed in a horizontal direction from the excavator 100 disposed around the relevant bird-eye image BVP. The surroundings image EP, which is a viewpoint conversion image, is obtained by projecting the captured images captured by the cameras 40B, 40L, and 40R into a spatial model and re-projecting the projected images projected into the spatial model to another two-dimensional plane. A spatial model is a projection target of a captured image in a virtual space and is formed of one or more planes or curved planes that include planes or curved planes other than the plane where the captured image is positioned.

Further, a guide line GLb is superimposed on the monitor image MP2. The guide line GLb is similar to the guide line GLa of the monitor image MP1 (through-image) of FIG. 5A, in that the guide line GLb represents a position where the distance D in the horizontal direction from the excavator 100 is the predetermined distance D1. That is, the guide line GLb is a line in which the contour shape of the excavator image CG corresponding to a plan view viewed directly from above the excavator 100, is offset (enlarged) by an amount corresponding to the predetermined distance D1 on the outside of the excavator image CG. Thus, similar to the guide line GLa of FIG. 5A, the operator and the like can recognize how far away the position of a monitor target is from the excavator 100, when the monitor target appears in the surroundings image EP.

Returning to FIGS. 1 to 3, the detecting unit 302C detects the monitor target in the monitor area in the surroundings of the excavator 100 based on the captured image captured by the imaging apparatus 40, specifically in the horizontal direction viewed from the excavator 100, that is, in the monitor area along the plane where the excavator 100 is carrying out the work (where the lower traveling body 1 is contacting). Specifically, the detecting unit 302C detects a monitor target within a monitor area in which the distance D in the horizontal direction from the excavator 100 is within the predetermined distance D2 (for example, 5 meters).

Figure 6:
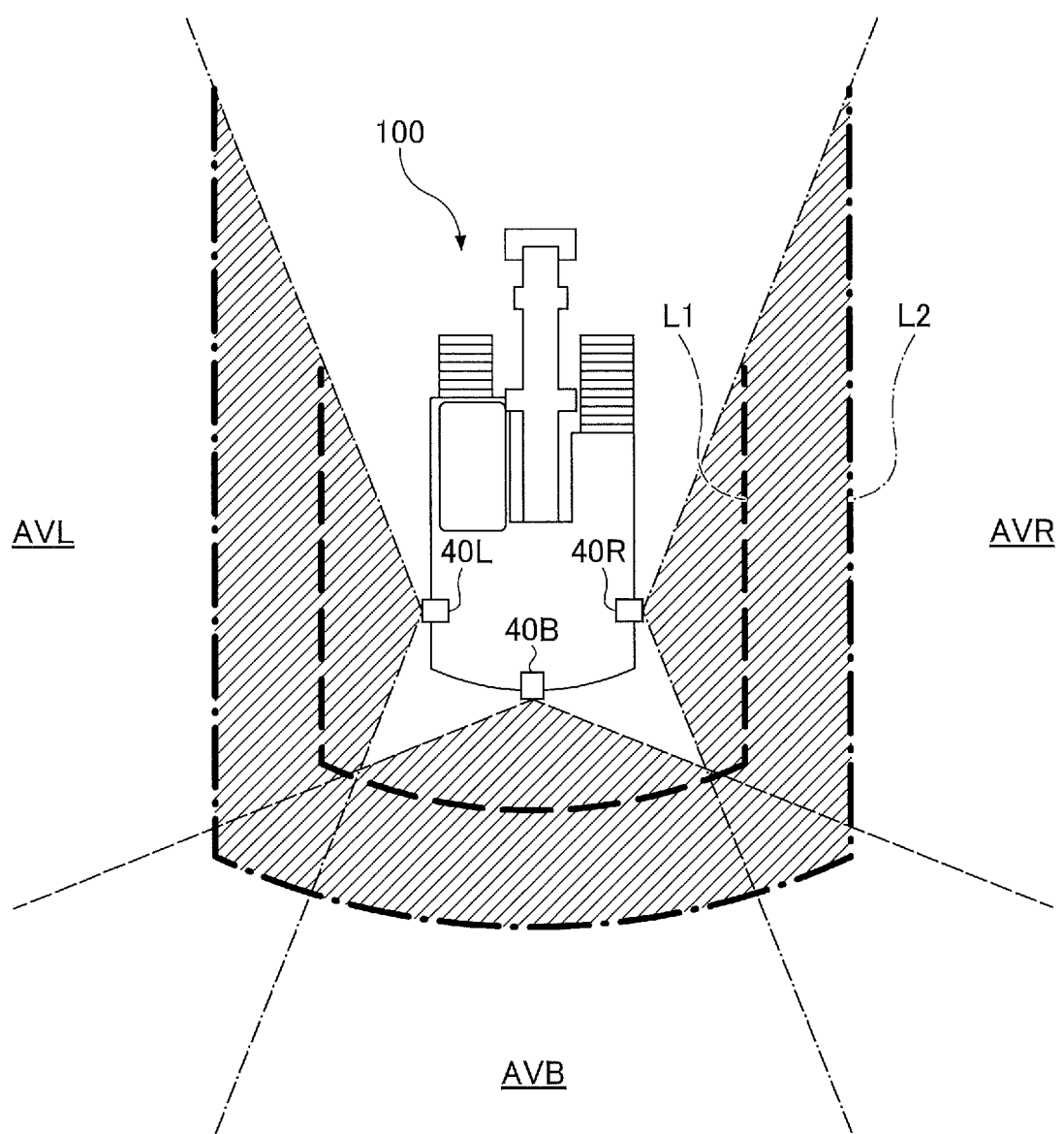
FIG. 6 is a schematic diagram illustrating an example of a monitor area.

For example, FIG. 6 is a diagram schematically illustrating an example of a monitor area (a monitor area MA). Specifically, FIG. 6 is a diagram illustrating the monitor area MA that is a view from directly above the excavator 100.

Note that a dashed line L1 and a dashed line L2 in the drawing correspond to the position of the predetermined distance D1 and the position of the predetermined distance D2, respectively, of the distance D in the horizontal direction from the excavator 100.

As illustrated in FIG. 6, the monitor area MA (the shaded portion in the drawing) is defined as a range in which the distance D in the horizontal direction from the excavator 100 is less than or equal to the predetermined distance D2, among imaging possible ranges AVB, AVL, and AVR, respectively defined by the angle of view in the horizontal direction of each of the cameras 40B, 40L, and 40R.

Referring back to FIGS. 1 to 3, for example, the detecting unit 302C recognizes a monitor target in the captured image, by optionally applying a machine learning-based classifier and the like including various known image processing techniques or artificial intelligence (AI).

Further, by applying various known methods, the detecting unit 302C can determine (estimate) a position (hereinafter, an "actual position"; for example, a foot position of a person as a monitor target) where a recognized monitor target is present, included in a captured image captured by the imaging apparatus 40 of a single-eye type.

For example, the detecting unit 302C estimates a position in the horizontal direction (hereinafter, a "horizontal position") viewed from the excavator 100, based on a size (for example, a size in the height direction in a captured image) of a recognized monitor target in the captured image. This is because the size of a recognized monitor target in the captured image is correlated with the position; as the monitor target moves away from the excavator 100, the size of the monitor target becomes small. Specifically, a range of the assumed size may be defined for the monitor target (e.g., a range of the assumed human height), and, therefore, the correlation between the horizontal position of the monitor target included in the range of assumed size viewed from the excavator 100 and the size of the monitor target in the captured image may be predefined. Therefore, the detecting unit 302C can estimate the actual position (horizontal position from the excavator 100) of the recognized monitor target based on a map or a conversion equation representing a correlation between the size of the monitor target in the captured image and the horizontal position viewed from the excavator 100 stored in advance in an internal memory such as an auxiliary storage device of the surrounding monitor controller 30C.

For example, assuming that the monitor target is on the same plane as the excavator 100 (the lower traveling body 1), the detecting unit 302C can estimate an actual position of the monitor target (for example, a foot position) by performing projection conversion (homography) and the like on the captured image with respect to the plane. In this case, a portion (a point) of the captured image corresponds to a position on the same plane as the excavator 100.

The detecting unit 302C may detect a monitor target in a monitor area in the surroundings of the excavator 100 based on detection information of another sensor that may be mounted on the excavator 100, instead of, or in addition to, the captured image captured by the imaging apparatus 40. For example, the detecting unit 302C may detect a monitor target in a monitor area in the surroundings of the excavator 100 based on detection information obtained by another sensor such as a stereo camera, a millimeter-wave radar, and a LIDAR (Light Detection and Ranging).

The alarm output unit 303C outputs an alarm to the interior or the exterior of the cabin 10 when a monitor target is detected in the monitor area by the detecting unit 302C. Accordingly, the surrounding monitor controller 30C can cause an operator or a worker, a supervisor, and the like in the surroundings of the excavator 100 to recognize that a monitor target has entered the monitor area in the surroundings of the excavator 100. Therefore, the surrounding monitor controller 30C can urge an operator and the like to confirm the safety status in the surroundings of the excavator 100 and can urge a worker and the like in the monitor area to evacuate from the monitor area.

For example, the alarm output unit 303C outputs an alarm in an auditory manner, that is, by sound. Specifically, the alarm output unit 303C outputs a control instruction to the voice sound output apparatus 52 and causes the voice sound output apparatus 52 to output an alert sound.

Depending on various conditions, the alarm output unit 303C may change the pitch, the sound pressure, the tone color, and the like of the alert sound, and may change the bellowing cycle, etc., when cyclically bellowing the alert sound (for example, a buzzer sound).

For example, the alarm output unit 303C outputs an alarm in a visual manner, that is, by displaying an image on the display apparatus 50. Specifically, the alarm output unit 303C transmits the alarm request to the monitor image generating unit 301C. Accordingly, the monitor image generating unit 301C emphasizes the monitor target included in the monitor image (through-image or surroundings image) displayed on the display apparatus 50 in response to the alarm request, so that the display apparatus 50 can output an alarm to an operator.

The alarm output unit 303C may output an alarm in a tactile manner, for example, through a vibration generating device that vibrates the operator seat on which the operator is seated.

The alarm output unit 303O may change the type (alarm level) of the alarm depending on the positional relationship between the monitor target detected in the monitor area by the detecting unit 302C and the excavator 100.

For example, the alarm output unit 303C outputs an alarm having a relatively low alarm level (hereinafter, an "alarm of an attention level") to urge the attention of an operator and the like to the monitor target when the monitor target detected in the monitor area by the detecting unit 302C is located at a position distant from the excavator 100. Specifically, the alarm output unit 303C may output an alarm of an attention level when the distance D in the horizontal direction between the monitor target detected by the detecting unit 302C and the excavator 100 exceeds the predetermined distance D1 (in the case of D1<D≤D2). Hereinafter, a region in which the distance D from the excavator 100 in the monitor area exceeds the predetermined distance D1 is referred to as an "attention region" as a matter of convenience. On the other hand, the alarm output unit 303C outputs an alarm having a relatively high alarm level (hereinafter, referred to as an "alarm of a caution level") indicating that the monitor target is approaching the excavator 100 and the risk is increasing when the monitor target detected in the monitor area by the detecting unit 302C is positioned relatively close to the excavator 100. Specifically, the alarm output unit 303C may output an alarm of a caution level when the distance D in the horizontal direction from the monitor target detected by the detecting unit 302C to the excavator 100 is less than or equal to the predetermined distance D1 (in the case of D≤D1). Hereinafter, a region where the distance D from the excavator 100 is less than or equal to the predetermined distance D1 in the monitor area is referred to as a "caution region".

In this case, the alarm output unit 303C may change the pitch, the sound pressure, the tone color, the bellowing cycle, and the like of the sound output from the voice sound output apparatus 52, between the alarm of the attention level and the alarm of the caution level. The alarm output unit 303C may change the color, the shape, the size, the presence or absence of blinking, the blinking cycle, and the like of a marker and the like for emphasizing the monitor target included in the monitor image (through-image or surroundings image) displayed on the display apparatus 50, between the alarm at the attention level and the alarm at the caution level. Accordingly, the surrounding monitor controller 30C can cause an operator or the like to recognize the alarm level, that is, the proximity of the monitor target to the excavator 100, by the difference in the alarm sound or the marker and the like that highlights the monitor target displayed on the display apparatus 50.

The alarm output unit 303C cancels the alarm output when the monitor target detected by the detecting unit 302C is no longer detected or when a predetermined cancel operation is performed by an operator and the like after the alarm output starts.

The operation limiting unit 304C limits the operation of an operation element of the excavator 100 when a monitor target is detected in the monitor area by the detecting unit 302C. At this time, the operation element to be the target of the operation limitation includes some of or all of the lower traveling body 1, the upper turning body 3, the boom 4, the arm 5, and the bucket 6. For example, the operation limiting unit 304C causes the gate lock valve 54 to switch the pilot line into a non-communication state by transmitting an instruction signal (ON signal) to the gate lock valve 54. Accordingly, the hydraulic oil (pilot pressure) is not supplied from the pilot pump (not illustrated) to an operation apparatus (not illustrated) which operates the operation element of the excavator 100, so that the operation element of the excavator 100 is prevented from operating even if an operator inputs an operation to the operation apparatus. Therefore, even in the case where a monitor target (for example, a person) enters the monitor area in the surroundings of the excavator 100, the operation of the excavator 100 is limited, so that the occurrence of collision between the excavator 100 and the monitor target can be prevented, and as a result, the safety can be maintained in the surroundings of the excavator 100.

For example, instead of the gate lock valve 54, a pressure reduction valve may be provided to depressurize the pilot pressure on the secondary side output from the operation apparatus which operates the operation element, and the operation limiting unit 304C may control the pressure reduction valve. In this case, the pressure reduction valve reduces the pilot pressure on the secondary side output from the operation apparatus to a pressure value equivalent to a zero operation amount or less, thereby invalidating the operation performed with respect to the operation apparatus by the operator. Therefore, the operation limiting unit 304C can control the pressure reduction valve to limit the operation of the operation element of the excavator 100 as a result. The operation limiting unit 304C may control the pressure reduction valve so that the operation element of the excavator 100 is not stopped, but to limit the operation of the excavator 100 in a manner that the operation of each operation element relative to the operation by an operator is gradually limited than usual.

The operation limiting unit 304C may change the level of the operation limitation in accordance with the positional relationship between the monitor target detected by the detecting unit 302C and the excavator 100 as in the case of the alarm output unit 303C.

For example, the operation limiting unit 304C limits the operation of the excavator 100 in a manner having a relatively low degree of limitation when a monitor target detected in the monitor area by the detecting unit 302C is located at a position distant from the excavator 100. Specifically, the operation limiting unit 304C may limit the operation of the excavator 100 in a manner having a relatively low degree of limitation (for example, the operation speed of the operation element relative to an operation amount with respect to the operation apparatus by an operator, is lower than usual) when the distance D in the horizontal direction from the monitor target detected by the detecting unit 302C to the excavator exceeds the predetermined distance D1 (in the case of D1<D≤D2). On the other hand, the operation limiting unit 304C limits the operation of the excavator 100 in a manner having a relatively high degree of limitation when a monitor target detected in the monitor area by the detecting unit 302C is located at a position close to the excavator 100. Specifically, the operation limiting unit 304C may limit the operation of the excavator 100 in a manner having a relatively high degree of limitation (for example, to stop the operation of the operation element) when the distance D in the horizontal direction from the monitor target detected by the detecting unit 302C to the excavator 100 is less than or equal to the predetermined distance D1 (in the case of D≤D1).

The operation limiting unit 304C cancels the operation limitation of the excavator 100 when the monitor target detected by the detecting unit 302C is no longer detected or when the above-described cancel operation is performed after the start of the operation limitation of the excavator 100.

The transmitting unit 305C transmits the information (the surrounding status information) regarding the status in the surroundings of the excavator 100 to the management apparatus 300 through the communication device 60 in accordance with a site monitor instruction from the support apparatus 200. Therefore, the transmitting unit 305C can provide (transmit) the surrounding status information to the support apparatus 200 via the management apparatus 300.

As described above, when the excavator 100 and the support apparatus 200 are connected by P2P, the transmitting unit 305C may directly transmit the surrounding status information to the support apparatus 200.

For example, the transmitting unit 305C transmits, as the surrounding status information, information acquired by the imaging apparatus 40 (cameras 40B, 40L, and 40R), that is, a captured image including the appearance of the surroundings of the excavator 100, to the management apparatus 300. As described above, when other sensors such as a stereo camera, a millimeter-wave radar, a LIDAR, and the like are mounted on the excavator 100, instead of or in addition to the imaging apparatus 40, the transmitting unit 305C may transmit detection information of other sensors to the management apparatus 300 as the surrounding status information. The transmitting unit 305C may transmit a surroundings image generated by the monitor image generating unit 301C to the management apparatus 300 as the surrounding status information.

For example, the transmitting unit 305C transmits the surrounding status information generated based on the information (that is, a captured image) acquired by the imaging apparatus 40 as the surrounding status information to the management apparatus 300. Specifically, the transmitting unit 305C transmits information concerning a monitor target in the surroundings of the excavator 100, which is generated based on a captured image acquired by the imaging apparatus 40, and more specifically, transmits information concerning the presence or absence of detection of a monitor target by the detecting unit 302C, to the management apparatus 300. In this case, the transmitting unit 305C may transmit information concerning the presence or absence of detection of the monitor target to the management apparatus 300 regardless of the presence or absence of detection of the monitor target by the detecting unit 302C, or the transmitting unit 305C may transmit information indicating that the monitor target is detected to the management apparatus 300 only when the monitor target is detected.

For example, the transmitting unit 305C transmits information (that is, voice sound information in the surroundings of the excavator 100) acquired by the above-described microphone as the surrounding status information to the management unit 300.

The transmitting unit 305C may transmit all of a plurality of types of information to the management apparatus 300 or transmit some types of information to the management apparatus 300 when there are a plurality of types of information (for example, a captured image and voice sound information), which are predefined as the surrounding status information. For example, the information to be transmitted among a plurality of types of information may be set by a user such as an operator.

The transmitting unit 305C may store the surrounding status information to be transmitted to the support apparatus 200 via the management apparatus 300 through the communication device 60, as log information in the storage unit 308C and the like. Thus, the operator and the like of the excavator 100 can confirm the log information after the fact by accessing the log information by a predetermined method and displaying the log information on the display apparatus 50 and the like.

The instruction acquiring unit 306C acquires (receives) the site monitor instruction from the support apparatus 200 via the management apparatus 300 through the communication device 60.

The instruction acquiring unit 306C determines whether the acquired site monitor instruction is a qualified site monitor instruction. Specifically, the instruction acquiring unit 306C may determine whether the site monitor instruction is a qualified site monitor instruction based on predetermined authentication information included in the site monitor instruction. This is to prevent the excavator 100 from being remotely operated by a malicious third party. The instruction acquiring unit 306C may determine whether the site monitor instruction is qualified, based on whether the excavator 100 matches the excavator that is the target of the remote operation specified in the site monitor instruction. This is to prevent a situation in which the excavator 100 is inadvertently remotely operated in a status where a site monitor instruction which in fact should have been transmitted to another excavator has been erroneously transmitted to the excavator 100, due to a bug and the like in a program in the management apparatus 300. The instruction acquiring unit 306C may determine whether the transmission source of the site monitor instruction corresponds to (is included in) the support apparatus 200 for which remote operation is permitted by the permission operation unit 62, based on the permitted terminal information 3082C stored in the storage unit 308C. This is to prevent a situation where the excavator 100 is remotely operated through the support apparatus 200 that is not permitted to perform the remote operation.

When the site monitor instruction is a qualified site monitor instruction, the instruction acquiring unit 306C performs a process of a preliminary stage before the transmitting of the surrounding status information by the transmitting unit 305C.

Specifically, while the excavator 100 is stopped (that is, while the engine 11 is terminated), the instruction acquiring unit 306C activates the activating/terminating unit 307C that is in a sleep state and activates a function related to site monitoring of the excavator 100 (hereinafter referred to as a "site monitor function").

When the excavator 100 is in operation (that is, the engine 11 is in operation), the instruction acquiring unit 306C (an example of an internal reporting unit) reports, through the display apparatus 50, that the surrounding monitor information of the excavator 100 is transmitted to the outside (the support apparatus 200, the management apparatus 300). Accordingly, the operator and the like can proceed with the work of the excavator 100 while recognizing that the surrounding status information of the excavator 100 that is operated by the operator himself/herself is transmitted to the outside and confirmed from the outside of the worksite.

When the process of the preliminary stage is completed, the instruction acquiring unit 306C causes the transmitting unit 305C to transmit the surrounding status information based on the site monitor instruction.

The activating/terminating unit 307C confirms various states of the battery 64 that supplies power to the site monitor function in response to an instruction from the instruction acquiring unit 306C. For example, the activating/terminating unit 307C acquires the charging state of the battery 64, that is, the remaining capacity C (an example of the suppliable power amount) and determines whether the remaining capacity C exceeds a predetermined threshold value Cth1 (an example of a first threshold value). The predetermined threshold value Cth1 is predefined as the minimum remaining capacity necessary to ensure activation of the site monitor function and continued operation for a certain period of time after activation. The predetermined threshold value Cth1 may also be varied depending on the period during which the site monitoring is performed (e.g., the period from the start time to the termination time) included in the site monitor instruction. The remaining capacity C of the battery 64 may then be acquired from a battery sensor mounted to the terminal of the battery 64, or may be calculated from a voltage sensor or a current sensor that measures the voltage or current of the battery 64.

A site monitoring unit 110 may be in a mode that allows power to be supplied from other power sources, instead of or in addition to the battery 64, while the excavator 100 is stopped. Other power sources may include a replaceable primary battery. Other power sources may also include a capacitor that is chargeable by the power of a predetermined generator of the excavator 100 (e.g., a generator that generates power from the motive energy of the engine 11 during the operation of the excavator 100). Other power sources may also include predetermined power generating means (e.g., a fuel cell, an alternator that generates power from the motive energy of the engine 11 that is temporarily activated while the excavator 100 is stopped).

The activating/terminating unit 307C (an example of the activating unit) activates a part or all of the site monitoring unit 110 corresponding to the site monitor function that is terminated, depending on the setting content in the site monitor instruction, when the remaining capacity C of the battery 64 exceeds the predetermined threshold value Cth1. The site monitoring unit 110 (an example of the monitoring unit) includes, for example, the imaging apparatus 40 (the cameras 40B, 40L, and 40R), the monitor image generating unit 301C, the detecting unit 302C, and the transmitting unit 305C. Specifically, the activating/terminating unit 307C transmits an instruction signal to the relay 42 (the relays 42B, 42L, and 42R), to establish a connected state, thereby starting the power supply from the battery 64 to the imaging apparatus 40 (the cameras 40B, 40L, and 40R) and activating the imaging apparatus 40. In this case, the activating/terminating unit 307C may activate a part of the imaging apparatus (one or two cameras of the cameras 40B, 40L, and 40R) by connecting one or two of the relays 42B, 42L, and 42R according to the setting content in the site monitor instruction. The activating/terminating unit 307C activates the monitor image generating unit 301C, the detecting unit 302C, and the transmitting unit 305C by performing a predetermined process inside the surrounding monitor controller 30C.

For example, the activating/terminating unit 307C has a regular mode for operating the entire site monitoring unit 110 and an energy saving mode for operating only a portion of the site monitoring unit 110 and limiting the power consumption of the site monitoring unit 110 to be relatively low. When the remaining capacity C of the battery 64 exceeds the predetermined threshold value Cth1, the activating/terminating unit 307C may activate the site monitoring unit 110 in a regular mode when the remaining capacity C of the battery 64 is relatively high, and may activate the site monitoring unit 110 in an energy saving mode when the remaining capacity C of the battery 64 is relatively low. Further, the activating/terminating unit 307C may shift from the regular mode to the energy saving mode when the remaining capacity C of the battery 64 becomes relatively low after activating the site monitoring unit 110 in the regular mode.

When the surroundings image generated by the monitor image generating unit 301C is not included in the surrounding status information transmitted from the excavator 100 to the support apparatus 200, the monitor image generating unit 301C may be omitted from the site monitoring unit 110. For example, when only information concerning the presence or absence of detection of the monitor target by the detecting unit 302C is to be transmitted to the management apparatus 300 as the surrounding status information, the monitor image generating unit 301C may be omitted from the site monitoring unit 110. The site monitoring unit 110 may also include the alarm output unit 303C. Thus, for example, when a person (a suspicious person) as the monitor target is detected by the detecting unit 302C during the termination of the excavator 100, an alarm may be output by the voice sound output apparatus 52 and the presence of the suspicious person may be reported to the surroundings of the worksite.

On the other hand, when the remaining capacity C of the battery 64 is less than or equal to the predetermined threshold value Cth1, the activating/terminating unit 307C determines that the site monitor function cannot be activated and does not activate the site monitor function. The activating/terminating unit 307C (an example of a first external reporting unit) may transmit a report indicating that the site monitor function cannot be activated (hereinafter, an "activation disability report"), as information concerning whether the site monitoring unit 110 can be activated, to the support apparatus 200 via the management apparatus 300 through the communication device 60. This allows the user to recognize, through the support apparatus 200, a status where the site monitor function of the excavator 100 cannot be activated.

The activating/terminating unit 307C may attempt to activate the site monitor function that is terminated without confirming various states of the battery 64. When the site monitor function cannot be activated as a result of the attempt, the activating/terminating unit 307C may transmit an activation disability report to the support apparatus 200 via the management apparatus 300 through the communication device 60. When the site monitor function can be activated, the activating/terminating unit 307C may transmit a report indicating that the site monitor function can be activated, to the support apparatus 200 via the management apparatus 300 through the communication device 60. The activating/terminating unit 307C may transmit information regarding various states of the battery 64 (for example, the remaining capacity C corresponding to a charged state, hereinafter referred to as "power state information") as information regarding whether the site monitor function (the site monitoring unit 110) can be activated, to the support apparatus 200 via the management unit 300. This is because there are cases where the user is able to determine whether it is possible to activate the site monitor function, by confirming information about various states of the battery 64, through the support apparatus 200.

Further, the activating/terminating unit 307C (an example of a terminating unit) terminates the site monitoring unit 110 that has been activated while the excavator 100 is stopped, when a predetermined condition is satisfied after the activation of the site monitoring unit 110.

For example, when a predetermined termination timing has been reached, specifically, when a site monitor termination instruction is received by the communication device 60 via the management apparatus 300 or when the termination time set in the site monitor instruction has been reached, the activating/terminating unit 307C terminates the site monitoring unit 110.

For example, the activating/terminating unit 307C determines whether the remaining capacity C of the battery 64 has dropped to the predetermined threshold value Cth2 or less (<Cth1). The activating/terminating unit 307C terminates the site monitoring unit 110 irrespective of the termination timing when the remaining capacity C of the battery 64 has dropped to the predetermined threshold value Cth2 or less (an example of a second threshold value). If the remaining capacity C of the battery 64 is too low, the engine 11 may not be able to start at the next activation time of the excavator 100. The activating/terminating unit 307C (an example of a second external reporting unit) transmits a report indicating that the site monitor function (the site monitoring unit 110) is not continuously operable (hereinafter referred to as a "monitor continuity disability report") as information concerning whether the site monitoring unit 110 is continuously operable, to the support apparatus 200 via the management apparatus 300 through the communication device 60. This allows the user to recognize, through the support apparatus 200, the status where the site monitor function of the excavator 100 is unable to continue to operate and the site monitor function will be terminated.

Also when the site monitor function (the site monitoring unit 110) is continuously operable, the activating/terminating unit 307C may transmit a report indicating that the site monitor function is continuously operable to the support apparatus 200 via the management apparatus 300 through the communication device 60. The activating/terminating unit 307C may transmit information regarding various states of the battery 64 (for example, the remaining capacity corresponding to a charged state) as information regarding whether the site monitor function (the site monitoring unit 110) is continuously operable, to the support apparatus 200 via the management apparatus 300. This is because there are cases where the user is able to determine whether the site monitor function can continue to operate, by confirming information about various states of the battery 64, through the support apparatus 200. The activating/terminating unit 307C may report, to the support apparatus 200 via the management apparatus 300, information about whether the site monitoring unit 110 is operable, regardless of whether the site monitoring unit 110 is activated or whether the site monitoring unit 110 is continuously operable. For example, the activating/terminating unit 307C may report, to the support apparatus 200 via the management apparatus 300, information regarding whether the site monitoring unit 110 is operable in accordance with an acquisition request received from the support apparatus 200 via the management apparatus 300 through the communication device 60. Specifically, the activating/terminating unit 307C may report, to the support apparatus 200 via the management apparatus 300, the remaining capacity C of the battery 64, the operable time of the site monitor function (the site monitoring unit 110) based on the remaining capacity C of the battery 64, and the like. In this case, the support apparatus 200 displays the information reported from the excavator 100 via the management apparatus 300, on the display apparatus 240. The user may perform an operation, through an operation apparatus 230, to request the display of the remaining capacity C of the battery 64 or the operable time of the site monitor function, thereby transmitting a request for acquiring this information, from the support apparatus 200 via the management apparatus 300 to the excavator 100. For example, the support apparatus 200 may display the remaining capacity C of the battery 64 or the operable time of the site monitor function on the display apparatus 240, by a bar graph and the like. This allows the user to easily confirm information as to whether the site monitor function is operable, through the support apparatus 200.

<Configuration of Support Apparatus>

The support apparatus 200 includes the control apparatus 210, a communication device 220, the operation apparatus 230, and a display apparatus 240.

The control apparatus 210 controls various operations of the support apparatus 200. The control apparatus 210 includes an instruction unit 2101, an information acquiring unit 2102, and a reporting unit 2103 as functional units that are implemented, for example, by executing one or more programs stored in a ROM or a non-volatile auxiliary storage device, on the CPU. The control apparatus 210 includes a storage unit 2100 as a storage area defined in a non-volatile internal memory, for example, an auxiliary storage device.

The communication device 220 is any device that communicates with the outside of the support apparatus 200, such as the management apparatus 300, through the communication network NW. The communication device 220 is a mobile communication module that corresponds to a mobile communication standard such as LTE, 4G, 5G, etc.

The operation apparatus 230 accepts various operations performed with respect to the support apparatus 200 by a user. The operation apparatus 230 includes, for example, a hardware operation unit including buttons, a keyboard, a mouse, a touchpad, and a touch panel mounted on the display apparatus 50. The operation apparatus 230 may be a combination of a hardware operation unit, such as a touch panel mounted on the display apparatus 240 and a software operation unit, such as a button icon on an operation screen displayed on the display apparatus 240.

The display apparatus 240 displays various kinds of information images. The display apparatus 240 may be, for example, a liquid crystal display or an organic EL display.

The instruction unit 2101 (an example of a transmitting unit) transmits a site monitor instruction, which is addressed to the excavator 100, to the management apparatus 300 through the communication device 220 when a predetermined operation by a user is performed through the operation apparatus 230.

Figure 7A:
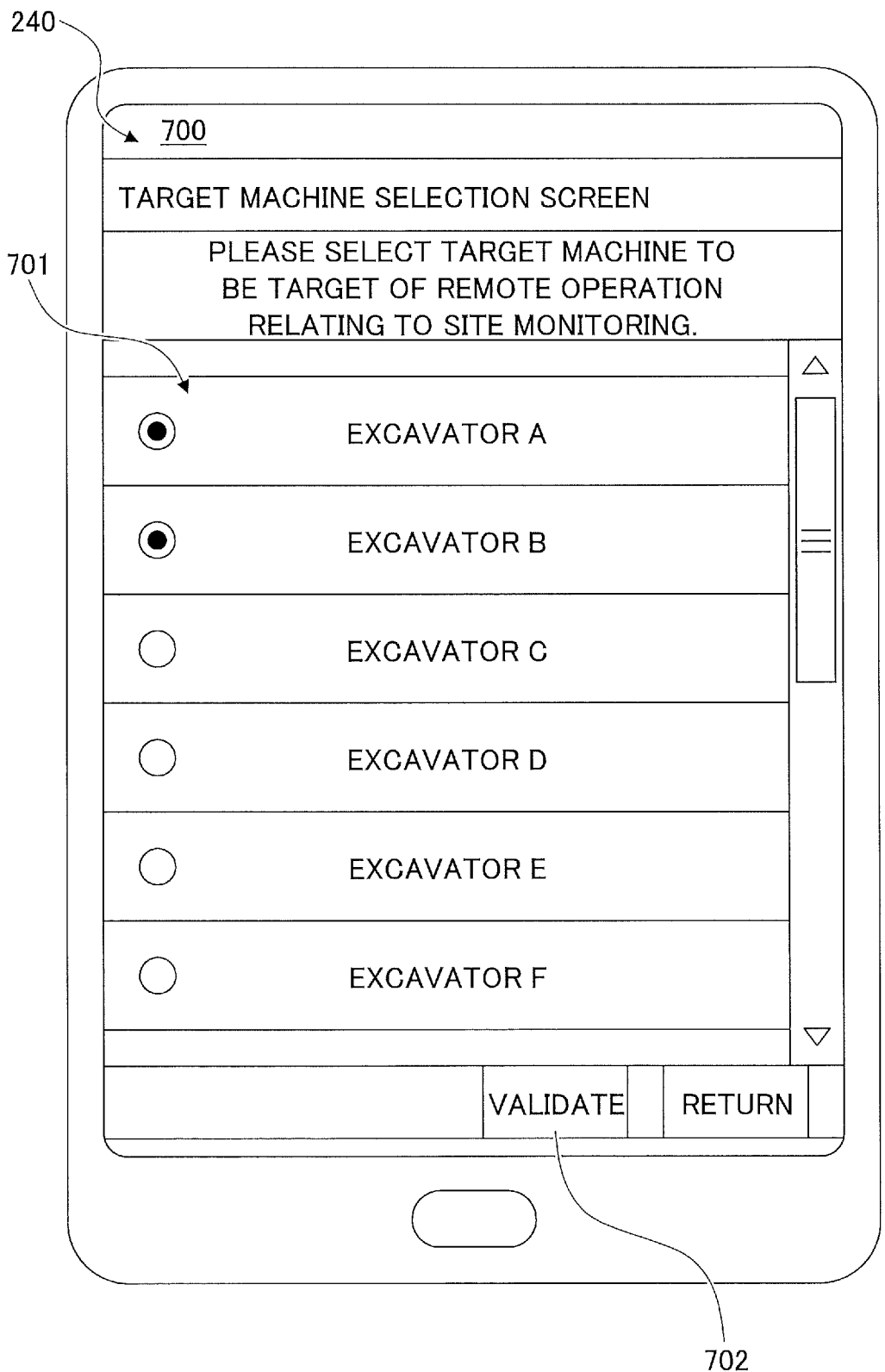
FIG. 7A is a diagram illustrating an example of an instruction transmission operation screen of a support apparatus.
Figure 7B:
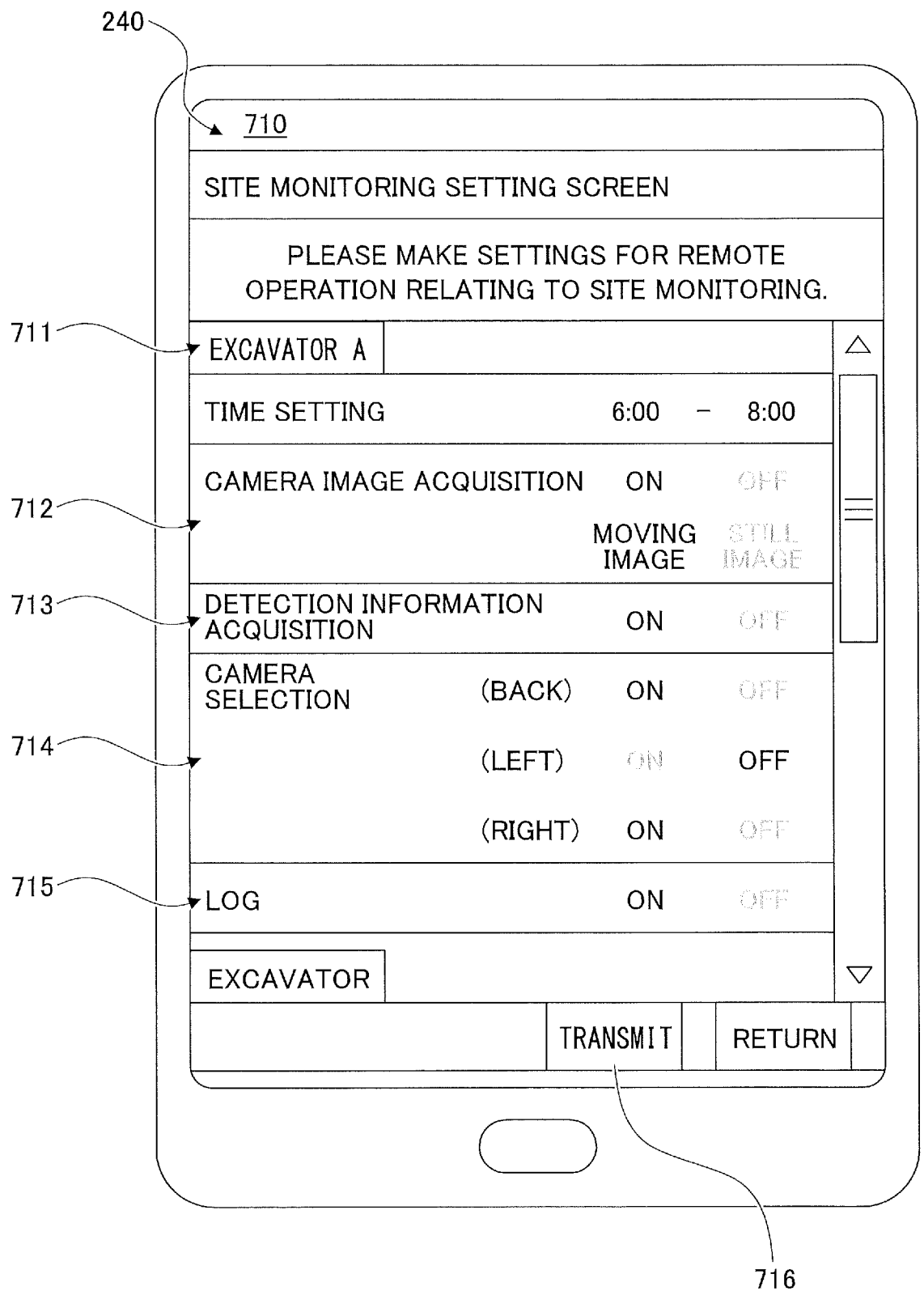
FIG. 7B is a diagram illustrating an example of an instruction transmission operation screen of a support apparatus.

For example, FIG. 7 (FIGS. 7A and 7B) illustrates an example of an operation screen for transmitting a site monitor instruction (hereinafter referred to as the "instruction transmission operation screen") displayed on the display apparatus 240. Specifically, FIG. 7A is a diagram illustrating an example of an operation screen (instruction transmission operation screen 700) for selecting the excavator 100 that is the destination of the site monitor instruction, that is, an operation screen for selecting the excavator 100 that is the target of a remote operation. FIG. 7B is a diagram illustrating an example of an operation screen (an instruction transmission operation screen 710) for making settings of a specific site monitor instruction.

First, as illustrated in FIG. 7A, a candidate list 701 of the excavators 100 for which remote operations for surrounding monitoring (site monitoring) is possible through the support apparatus 200, is displayed in the instruction transmission operation screen 700. The candidate list 701 is displayed based on remote operation machine information 2100A stored in the storage unit 2100. The remote operation machine information 2100A in the storage unit 2100 includes the latest information regarding the excavators 100 which can be remotely operated for site monitoring by the support apparatus 200, and is updated accordingly by the latest remote operation machine information delivered from the management apparatus 300 to the support apparatus 200.

The user scrolls the candidate list 701 through a touch panel and the like mounted on the display apparatus 240. This allows the user to find the excavator 100 to be the target of remote operation.

The user then applies a check mark (a circle in the figure) to the left end of the item field corresponding to the excavator 100 to be the target of remote operation among the excavators 100 in the candidate list 701 through a touch panel and the like. The excavator 100 to be the target of remote operation, i.e., the excavator 100 that is the destination of the site monitor instruction, may be selected. At this time, the excavator 100 selected may be one or more excavators. In this example, two excavators 100 including an "excavator A" and an "excavator B" are selected.

Finally, the user operates a button icon 702, to which the text information of the "validate" is appended, at the lower end of the instruction transmission operation screen 700, through a touch panel and the like. This allows the user to validate the selection of the excavator 100 that is the target of the remote operation, that is, the excavator 100 that is the destination of the site monitor instruction, and to cause the display contents of the display apparatus 240 to transition to the instruction transmission operation screen 710.

Subsequently, as illustrated in FIG. 7B, the instruction transmission operation screen 710 includes various setting fields 711 to 715 relating to the site monitor instruction for the selected "excavator A."

In a setting field 711 to which the text information of "time setting" is appended, the time period and the like during which the excavator 100 (in this example, the "excavator A") performs site monitoring, is set. That is, in the setting field 711, the user can make a reservation for surrounding monitoring by the excavator 100 based on a site monitor instruction. Thus, the excavator 100 can automatically start surrounding monitoring according to the reservation contents. In this example, the start time ("6:00") and the termination time ("8:00") are set in the setting field 711. In the setting field 711, the start time and the time period during which the surrounding monitoring by the excavator 100 is performed (e.g., 3 hours) may also be set. Further, in the setting field 711, instead of the start time, the termination time, and the like, contents may be set to indicate that the surrounding monitoring by the excavator 100 starts immediately by transmitting a site monitor instruction. That is, in the setting field 711, the user can set that the surrounding monitoring by the excavator 100 is to start immediately. Further, in the setting field 711, a plurality of time periods in which the excavator 100 performs site monitoring, may be set. For example, in the setting field 711, a specific plurality of time periods as defined by the start time and the termination time, etc., may be set, or the start time of the initial site monitoring, the time period during which the site monitoring is performed (for example, 30 minutes), and the periodic time interval of start timings (e.g., hourly) may be set. In the setting field 711, it may be possible to set a time period and the like during which the excavator 100 performs site monitoring, with respect to a plurality of days. For example, in the setting field 711, a plurality of particular dates may be selectable, or a plurality of dates that are periodically repeated may be selectable, such as every day, on a particular weekday (e.g., Monday to Friday), or on a particular day of every month. This improves the user's convenience by eliminating the need to perform the operation of transmitting the site monitor instruction through the support apparatus 200, each time the excavator 100 is to perform the site monitoring.

Note that in the case where it is assumed that the excavator 100 is to start site monitoring immediately upon receipt of the site monitor instruction (enabling the site monitor function), in the setting field 711, the timing (e.g., a particular date and time) at which the site monitor instruction is to be transmitted and the time period during which the surrounding monitoring is to be performed (e.g., 3 hours, etc.) may be set. In this case, similar to the above, in the setting field 711, a plurality of dates and times at which the site monitor instruction is to be transmitted, may be set. For example, in the setting field 711, a specific plurality of dates and times at which the site monitor instruction is to be transmitted may be specified, the periodic timing interval (e.g., hourly) at which the site monitor instruction is to be transmitted, and the like may be set. Accordingly, similar to the above, the user does not need to perform the operation of transmitting the site monitor instruction through the support apparatus 200 every time the excavator 100 is to perform surrounding monitoring, thereby improving the convenience of the user.

In a setting field 712 to which the text information of "camera image acquisition" is appended, a setting relating to the acquisition of a captured image captured by the imaging apparatus 40 of the excavator 100 is made. Specifically, in the setting field 712, the presence or absence of acquisition of a captured image captured by the imaging apparatus 40 and the type of a captured image (moving image or still image) to be acquired, may be set. In the setting field 712, in this example, captured image acquisition ("ON") to be captured by the imaging apparatus 40 is present, and the type of the captured image to be acquired is set to "moving image".

In a setting field 713 to which the text information of "detection information acquisition" is appended, information concerning the monitor target in the surroundings of the excavator 100, that is, information concerning the presence or absence of acquisition of information concerning the presence or absence of detection of the monitor target, is set. In the setting field 713, in this example, acquisition of information on the presence or absence of detection of the monitor target, is set to present ("ON").

In a setting field 714 to which the text information of "camera selection" is appended, the camera to acquire a captured image, among the cameras 40B, 40L, and 40R, is selected. In the setting field 714, in this example, the camera 40B ("back") and the camera 40R ("right") are selected ("ON") as the camera for acquiring a captured image, while the camera 40L is not selected ("OFF") as the camera for acquiring a captured image.

In a setting field 715 to which the text information of the "log" is appended, a setting is made as to whether to have the excavator 100 or the management apparatus 300 record the surrounding status information transmitted from the excavator 100 to the support apparatus 200 as a log. In the setting field 715, in this example, a setting is made to cause the surrounding status information transmitted from the excavator 100 to the support apparatus 200 to be recorded as a log ("ON"). In this case, for example, the log may be stored in the storage unit 308C of the excavator 100 or a storage unit 3100 described below of the management apparatus 300.

Further, the setting fields 711 to 715 relating to "excavator B" may be displayed on the instruction transmission operation screen 710 by performing a scrolling operation and the like.

The user appropriately makes settings in the setting fields 711 to 715 on the excavator 100 (the excavator A and the excavator B in this example) selected on the instruction transmission operation screen 700, through a touch panel and the like. The user operates a button icon 716 to which the text information of "transmit" is appended at the lower end of the instruction transmission operation screen 710 through a touch panel and the like. Accordingly, the instruction unit 2101 transmits the site monitor instruction including the identification information of the excavator 100 selected in the instruction transmission operation screen 700 and the setting contents of the setting fields 711 to 715 for each of the selected excavators 100, to the management apparatus 300 through the communication device 220. As described above, the user can perform an operation of transmitting the site monitor instruction from the support apparatus 200 to the excavator 100 (in this example, the "excavator A" and the "excavator B") via the management apparatus 300 through the instruction transmission operation screens 700 and 710.

Returning to FIGS. 1 to 3, the instruction unit 2101 may transmit a site monitor termination instruction that is addressed to the excavator 100, to the management apparatus 300 through the communication device 220, when a predetermined operation by a user is performed through the operation apparatus 230. Accordingly, the site monitoring by the excavator 100 can be terminated regardless of the setting content (time setting) in the above-described site monitor instruction.

The information acquiring unit 2102 (an example of the first acquiring unit) acquires (receives) the surrounding status information transmitted from the excavator 100 via the management apparatus 300 through the communication device 220.

Further, the information acquiring unit 2102 (an example of the second acquiring unit) acquires (receives) information (for example, an activation disability report) concerning whether the site monitor function (the site monitoring unit 110) of the excavator 100 can be activated, that is transmitted from the excavator 100 via the management apparatus 300, through the communication device 220. The information acquiring unit 2102 acquires information (for example, a monitor continuity disability report) concerning whether the site monitor function (the site monitoring unit 110) of the excavator 100 is continuously operable, transmitted from the excavator 100 via the management apparatus 300 through the communication device 220. As described above, the information acquiring unit 2102 may acquire information on various states of the battery 64, that is, information on the power state (for example, the remaining capacity C) as information on whether the site monitor function of the excavator 100 can be activated and information on whether the site monitor function can be continuously operated.

The reporting unit 2103 (an example of the first reporting unit and the second reporting unit) reports, to the user, various kinds of information such as the surrounding status information acquired by the information acquiring unit 2102. Specifically, the reporting unit 2103 reports (provides), to the user, various kinds of information such as the surrounding status information by causing the display apparatus 240 to display the information. The reporting unit 2103 may report, to the user, various kinds of information, such as the surrounding status information, by voice sound. Accordingly, the user can confirm various kinds of information such as the surrounding status information that is returned from the excavator 100 via the management apparatus 300 in accordance with the site monitor instruction.

Figure 8:
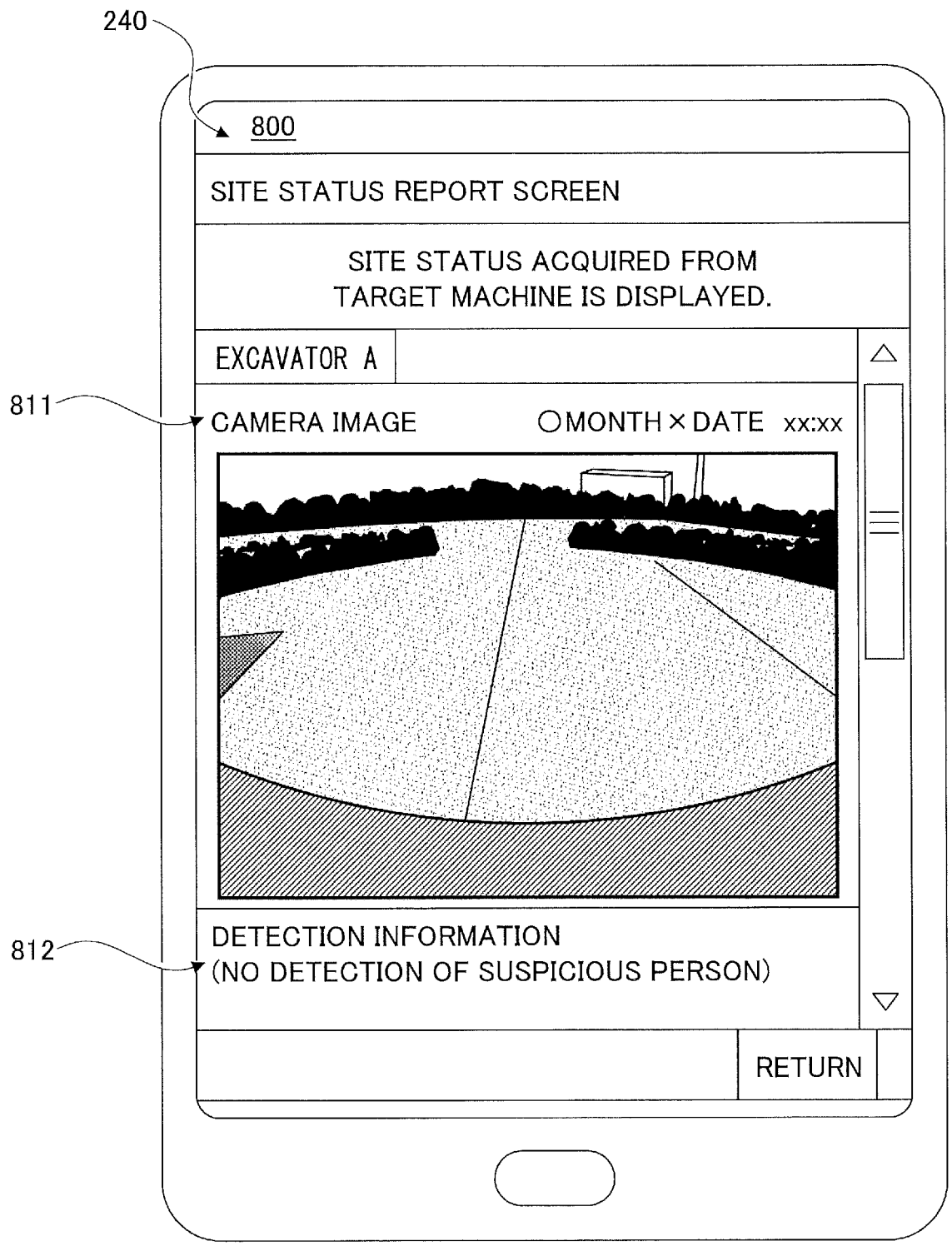
FIG. 8 is a diagram illustrating an example of a surrounding status report screen of a support apparatus.

For example, FIG. 8 is a diagram illustrating an example (a site status report screen 800) of a screen (hereinafter, a "site status report screen") for reporting the surrounding status information to a user, displayed on the display apparatus 240 of the support apparatus 200.

The site status report screen 800 displays the surrounding status information acquired from the excavator 100 ("excavator A") to which the site monitor instruction is transmitted through the instruction transmission operation screens 700 and 710 of FIGS. 7A and 7B.

Specifically, a captured image captured by the imaging apparatus 40 of the excavator 100 (the "excavator A") is displayed in a display field 811 to which the text information of the "camera image" is appended. The captured image in the display field 811 may be, for example, a captured image representing the current appearance (substantially real-time) of the surroundings of the excavator 100, or a captured image representing the appearance of the surroundings of the excavator 100 at some point back in the past.

Further, in a display field 812 to which the text information of the "detection information" is appended, information relating to whether the monitor target (specifically, a suspicious person) is detected in the surroundings of the excavator 100, is displayed. In this example, in the display field 812, text information ("no detection of suspicious person") indicates that no suspicious person is included in the captured image displayed in the display field 811 and no suspicious person is detected.

In this manner, the user can recognize the status of the worksite outside the work hours by the captured image (the display field 811) captured by the imaging apparatus 40 included in the surrounding status information. Therefore, for example, when it rains before starting the work, the user can transmit a site monitor instruction from the support apparatus 200 to the excavator 100 at the worksite to confirm, with the support apparatus 200, whether the worksite is in a condition where it is possible to perform the work at the worksite without going to the worksite. The user can also confirm whether a monitor target (suspicious person) has entered the worksite outside the work hours by using the information (the display field 812) concerning the presence or absence of detection of the monitor target included in the surrounding status information. Therefore, for example, by transmitting the site monitor instruction specifying a time period at night from the support apparatus 200 to the excavator 100 at the worksite, the user can confirm, with the support apparatus 200, the presence or absence of detection of the monitor target at night and recognize that a suspicious person has entered the worksite.

Figure 9:
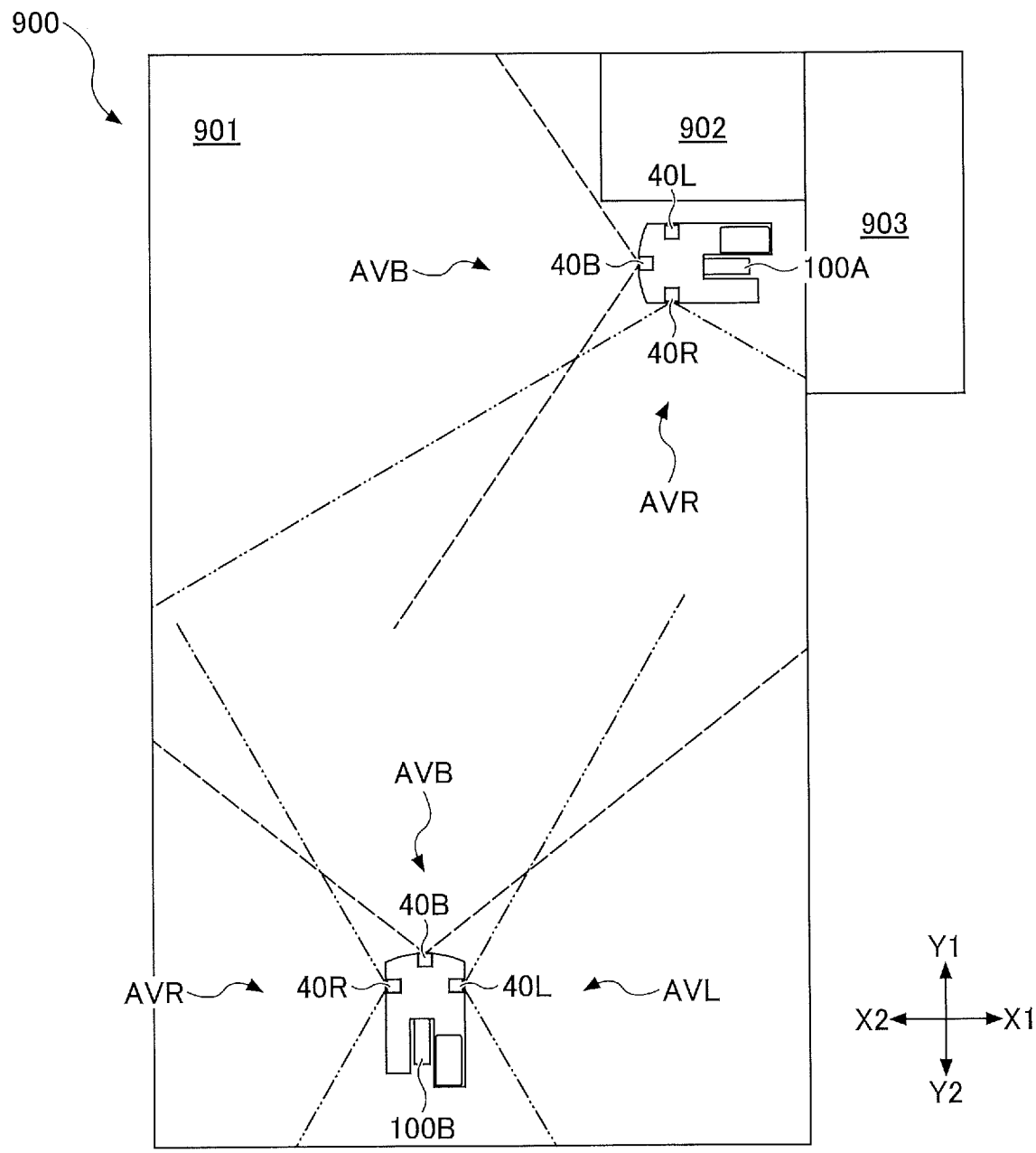
FIG. 9 is a diagram illustrating the layout of an excavator in a parked state at a worksite.

For example, FIG. 9 is a diagram illustrating a parking status of the excavators 100 (excavators 100A and 100B) at a worksite. Hereinafter, in this example, in the drawing, the right direction is referred to as the X1 direction, the left direction is referred to as the X2 direction, the upper direction is referred to as the Y1 direction, and the lower direction is referred to as the Y2 direction.

In this example, the excavator 100A is parked, with the rear of the upper turning body 3 facing the X2 direction, near buildings 902 and 903 installed in the corner corresponding to the ends of the X1 and Y1 directions of a substantially rectangular premise 901 with the Y1 and Y2 directions of a worksite 900 being the long sides.

By activating the cameras 40B and 40R while the excavator 100A is stopped, the cameras 40B and 40R can acquire captured images in which the status of the approximately half of the region in the Y1 direction of the premise 901 can be confirmed, by the imaging possible ranges AVB and AVR of the cameras 40B and 40R.

In this example, the excavator 100B is parked near the center of the X1 and X2 directions at the end of the premise 901 in the Y2 direction with the rear of the upper turning body 3 facing the Y1 direction.

When the cameras 40B, 40L, and 40R are activated while the excavator 100B is stopped, the cameras 40B, 40L, and 40R can acquire captured images in which the status of the approximately half of the region in the Y2 direction of the premise 901 can be confirmed, by imaging possible ranges AVB, AVL, and AVR of the cameras 40B, 40L, and 40R.

Accordingly, in this example, the user can confirm the status across the entire worksite 900 by having the site monitor instructions addressed to the excavator 100A and the excavator 100B be transmitted from the support apparatus 200.

As described above, the user, such as the worker or the supervisor, can confirm the overall status of the worksite from the outside by having a site monitor instruction be transmitted to the excavator 100 from the support apparatus 200 in accordance with the parking status of one or more excavators 100 at the worksite. Further, the user can confirm the overall status of the worksite from the outside based on the surrounding status information transmitted from the excavator 100 to the support apparatus 200 via the management apparatus 300, by appropriately arranging the one or more excavators 100 at the worksite.

Returning to FIGS. 1 to 3, the user can confirm the status of the worksite where work is being carried out, by a captured image captured by the imaging apparatus 40 included in the surrounding status information. Thus, for example, a user, such as a supervisor, who is responsible for a plurality of worksites, can confirm, with the support apparatus 200, the status of the worksite where work is being carried out at a geographically distant location, by having the support apparatus 200 transmit a site monitor instruction to the excavator 100 at the worksite at a geographically distant location. Further, the user can confirm whether a monitor target (worker) has entered the monitor area close to the excavator 100 at the worksite where work is being carried out and the frequency of the entry, based on the information on the presence or absence of detection of the monitor target included in the surrounding status information. Thus, for example, a user, such as a supervisor, who is responsible for a plurality of worksites, can confirm, with the support apparatus 200, the safety status of a worksite where work is being carried out at a geographically distant location, by having the support apparatus 200 transmit a site monitor instruction to the excavator 100 at the worksite at a geographically distant location. Accordingly, the user may communicate a report to evoke attention to a worksite in which a worker enters the monitor area close to the excavator 100 at a high frequency, or the user may go to the worksite to directly evoke attention.

<Configuration of Management Apparatus>

The management apparatus 300 includes the control apparatus 310 and a communication device 320.

The control apparatus 310 controls various operations of the management apparatus 300. The control apparatus 310 includes a relay unit 3101 as a functional unit implemented by executing one or more programs stored in, for example, a ROM or a non-volatile auxiliary storage device on the CPU. The control apparatus 310 includes the storage unit 3100 as a storage area defined in a non-volatile internal memory, for example, an auxiliary storage device.

The communication device 320 is any device that communicates with the outside of the management apparatus 300, such as the excavator 100 and the support apparatus 200, through the communication network NW.

The relay unit 3101 relays communication between the excavator 100 and the support apparatus 200 through the communication device 320. For example, when the relay unit 3101 receives the site monitor instruction from the support apparatus 200 through the communication device 320, the relay unit 3101 transmits (transfers) the site monitor instruction to the excavator 100 that is the destination set in the site monitor instruction. For example, when the surrounding status information and the like is received from the excavator 100 through the communication device 320, the relay unit 3101 transmits (transmits) the surrounding status information and the like to the support apparatus 200 that is the destination set (appended) in the surrounding status information and the like.

When the surrounding status information transmitted from the excavator 100 to the support apparatus 200 is received through the communication device 320, the control apparatus 310 may store the surrounding status information as log information in the storage unit 3100. Thus, the user can access the management apparatus 300 and confirm the log information by a predetermined method using the support apparatus 200.

The storage unit 3100 stores candidate terminal information 3100A and machine/terminal association information 3100B.

The candidate terminal information 3100A is information about the candidate support apparatus 200 that performs a remote operation for site monitoring of the excavator 100, which is registered through the support apparatus 200 or by the management apparatus 300. The candidate terminal information 3100A, when updated, is transmitted to the excavator 100 through the communication device 320. This allows the candidate terminal information 3081C of the excavator 100 to be maintained in the latest state.

The machine/terminal association information 3100B is information about the association relationship between the excavator 100 and the support apparatus 200 that is permitted to perform remote operation for site monitoring. The machine/terminal association information 3100B is updated based on information about the permitted support apparatus 200, reported by the excavator 100 each time the remote operation of the site monitoring by the support apparatus 200 is permitted at the excavator 100. For example, based on the machine/terminal association information 3100B, information about the excavator 100 for which remote operation for surrounding monitoring is permitted to each support apparatus 200, i.e., remote operation machine information, may be generated. Accordingly, every time the machine/terminal association information 3100B is updated, new remote operation machine information is generated and transmitted to the support apparatus 200. This allows the remote operation machine information 2100A stored in the storage unit 2100 of the support apparatus 200 to be updated and to be maintained in the latest state.

<Detailed Operation of Site Monitoring System>

Figure 10A:
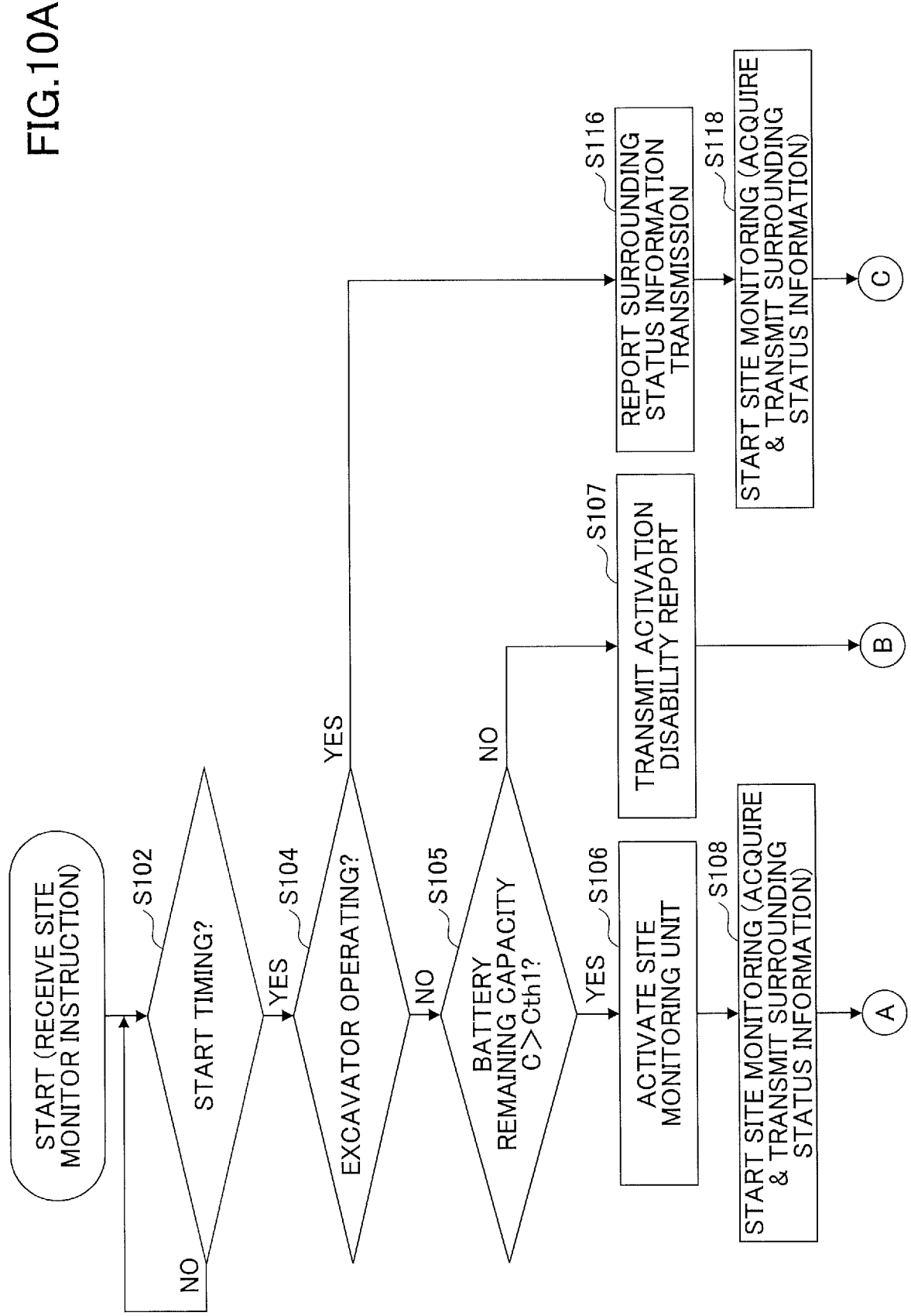
FIG. 10A is a flowchart schematically illustrating an example of the operation of a site monitoring system.

Referring now to FIG. 10 (FIGS. 10A to 10D), the operation of the site monitoring system SYS will be described in detail.

<Process Flow by Surrounding Monitor Controller of Excavator>

FIGS. 10A and 10B are flowcharts schematically illustrating one example of a process for site monitoring by the surrounding monitor controller 300 of the excavator 100. The process according to the flowchart is executed when the communication device 60 receives the site monitor instruction from the support apparatus 200 via the management apparatus 300.

In step S102, the instruction acquiring unit 306C acquires the site monitor instruction from a receiving buffer and the like, and determines whether it is the timing for starting the surrounding monitoring based on the setting contents of the site monitor instruction. Specifically, the instruction acquiring unit 306C determines whether the start time of the time setting included in the site monitor instruction indicates a content to start immediately, or whether the current time has reached the start time of the time setting included in the site monitor instruction. The instruction acquiring unit 306C proceeds to step S104 when it is the start timing of the surrounding monitoring, and otherwise, the instruction acquiring unit 306C waits until the start timing of surrounding monitoring is reached (the process of this step is repeated).

In step S104, the instruction acquiring unit 306C determines whether the excavator 100 is in operation (that is, whether the engine 11 is in operation). When the excavator 100 is not in operation, that is, when the excavator 100 is stopped, the instruction acquiring unit 306C proceeds to step S105, and when the excavator 100 is in operation, the instruction acquiring unit 306C proceeds to step S116.

In step S105, the activating/terminating unit 307C is activated in response to an instruction from the instruction acquiring unit 306C and determines whether the remaining capacity C of the battery 64 exceeds the predetermined threshold value Cth1. When the remaining capacity C of the battery 64 exceeds the predetermined threshold value Cth1, the activating/terminating unit 307C proceeds to step S106. On the other hand, when the remaining capacity C of the battery 64 does not exceed the predetermined threshold value Cth1, that is, the remaining capacity C is less than or equal to the predetermined threshold value Cth1, the activating/terminating unit 307C proceeds to step S107 and transmits an activation disability report to the support apparatus 200 through the communication device 60 via the management apparatus 300 to terminate the current process.

In step S106, the activating/terminating unit 307C activates the site monitoring unit 110 in accordance with the setting contents of the site monitor instruction acquired by the instruction acquiring unit 306C. For example, when only some of the cameras 40B, 40L, and 40R are selected as the cameras to acquire captured images in the site monitor instruction (for example, only some of the cameras indicated in the setting field 714 in the instruction transmission operation screen 710 of FIG. 7B are set to "ON"), the activating/terminating unit 307C may activate only the selected cameras. Further, for example, the activating/terminating unit 307C may not activate the detecting unit 302C when the acquisition of information on the presence or absence of detection of the monitor target is not requested in the site monitor instruction (for example, the setting field 713 of the instruction transmission operation screen 710 illustrated in FIG. 7B is set to "OFF"). Further, for example, when acquisition of the surroundings image generated by the monitor image generating unit 301C is not requested in the site monitor instruction, the activating/terminating unit 307C may not activate the monitor image generating unit 301C. Thus, only the functions necessary for acquiring the surrounding status information and transmitting the surrounding status information to the support apparatus 200 are activated, and, therefore, wasteful energy consumption of the excavator 100 can be prevented (specifically, a reduction in the remaining capacity of the battery 64). Further, even when the site monitoring unit 110 of the excavator 100 is activated, the stopped state of the excavator 100 is maintained and the engine 11 is not started. Therefore, for example, it is possible to prevent a situation where the engine 11 is started early in the morning or at night in which noise problems occur. Further, it is possible to prevent a situation in which various operation elements of the excavator 100 (specifically, the lower traveling body 1, the upper turning body 3, and the attachment, etc.) are operated in the absence of an operator and the like in the excavator 100, so that the safety of the excavator 100 can be ensured.

In step S106, the activating/terminating unit 307C may activate not only the site monitoring unit 110 but also all of the functions of the excavator 100. That is, the activating/terminating unit 307C may activate the excavator 100 by starting the engine 11 or starting the power supply from a battery as a power source or from an external commercial power source. In particular, in the case where the excavator 100 is an electric excavator, the noise of the engine 11 is very low and energy loss is relatively low, so that an electric excavator is compatible with a configuration in which all of the functions are activated.

In step S108, the site monitoring unit 110 starts the site monitoring according to the setting contents of the site monitor instruction. Specifically, the site monitoring unit 110 acquires the surrounding status information corresponding to the setting contents of the site monitor instruction and starts a process of transmitting the surrounding status information addressed to the support apparatus 200, to the management apparatus 300 through the communication device 60.

In step S110, the activating/terminating unit 307C determines whether the termination timing of the site monitoring has been reached. Specifically, the activating/terminating unit 307C determines whether the current situation corresponds to either the termination time set in the site monitor instruction has been reached, or that the site monitor termination instruction has been received from the support apparatus 200 via the management apparatus 300 by the communication device 60. The activating/terminating unit 307C proceeds to step S112 when the termination timing of the site monitoring has not been reached, and proceeds to step S114 when the termination timing of the site monitoring has been reached.

In step S112, the activating/terminating unit 307C determines whether the remaining capacity C of the battery 64 is reduced to the predetermined threshold value Cth2 or less.

When the remaining capacity C of the battery 64 is reduced to the predetermined threshold value Cth2 or less, the activating/terminating unit 307C proceeds to step S113, and otherwise returns to step S110.

In step S113, the activating/terminating unit 307C transmits the monitor continuity disability report to the support apparatus 200 via the management apparatus 300 through the communication device 60.

In step S114, the site monitoring unit 110 terminates the site monitoring (i.e., acquiring the surrounding status information and transmitting the surrounding status information to the support apparatus 200), and the activating/terminating unit 307C terminates the site monitoring unit 110 and terminates the current process.

On the other hand, in step S116, the instruction acquiring unit 306C reports, to the operator and the like through the display apparatus 50, that transmission of the surrounding status information to the outside is started.

In step S118, the site monitoring unit 110 starts the site monitoring in accordance with the setting contents of the site monitor instruction as in step S108.

In step S120, the activating/terminating unit 307C determines whether the termination timing of the site monitoring has been reached, as in step S110. When the activating/terminating unit 307C determines that the termination timing of the site monitoring has been reached, the process proceeds to step S122. When the activating/terminating unit 307C determines that the termination timing of the site monitoring has not been reached, the process of this step is repeated until the termination timing is reached.

In step S122, the site monitoring unit 110 terminates the site monitoring (i.e., acquiring the surrounding status information and transmitting the surrounding status information to the support apparatus 200) and terminates the current process.

<Process Flow by Control Apparatus of Support Apparatus>

FIGS. 10C and 10D are flowcharts schematically illustrating an example of a process for site monitoring by the control apparatus 210 of the support apparatus 200. The process according to this flowchart is executed when an operation of transmitting the site monitor instruction is performed.

In step S202, the instruction unit 2101 transmits the site monitor instruction addressed to the particular excavator 100, to the management apparatus 300 through the communication device 220.

In step S204, the reporting unit 2103 determines whether the current timing is a timing immediately before the start of the site monitoring (for example, a few minutes before the start time set in the site monitor instruction). The reporting unit 2103 proceeds to step S206 when the current timing is a timing immediately before the start of the site monitoring, and otherwise waits until the timing immediately before the start of the site monitoring is reached (repeats the process of this step).

In step S205, the reporting unit 2103 determines whether an activation disability report is received from the support apparatus 200 via the management apparatus 300 through the communication device 220. The reporting unit 2103 proceeds to step S206 when no activation disability report is received. On the other hand, when the reporting unit 2103 receives an activation disability report, the reporting unit 2103 proceeds to step S207, reports to the user that the site monitor function of the excavator 100 cannot be activated through the display apparatus 240, and terminates the current process.

In step S206, the reporting unit 2103 reports a message to the user to confirm about the start of display of the surrounding status information on the display apparatus 240, through the display apparatus 240.

In step S208, when an operation of agreeing to the start of the display of the surrounding status information on the display apparatus 240 is performed through the operation apparatus 230, the information acquiring unit 2102 proceeds to step S210. When an operation of agreeing to the start of the display is not performed, the information acquiring unit 2102 waits until the operation of agreeing to the start of the display is performed (repeats the process of this step).

Note that there may be cases where the operation of agreeing to start the display is not performed until the termination of the reception of the surrounding status information (i.e., the termination of the site monitoring of the excavator 100). For this reason, the process according to this flowchart may be forcibly terminated when the termination time, etc., set by the site monitor instruction, etc., is reached.

In step S210, the information acquiring unit 2102 transmits a signal requesting the surrounding status information from the excavator 100 that is the destination of the site monitor instruction, to the management apparatus 300 through the communication device 220.

In step S212, the information acquiring unit 2102 determines whether reception of the surrounding status information from the excavator 100 has started via the communication device 220, through the communication device 220. When the reception of the surrounding status information from the excavator 100 has started, the information acquiring unit 2102 proceeds to step S214. When the reception has not started, the information acquiring unit 2102 waits until the reception starts (the process of this step is repeated).

Note that there may be cases where the reception of surrounding status information is not started for some reason, for example, a communication failure. Therefore, the information acquiring unit 2102 may retry, a plurality of times, the transmission of a signal requesting the surrounding status information from the excavator 100, to the management apparatus 300 through the communication device 220. The process according to this flowchart may be forcibly terminated after a certain period of time elapses from the transmission of a signal requesting surrounding status information from the excavator 100.

In step S214, the reporting unit 2103 starts to display the surrounding status information acquired by the information acquiring unit 2102, on the display apparatus 240.

In step S215, the reporting unit 2103 determines whether a monitor continuity disability report has been received from the excavator 100 via the management apparatus 300 through the communication device 220. The reporting unit 2103 proceeds to step S216 when a monitor continuity disability report has not been received, and proceeds to step S219 when a monitor continuity disability report has been received.

In step S216, the information acquiring unit 2102 determines whether the reception of the surrounding status information from the management apparatus 300 is terminated, that is, whether the site monitoring in the excavator 100 is terminated. When the reception of the surrounding status information from the management apparatus 300 is terminated, the information acquiring unit 2102 proceeds to step S218, and otherwise returns to step S215.

In step S216, it may be determined whether the termination timing (for example, the termination time, etc.) set in the site monitor instruction has been reached.

In step S218, the information acquiring unit 2102 reports, to the user through the display apparatus 240, that the time period of site monitoring by the excavator 100 has ended and proceeds to step S220.

On the other hand, in step S219, the reporting unit 2103 reports, to the user through the display apparatus 240, that the site monitor function (the site monitoring unit 110) of the excavator 100 cannot be continuously operated, and proceeds to step S220.

In step S220, the reporting unit 2103 terminates the display of the surrounding status information on the display apparatus 240 and terminates the processing.

<Modifications/Variations>

Although the first embodiment has been described in detail above, various modifications and variations can be made within the scope of the gist of the contents of the present embodiment.

For example, in the present embodiment, the site monitor instruction is transmitted from the support apparatus 200 via the management apparatus 300, but the site monitor instruction may be transmitted from the management apparatus 300 (an example of an external apparatus) to the excavator 100 by an operation of an administrator and the like of the management apparatus 300. Further, the site monitor instruction having predefined setting contents may be transmitted from the management apparatus 300 to the excavator 100 by a timer function and the like preset in the management apparatus 300. In this case, the surrounding status information and the like is transmitted from the excavator 100 to the management apparatus 300, and the administrator and the like of the management apparatus 300 can confirm the surrounding status information and the like through a display apparatus of the management apparatus 300 and the like.

In the present embodiment, the surrounding status information is transmitted from the excavator 100 to the support apparatus 200 via the management apparatus 300 in substantially real-time, but the surrounding status information may be provided to the user in a manner that can be confirmed after the fact. For example, instead of or in addition to transmitting the surrounding status information transmitted from the excavator 100 to the support apparatus 200, the management apparatus 300 may transmit a mail address of a user of the support apparatus 200 or a predetermined social networking service (SNS) account. For example, the surrounding monitor information transmitted directly to the support apparatus 200 may usually be erased without the assumption of after the fact confirmation in consideration of capacity such as the ring buffer of the support apparatus 200. On the other hand, a digest version and the like of the surrounding monitor information may be transmitted to the mail address of the user or the address of the SNS, so that the user can confirm the status of the worksite of the excavator 100 after the fact, although there is some time lag.

Further, according to the present embodiment, the excavator 100 (the surrounding monitor controller 30C) acquires the surrounding status information upon receipt of the site monitor instruction on a case-by-case basis, but the excavator 100 (the surrounding monitor controller 30C) may acquire the surrounding status information at a predetermined timing regardless of the site monitor instruction. The excavator 100 (the surrounding monitor controller 30C) may record the acquired surrounding status information as log information in the internal memory (the storage unit 308C) or transmit the acquired surrounding status information to the management apparatus 300 as appropriate. Accordingly, even in the status in which the user forgets to transmit (set) the site monitor instruction from the support apparatus 200 to the excavator 100, the surrounding status information of the worksite is stored in the management apparatus 300. For example, there may be statuses where the site for which the user (supervisor) is responsible has changed, and, therefore, the user forgets to give the site monitor instruction regarding the new site, or the user forgets that the previously-set expiry date regarding the site monitor instruction has passed. Therefore, even in such a status, the user may access the management apparatus 300 through the support apparatus 200 and download the most recently stored surrounding status information of the particular excavator 100 to the support apparatus 200 to confirm the status of the worksite.

In this case, the timing of acquiring the surrounding status information by the excavator 100 (the surrounding monitor controller 30C) may be set by an operator and the like through a predetermined operation screen displayed on the display apparatus 50 of the excavator 100. Further, the timing of acquiring the surrounding status information by the excavator 100 may be set by a user of the support apparatus 200 through a predetermined operation screen displayed on the display apparatus 240 of the support apparatus 200, and the setting contents thereof may be reflected in the excavator 100 via the management apparatus 300.

In this case, as the timing of acquiring the surrounding status information by the excavator 100, a periodical timing of acquiring the surrounding status information may be set, for example, as the same time period once or more every day, the same time period between Monday and Friday every week, and the like. The timing of acquiring the surrounding status information may be set so that the surrounding status information can be acquired as needed (for example, when processing resources of the surrounding monitor controller 30C are relatively available) or at a random timing (for example, when a trigger defined by a predetermined random function is output) when the excavator 100 is stopped.

In this case, the management apparatus 300 may analyze the surrounding status information received from the excavator 100 and monitor the occurrence of a predetermined event (e.g., detection of a suspicious person in a time period during which the worksite is closed). When a predetermined event occurs, the management apparatus 300 may transmit an alert, by a push notification, to the support apparatus 200 capable of transmitting the site monitor instruction to the excavator 100. The alert may also be transmitted to the mail address of the user of the support apparatus 200 or to a predetermined SNS account. Accordingly, the user can recognize the occurrence of a predetermined event regarding the worksite, such as detection of a suspicious person at the worksite where the excavator 100 is parked, even when the site monitor instruction is not transmitted to the excavator 100.

In this case, when a predetermined application has been activated by the support apparatus 200 previously registered as a transmission target, the management apparatus 300 may transmit the surrounding status information received from the excavator 100, to the support apparatus 200 in real-time. This allows the user to confirm the real-time surrounding status information (e.g., the captured image captured by the imaging apparatus 40 representing the surroundings of the excavator 100) by simply activating a predetermined application with the support apparatus 200. At this time, when a predetermined application is activated and a confirmation operation is performed by a user of the support apparatus 200, the management apparatus 300 may transmit the surrounding status information received from the excavator 100 to the support apparatus 200 in real-time. Accordingly, for example, a situation in which unnecessary communication costs are incurred by transmitting the surrounding status information not required by the user in real-time, can be prevented. The management apparatus 300 may transmit the surrounding status information received from the excavator 100 to the support apparatus 200 when a request for acquisition from the support apparatus 200 is received. At this time, the support apparatus 200 may transmit a request for collectively acquiring the surrounding status information of the excavators 100 from which the surrounding status information has not been acquired, according to an operation by a user. The support apparatus 200 may transmit, to the management apparatus 300, a request for acquiring the surrounding status information to be acquired from the management apparatus 300, by indicating a condition to limit the surrounding status information to be acquired to that of a particular time period, a particular type of information, particular meta-information associated with the information, and the like, in accordance with an operation by a user. Accordingly, when the site monitor instruction is not transmitted, the user can access the management apparatus 300 through the support apparatus 200 and have the support apparatus 200 acquire the necessary surrounding status information.

In the present embodiment, the excavator 100 (the surrounding monitor controller 30C) includes both the alarm output unit 303C and the operation limiting unit 3040, but the excavator 100 (the surrounding monitor controller 30C) may include only one of these units. That is, the surrounding monitor controller 30C of the excavator 100 may only perform one of outputting an alarm and limiting the operation of the excavator 100, when a monitor target is detected in a monitor area in a horizontal direction as viewed from the excavator 100.

Further, in the present embodiment, the excavator 100 is configured to hydraulically drive all of various operation elements such as the lower traveling body 1, the upper turning body 3, the boom 4, the arm 5, and the bucket 6, but some of the operation elements of the excavator 100 may be electrically driven. That is, the configuration and the like disclosed in the present embodiment may be applied to a site monitoring system including a hybrid excavator, an electric excavator as described above, and the like.

In the present embodiment, the excavator 100 operates in response to the operation of an operator getting into the cabin 10, but may be remotely operated by input operations received from an external apparatus (e.g., the management apparatus 300) through the communication device 60.

In this case, the excavator 100 (the surrounding monitor controller 30C) may automatically acquire the surrounding status information according to a predetermined condition set by a remote operation from an external apparatus and transmit the surrounding status information to the support apparatus 200 via the management apparatus 300. The predetermined condition may include, for example, in addition to the condition regarding the date as described above, a condition relating to the operation state of the excavator 100, such as "the work by the excavator 100 has been terminated and stopped", as well as a condition relating to the environment state in the surroundings of the excavator 100, such as "the illumination in the surroundings of the excavator 100 has been relatively reduced (at night)".

The excavator 100 may also operate autonomously and perform predetermined work, regardless of the operator's operation or input operation from an external apparatus.

In this case, the excavator 100 (the surrounding monitor controller 30C) may autonomously learn the timing at which the surrounding status information is to be acquired. The excavator 100 may autonomously acquire the surrounding status information at a timing corresponding to the learning result and transmit the information to the support apparatus 200 via the management apparatus 300.

The site monitoring system according to the present embodiment may be applied to a conveying apparatus (for example, a conveying robot) that operates in a factory or an office. For example, depending on the time period, there may be no persons in the factory, office, and the like, and during such a time period, the conveying apparatus may acquire the surrounding status information and transmit the surrounding status information to the support apparatus via the management apparatus. Thus, the security in the time period during which there are no people in the factory or the office, can be improved.

The present embodiment further discloses the following.

(1)

A work machine capable of communicating with the outside, including:
- a sensor configured to acquire information relating to a surrounding status of the work machine; and
- a transmitting unit configured to transmit, to an external apparatus, the information relating to the surrounding status of the work machine, which is acquired by the sensor or generated based on the information acquired by the sensor, in response to an instruction from the external apparatus of the work machine.

(2)

The work machine described in (1), wherein
the sensor includes an imaging apparatus configured to capture an image of a surrounding area of the work machine, and the transmitting unit transmits, to the external apparatus, the captured image of the surrounding area of the work machine captured by the imaging apparatus, in response to the instruction.

(3)

The work machine described in (1) or (2), further including:
- an activating unit configured to activate a monitoring unit including at least the sensor and the transmitting unit, upon receiving the instruction, while the work machine is stopped.

(4)

The work machine described in (3), wherein the activating unit activates only the monitoring unit while maintaining a stopped state of the work machine, upon receiving the instruction, while the work machine is stopped.

(5)

The work machine described in (3) or (4), further including:
- a detecting unit configured to detect a predetermined monitor target within a predetermined range in a surrounding area of the work machine, based on the information acquired by the sensor, wherein
the activating unit activates the detecting unit included in the monitoring unit, in addition to the sensor and the transmitting unit, while the work machine is stopped, and
the transmitting unit transmits, to the external apparatus, information relating to the predetermined monitor target in the surrounding area of the work machine detected by the detecting unit.

(6)

The work machine described in (5), wherein
the transmitting unit transmits, to the external apparatus, information indicating that the predetermined monitor target has been detected in the predetermined range in the surrounding area of the work machine, upon determining that the detecting unit has detected the predetermined monitor target, when the monitoring unit is activated by the activating unit while the work machine is stopped.

(7)

The work machine described in any one of (3) to (6), further including:
- a power source configured to supply power to a device of the work machine including the monitoring unit, wherein
the activating unit activates the monitoring unit when the instruction is received and a remaining capacity of the power source exceeds a first threshold.

(8)

The work machine described in (7), further including:
- a first external reporting unit configured to transmit a report to the external apparatus, wherein
the activating unit does not activate the monitoring unit even when the instruction is received, when the remaining capacity of the power supply is less than or equal to a first threshold value, and
the first external reporting unit transmits the report indicating that the monitoring unit cannot be activated to the external apparatus when the monitoring unit is not activated by the activating unit because the remaining capacity of the power supply does not exceed the first threshold value.

(9)

The work machine described in (7) or (8), further including:
- a terminating unit configured to terminate the monitoring unit upon detecting that the remaining capacity of the power source has decreased to less than or equal to a predetermined second threshold, when the monitoring unit had been activated by the activating unit while the work machine is stopped.

(10)

The work machine described in (9), further including:
- a second external reporting unit configured to transmit, to the external apparatus, a report indicating that the monitoring unit cannot be continuously operated, when the remaining capacity of the power source has decreased to less than or equal to the predetermined second threshold.

(11)

The work machine described in any one of (1) to (10), further including:
- an internal reporting unit configured to report, to an operator, that the information relating to the surrounding status of the work machine will be transmitted to the external apparatus by the transmitting unit, upon receiving the instruction while the work machine is operating.

(12)

The work machine described in any one of (1) to (11), further including:
- a permission operation unit configured to accept a predetermined operation for giving permission to remotely operate the work machine by a user terminal, wherein
the external apparatus is the user terminal or a management apparatus capable of communicating with the user terminal and the work machine, and the transmitting unit transmits, to the external apparatus, information relating to the surrounding status of the work machine, in response to the instruction received directly from the user terminal or via the management apparatus when the predetermined operation is accepted by the permission operation unit.

(13)

A support apparatus capable of communicating with a work machine including a monitoring unit configured to acquire information relating to a surrounding status of the work machine and transmitting the information outside the work machine, the support apparatus including:

a transmitting unit configured to transmit, to the work machine, an instruction for requesting the information relating to the surrounding status of the work machine, in response to a predetermined operation from a user;

a first acquiring unit configured to acquire the information relating to the surrounding status of the work machine, transmitted from the work machine in response to the instruction; and a first reporting unit configured to report, to the user, the information relating to the surrounding status of the work machine acquired by the first acquiring unit.

(14)

The support apparatus described in (13), further including:

a second acquiring unit configured to acquire, from the work machine in response to the instruction, information relating to whether the monitoring unit can be activated while the work machine is stopped, or whether the monitoring unit that is operating is capable of continuously operating after the monitoring unit has been activated; and a second reporting unit configured to report the information acquired by the second acquiring unit to a user.

(15)

The support apparatus described in (14), wherein the second acquiring unit acquires information relating to a state of a power source that is installed in the work machine and that is configured to supply power to the monitoring unit.

(16)

A support method executed by a support apparatus capable of communicating with a work machine including a monitoring unit configured to acquire information relating to a surrounding status of the work machine and transmitting the information outside the work machine, the information processing method including:

a transmitting step of transmitting, to the work machine, an instruction for requesting the information relating to the surrounding status of the work machine, in response to a predetermined operation from a user;

a first acquiring step of acquiring the information relating to the surrounding status of the work machine, transmitted from the work machine in response to the instruction; and a first reporting step of reporting, to the user, the information relating to the surrounding status of the work machine acquired at the first acquiring step.

(17)

A support program that causes a support apparatus to execute the support method as described in (16).

Second Embodiment

Next, a second embodiment will be described.

There is known a surrounding monitoring apparatus which, upon detecting a predetermined monitor target (e.g., a person) within the monitor range in the surroundings of a work machine such as an excavator, outputs an alarm or limits the operation of the work machine to ensure safety in the surroundings of the work machine.

However, even if the monitor target is no longer detected within the monitor range, there may be cases where the monitor target still exists in a proximity region relatively close to the work machine including the monitor range. For example, if the monitor target is a person, during the idling of the work machine, there may be cases where the operator is away from the work machine, and a worker, etc., may go underneath the work machine to inspect the lower part, or may inspect the engine room from the upper part of the turning body of the work machine. In this case, the lower part of the turning body and the upper part of the turning body of the work machine are not usually included in the monitor range. Therefore, when the worker, etc., enters the monitor range and then exits the monitor range and goes to a proximity region outside the monitor range, the alarm output and the operation limitation may be canceled. Then, because the alarm output and the operation limitation are cancelled, the operator that has returned to the work machine may feel safe to start the work with the work machine, despite the fact that a worker and the like is inspecting the work machine, etc.

Therefore, in the present embodiment, a surrounding monitoring apparatus that can improve the safety of the work machine when a monitor target exists in a region outside the monitor range but close to the work machine, is provided.

<Overview of Excavator>

First, with reference to FIG. 11, an outline of the excavator 100 (an example of a work machine) on which a surrounding monitoring apparatus 150 (see FIG. 12) according to the present embodiment is mounted will be described.

Figure 11:
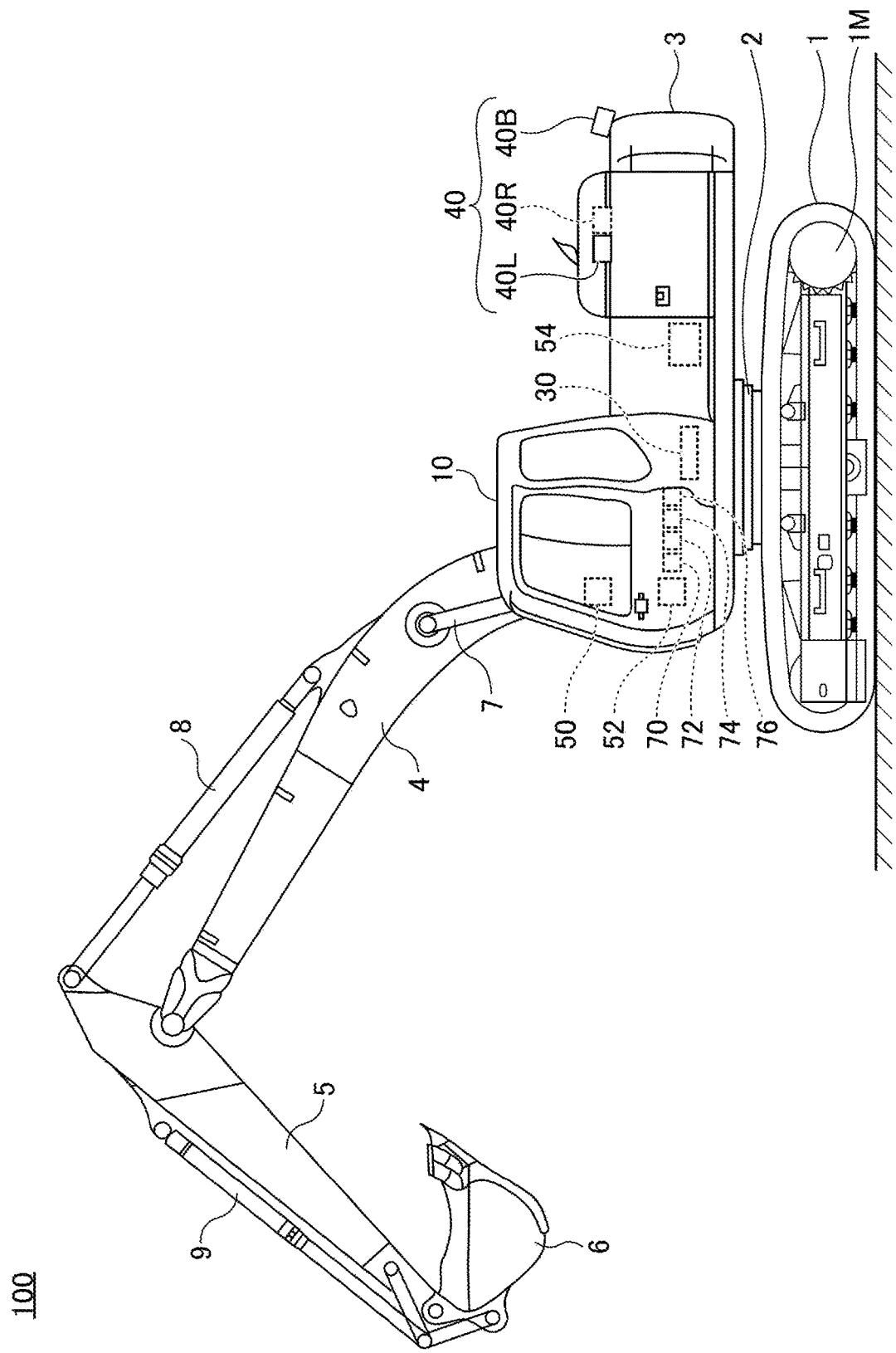
FIG. 11 is a diagram illustrating an example of an excavator on which a surrounding monitoring apparatus is mounted.

FIG. 11 is a diagram illustrating an example of the excavator 100 on which the surrounding monitoring apparatus 150 according to the present embodiment is mounted. Specifically, the diagram is a side view of the excavator 100.

The surrounding monitoring apparatus 150 according to the present embodiment may be mounted on any work machine other than the excavator 100. For example, the surrounding monitoring apparatus 150 may be mounted on a lifting magnet machine having a lifting magnet attached thereto as an end attachment, a bulldozer, a wheel loader, an asphalt finisher, a forestry machine, a crawler crane and the like.

The excavator 100 includes the lower traveling body 1, the upper turning body 3 that is turnably mounted to the lower traveling body 1 via the turning mechanism 2, the boom 4 as an attachment (working apparatus), the arm 5, the bucket 6, and the cabin 10.

The lower traveling body 1 includes, for example, a pair of crawlers on the left and right, and each crawler travels by being hydraulically driven by the traveling hydraulic motor 1M.

The upper turning body 3 is driven by a turning hydraulic motor or an electric motor (both of which are not illustrated) to rotate relative to the lower traveling body 1.

The boom 4 is vertically pivotably mounted to the front center of the upper turning body 3, the arm 5 is vertically pivotably mounted to the front end of the boom 4, and the bucket 6 is vertically pivotably mounted to the front end of the arm 5. The boom 4, the arm 5, and the bucket 6 are hydraulically driven by the boom cylinder 7, the arm cylinder 8, and the bucket cylinder 9, respectively.

The cabin 10 is an operator compartment in which an operator rides and is mounted on the front left side of the upper turning body 3.

<Configuration of Surrounding Monitoring Apparatus>

Next, a specific configuration of the surrounding monitoring apparatus 150 according to the present embodiment will be described with reference to FIG. 12 in addition to FIG. 11.

Figure 12:
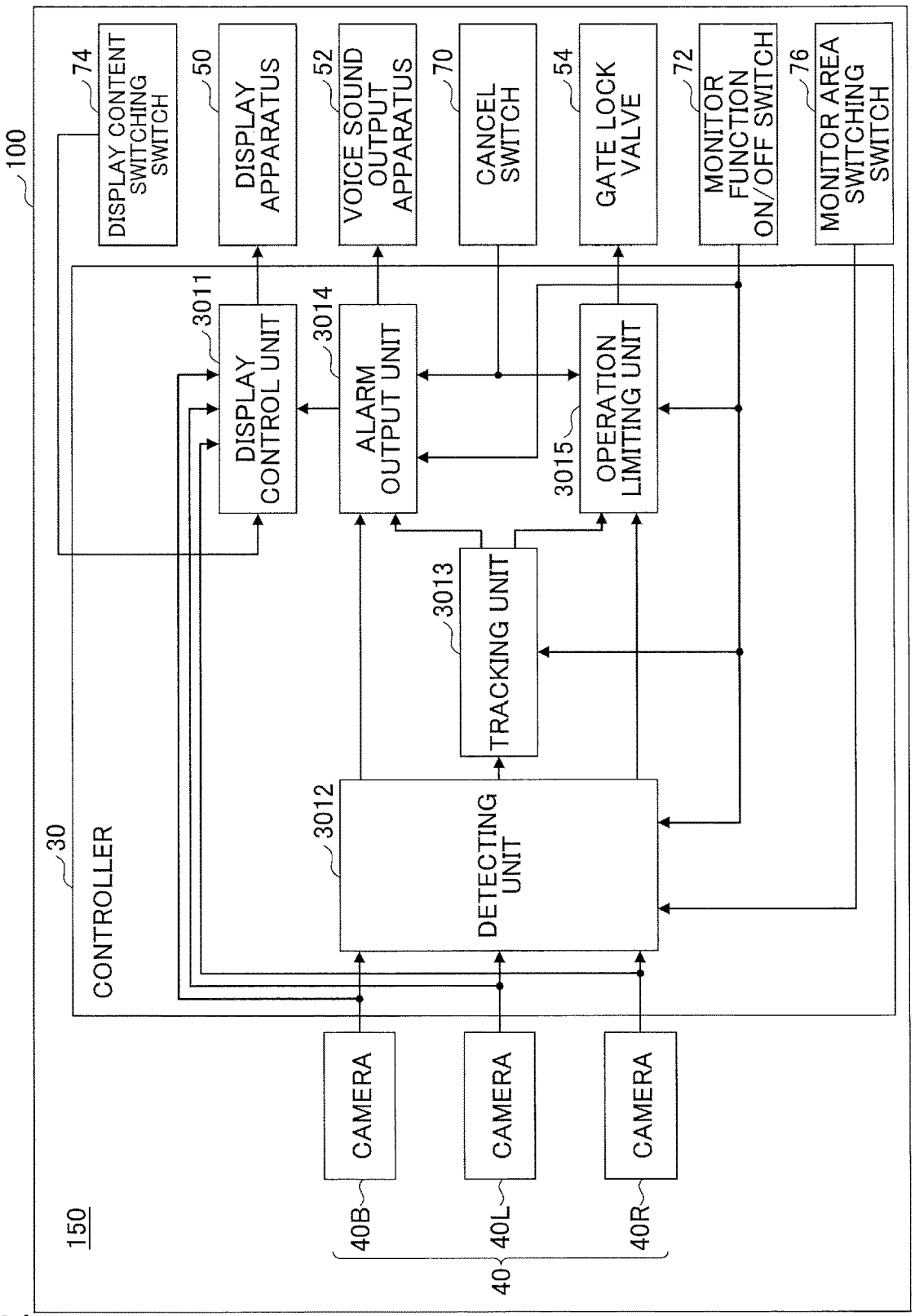
FIG. 12 is a diagram illustrating an example of a configuration of a surrounding monitoring apparatus.

FIG. 12 is a block diagram illustrating an example of the configuration of the surrounding monitoring apparatus 150 according to the present embodiment.

The surrounding monitoring apparatus 150 monitors the entry of a predetermined object (hereinafter, simply "monitor target") to be monitored within a predetermined range in the surroundings of the excavator 100 and outputs an alarm or limits the operation of the excavator when the monitor target is detected. A monitor target may include any non-human object, such as stationary obstacles such as materials temporarily placed in the worksite or moving obstacles such as vehicles including trucks, as well as a person such as a worker working in the surroundings of the excavator 100 or a supervisor of the worksite. Hereinafter, in the present embodiment, the description will be continued by focusing on a case where the monitor target is a person.

The surrounding monitoring apparatus 150 includes a controller 30, the imaging apparatus 40, the display apparatus 50, the voice sound output apparatus 52, the gate lock valve 54, a cancel switch 70, a monitor function ON/OFF switch 72 (hereinafter, a "monitor function switch" as a matter of convenience), a display content switching switch 74, and a monitor area switching switch 76.

The controller 30 is the primary control apparatus for controlling the driving of the excavator 100. For example, the controller 30 is mounted in the cabin 10 to perform various control processes with respect to the surrounding monitoring apparatus 150.

The controller 30 may implement the functions thereof by any hardware, software, or a combination thereof. The controller 30 is configured mainly by a microcomputer including, for example, a CPU (Central Processing Unit), a RAM (Random Access Memory), a ROM (Read Only Memory), an auxiliary storage, an RTC (Real-time Clock), and various communication interfaces. The controller 30 includes a display control unit 3011, a detecting unit 3012, a tracking unit 3013, an alarm output unit 3014, and an operation limiting unit 3015 as functional units implemented by executing various programs, for example, stored in a ROM or an auxiliary storage device, on the CPU.

The imaging apparatus 40 (an example of a sensor) is mounted on the upper portion of the upper turning body 3, and captures images of the surroundings of the excavator 100 and outputs the captured image. The output captured image may include an object that includes a monitor target that is present in the surroundings of the excavator 100. That is, the imaging apparatus 40 outputs a captured image as detection information regarding an object present in the surroundings of the excavator 100. The imaging apparatus 40 includes the cameras 40B, 40L, and 40R.

The camera 40B, the camera 40L, and the camera 40R are mounted on the upper back end, the upper left end, and the upper right end of the upper turning body 3, respectively, to capture images of the back, the left side, and the right side of the upper turning body 3. For example, the camera 40B, the camera 40L, and the camera 40R are single-eye wide angle cameras each having a very wide angle of view.

Specifically, the camera 40B, the camera 40L, and the camera 40R are respectively mounted so that the optical axis is directed obliquely downward at the upper portion of the upper turning body 3, and capture images of a vertical imaging range from the ground near the excavator 100 to an area far away from the excavator 100. The camera 40B, the camera 40L, and the camera 40R each output captured images at a predetermined cycle (e.g., $\frac{1}{30}$ second) while the excavator 100 is operating, and the output captured image is loaded into the controller 30.

The display apparatus 50 is provided around the operator seat within the cabin 10, specifically at a position easily visible to an operator seated in the operator seat, and displays various kinds of image information to be reported to the operator, under the control by the controller 30. The display apparatus 50 is, for example, a liquid crystal display or an organic EL (Electroluminescence) display, and may be a touch panel display type which also serves as an operation unit. Specifically, as described below, the display apparatus 50 displays a captured image captured by the imaging apparatus 40 (a through-image) or a surroundings image (for example, a viewpoint conversion image to be described later) that is generated based on a captured image captured by the imaging apparatus 40 by the controller 30.

The voice sound output apparatus 52 is provided around the operator seat in the cabin 10 and outputs various kinds of voice sound information to be reported to the operator, under the control by the controller 30. The voice sound output apparatus 52 may be, for example, a speaker or a buzzer. Specifically, the voice sound output apparatus 52 outputs an alarm sound, based on a control instruction from the controller 30.

The gate lock valve 54 is provided at the most upstream side of the pilot line, which is for supplying pilot pressure from a pilot pump to an operation apparatus (not illustrated), to operate operation elements of the excavator 100 (i.e., the lower traveling body 1, the upper turning body 3, the boom 4, the arm 5, and the bucket 6, etc.), and switches between communication and non-communication of the pilot line.

For example, the gate lock valve 54 usually switches between communication and non-communication of the pilot line in accordance with an output signal (ON/OFF) of a gate lock switch in conjunction with the operation state of a gate lock lever provided at a portion corresponding to the entrance to the operator seat within the cabin 10. Specifically, the gate lock valve 54 switches the pilot line to a communication state when the output signal of the gate lock switch is a signal corresponding to a state in which the gate lock lever is pulled up (i.e., the operator is seated in the operator seat) (hereinafter, "OFF signal" as a matter of convenience). On the other hand, the gate lock valve 54 switches the pilot line to a non-communication state when the output signal of the gate lock switch is a signal corresponding to a state in which the gate lock lever is lowered (i.e., the operator has left the operator seat) (hereinafter, "ON signal" as a matter of convenience).

For example, the gate lock valve 54 is also configured to receive instruction signals input from the controller 30. Specifically, the gate lock valve 54 may have a signal input unit that is connected to a logic circuit into which an instruction signal from the controller 30 can interrupt. This allows the gate lock valve 54 to switch between communication and non-communication of the pilot line in response to an instruction signal (OFF signal/ON signal) from the controller 30. That is, the gate lock valve 54, under the control of the controller 30, can switch the pilot line to a non-communication state even when the gate lock lever is pulled up.

The cancel switch 70 is provided, for example, near the operator seat in the cabin 10 and is an operation unit for inputting a cancellation intention of an operator and the like to cancel the alarm or the operation limitation of the excavator 100 to be described later. The cancel switch 70 may be, for example, an operation unit according to hardware such as a push button, a lever, a rotating knob, and the like of the operation part 50B, which will be described later. The cancel switch 70 may be, for example, a combination of an operation unit according to software such as a virtual button (icon) on an operation screen displayed on the display apparatus 50 and an operation unit according to hardware such as a touch panel mounted on the display apparatus 50. Hereinafter, the same shall apply to the monitor function switch 72, the display content switching switch 74, the monitor area switching switch 76, and the like. Information about the operation state of the cancel switch 70 is loaded into the controller 30.

Note that, instead of the cancel switch 70, a camera that recognizes a particular pose or gesture corresponding to an operator's cancellation intention, a line-of-sight sensor that recognizes a particular line-of-sight movement corresponding to an operator's cancellation intention, and the like may be employed. Hereinafter, the same shall apply to the monitor function switch 72, the display content switching switch 74, the monitor area switching switch 76, and the like.

The monitor function switch 72 is provided, for example, near the operator seat in the cabin 10 and is an operation unit used by an operator and the like for turning on/off the monitor function by the surrounding monitoring apparatus 150. That is, the monitor function switch 72 is an operation unit for enabling or disabling the functions of the alarm output and the operation limitation of the excavator 100 executed based on the detection of a monitor target.

For example, when the monitor function is enabled in response to an operation by an operator and the like with respect to the monitor function switch 72, the functions of the display control unit 3011, the detecting unit 3012, the tracking unit 3013, the alarm output unit 3014, and the operation limiting unit 3015, which will be described later, are enabled.

On the other hand, for example, when the monitor function is disabled in response to an operation by an operator and the like with respect to the monitor function switch 72, all functions of the display control unit 3011 (at least the functional portion relating to the monitor function), the detecting unit 3012, the tracking unit 3013, the alarm output unit 3014, and the operation limiting unit 3015 become disabled. In this case, among the detecting unit 3012, the tracking unit 3013, the alarm output unit 3014, and the operation limiting unit 3015, only the functions of the alarm output unit 3014 and the operation limiting unit 3015 may be disabled, and the functions related to the monitor function of the display control unit 3011 and the functions of the detecting unit 3012 and the tracking unit 3013 may remain enabled. Thus, while the monitor function is disabled, if the monitor function is enabled in accordance with an operation of the monitor function switch 72, it is not necessary to reactivate the functions of the display control unit 3011, the detecting unit 3012, and the tracking unit 3013, and the time required for resuming the monitor function can be reduced.

For example, when the monitor function is disabled in response to an operation by an operator and the like with respect to the monitor function switch 72, an indicator indicating that the monitor function is disabled is displayed on the display apparatus 50 under the control of the controller 30 (the display control unit 3011 to be described later). Further, an exclusive-use indicator configured with a red lamp and the like may be provided in the cabin 10, and, for example, when the monitor function is disabled in response to an operation by an operator and the like with respect to the monitor function switch 72, the exclusive-use indicator may be illuminated. Accordingly, the surrounding monitoring apparatus 150 can cause an operator and the like to recognize that the monitor function (that is, the function of outputting an alarm or limiting the operation of the excavator 100 based on the detection of the monitor target) is disabled.

Information regarding the operation state of the monitor function switch 72 is loaded into the controller 30.

The display content switching switch 74 is provided, for example, near the operator seat in the cabin 10 and is an operation unit for switching the contents displayed on the display apparatus 50 by an operator and the like. For example, the display content switching switch 74 is an operation unit that switches the monitor image displayed by the display apparatus 50 among a captured image captured by the imaging apparatus 40, a monitor image including the surroundings image described below, a simultaneous display of both, and the like. Information regarding the operation state of the display content switching switch 74 is loaded into the controller 30.

The monitor area switching switch 76 is provided, for example, near the operator seat in the cabin 10, and is an operation unit for setting a monitor area (an example of a monitor range) where an operator and the like monitors the entry of a monitor target. For example, the operator may set up some or all of the individual monitor areas, each corresponding to one of the cameras 40B, 40L, and 40R, as the monitor area of the surrounding monitoring apparatus 150, by operating the monitor area switching switch 76. Hereinafter, the individual monitor area for each of the cameras 40B, 40L, and 40R is referred to as an "individual monitor area" and is distinguished from the monitor area of the entire surrounding monitoring apparatus 150 (that is, the detecting unit 3012 to be described later).

The monitor area has a default setting. For example, when the monitor area switching switch 76 is not operated after activating the excavator 100, the surrounding monitoring apparatus 150 monitors the monitor target in the monitor area set by default.

The display control unit 3011 causes the display apparatus 50 to display a monitor image indicating the status of the surroundings of the excavator 100.

For example, the display control unit 3011 causes the display apparatus 50 to display a captured image captured by at least one of the cameras 40B, 40L, and 40R as a monitor image in response to an operation by an operator of the display content switching switch 74. Hereinafter, this captured image displayed on the display apparatus 50 may be referred to as a "through-image".

For example, the display control unit 3011 generates a surroundings image (an example of a composite image) which will be described later based on a captured image captured by the imaging apparatus 40 in response to an operation by the operator with respect to the display content switching switch 74 and displays a monitor image including the surroundings image on the display apparatus 50.

Specifically, the display control unit 3011 generates, as a surroundings image, a viewpoint conversion image viewed from a virtual viewpoint, by performing a known viewpoint conversion process, a composition process, and the like based on the captured images captured by the cameras 40B, 40L, and 40R, and causes the display apparatus 50 to display the surroundings image. When causing the display apparatus 50 to display the surroundings image, the display control unit 3011 causes the display apparatus 50 to also display an excavator image schematically representing the excavator 100, in order to clearly indicate a relative positional relationship between the imaging range of the imaging apparatus 40 and the excavator 100. That is, the display control unit 3011 generates a monitor image including an excavator image and a surroundings image disposed around the excavator image in accordance with a relative positional relationship between the excavator 100 and the imaging area of the imaging apparatus 40, and causes the display apparatus 50 to display the monitor image.

The function of the display control unit 3011 may be built in the display apparatus 50. In this case, the captured image captured by the imaging apparatus 40 (the cameras 40B, 40L, and 40R) and the information such as the detection result of the detecting unit 3012 are loaded into the display apparatus 50 from the imaging apparatus 40 and the controller 30, respectively.

For example, the display apparatus 50 displays the monitor images illustrated in FIGS. 5A and 5B described above.

As illustrated in FIGS. 5A and 5B, in the present example, the display apparatus 50 includes the display part 50A, which is a display region in which various kinds of information images are displayed, and the operation part 50B, which is hardware-based, such as a button switch, which can receive operations by an operator and the like with respect to the various kinds of information images displayed in the display part 50A.

The display part 50A is, for example, a horizontal rectangular display (e.g., a display having an aspect ratio of 4:3) of the display apparatus 50.

As illustrated in FIG. 5A, a through-image of any of the cameras 40B, 40L, and 40R is displayed in the display part 50A as the monitor image MP1 as described above.

In this example, a guide line GLa is superimposed on the monitor image MP1 (through-image). The guide line GLa represents, for example, a position where a distance D in the horizontal direction from the excavator 100, is a predetermined distance D1. Accordingly, the operator and the like can recognize how far away the position of a monitor target is from the excavator 100, when the monitor target appears in the monitor image MP1 (through-image).

The position of the predetermined distance D1 is suitably set within a predetermined distance D2 or less corresponding to the monitor area as described below.

As described above, the optical axes of the cameras 40B, 40L, and 40R are oriented obliquely and downwardly from the upper end of the upper turning body 3, in order to capture images in a wide range from the ground near the upper turning body 3 to a distant location. Accordingly, a part of the body (the upper turning body 3) appears at the lower end of the monitor image MP1 (through-image) in this example.

As illustrated in FIG. 5B, the monitor image MP2, including the excavator image CG and the surroundings image EP disposed around the excavator image CG, is displayed in the display part 50A as described above. Accordingly, the operator and the like can appropriately recognize the positional relationship between the monitor target (that is, a person) appearing in the surroundings image EP and the excavator 100.

The surroundings image EP of this example is a viewpoint conversion image which is a combination of a birds-eye image BVP that is a view from directly above the surrounding region that is adjacent to the excavator 100, and a horizontal image HVP that is a horizontal view of the surrounding region from the excavator 100 disposed around the relevant bird-eye image BVP. The surroundings image EP, which is a viewpoint conversion image, is obtained by projecting the captured images captured by the cameras 40B, 40L, and 40R into a spatial model and re-projecting the projected images projected into the spatial model to another two-dimensional plane. A spatial model is a projection target of a captured image in a virtual space and is formed of one or more planes or curved planes that include planes or curved planes other than the plane where the captured image is positioned.

Further, a guide line GLb is superimposed on the monitor image MP2. The guide line GLb is similar to the guide line GLa of the monitor image MP1 (through-image) of FIG. 5A, in that the guide line GLb represents a position where the distance D in the horizontal direction from the excavator 100 is the predetermined distance D1. That is, the guide line GLb is a line in which the contour shape of the excavator image CG corresponding to a plan view viewed directly from above the excavator 100, is offset (enlarged) by an amount corresponding to the predetermined distance D1 on the outside of the excavator image CG. Thus, similar to the guide line GLa of FIG. 5A, the operator and the like can recognize how far away the position of a monitor target is from the excavator 100, when the monitor target (that is, a person) appears in the surroundings image.

The process of generating the viewpoint conversion image (surroundings image) by the display control unit 3011 (surroundings image generation process) and the process of detecting the monitor target by the detecting unit 3012 (monitor target detection process) to be described later, may be asynchronous processes. In this case, the surroundings image generation process may be set to be faster in terms of activation and the processing cycle, than the monitor target detection process, in the controller 30. Accordingly, it is possible to prevent a situation in which the surroundings image generation process is disrupted and the surroundings image in the monitor image displayed on the display apparatus 50 is not updated.

Returning to FIGS. 11 and 12, the detecting unit 3012 detects the monitor target in the monitor area in the surroundings of the excavator 100 based on the captured image captured by the imaging apparatus 40. For example, the detecting unit 3012 detects a monitor target in a monitor area defined (extending) in a horizontal direction as viewed from the excavator 100 (hereinafter, simply referred to as a "horizontal direction"), i.e., in a direction along a plane where the excavator 100 is carrying out the work (where the lower traveling body 1 is in contact with the ground) (hereinafter, a "work plane" as a matter of convenience). Specifically, the detecting unit 3012 detects a monitor target within a monitor area where the distance D in the horizontal direction from the excavator 100 is within the predetermined distance D2 (for example, 5 meters). Hereinafter, the monitor area in a horizontal direction as viewed from the excavator 100 may be referred to as a "horizontal monitor area". Details of the monitor area are described later.

For example, the detecting unit 3012 recognizes the monitor target in the captured image by optionally applying various known image processing techniques or a machine learning-based classifier including artificial intelligence (AI) and the like.

Further, by applying various known methods, the detecting unit 3012 can determine (estimate) a position (hereinafter, an "actual position"; for example, a foot position) where a recognized monitor target (a person) is present included in the captured image captured by the single-eye imaging apparatus 40.

For example, the detecting unit 3012 estimates a position in the horizontal direction (hereinafter, a "horizontal position") viewed from the excavator 100, based on a size (for example, a size in the height direction in a captured image) of a recognized monitor target in the captured image. This is because the size of a recognized monitor target in the captured image is correlated with the position; as the monitor target moves away from the excavator 100, the size of the monitor target becomes small. Specifically, a range of the assumed size may be defined for the monitor target (e.g., a range of the assumed human height), and, therefore, the correlation between the horizontal position of the monitor target included in the range of assumed size viewed from the excavator 100 and the size of the monitor target in the captured image may be predefined. Therefore, the detecting unit 3012 can estimate the actual position (horizontal position from the excavator 100) of the recognized monitor target based on a map or a conversion equation representing a correlation between the size of the monitor target in the captured image and the horizontal position viewed from the excavator 100 stored in advance in an internal memory such as an auxiliary storage device of the controller 30.

For example, assuming that the monitor target is on the same plane as the excavator 100 (the lower traveling body 1), the detecting unit 3012 can estimate an actual position of the monitor target (for example, a foot position) by performing projection conversion (homography) and the like on the captured image with respect to the plane. In this case, a portion (a point) of the captured image corresponds to a position on the same plane as the excavator 100.

The detecting unit 3012 may detect a monitor target in a monitor area in the surroundings of the excavator 100 based on detection information, relating to an object present in the surroundings of the excavator 100, of another sensor that may be mounted on the excavator 100, instead of, or in addition to, the captured image captured by the imaging apparatus 40. For example, the detecting unit 3012 may detect a monitor target in a monitor area (horizontal monitor area) in the surroundings of the excavator 100 based on detection information obtained by another sensor such as a stereo camera, a millimeter-wave radar, and a LIDAR (Light Detecting and Ranging).

The tracking unit 3013 tracks a monitor target detected by the detecting unit 3012. Specifically, the tracking unit 3013 may identify (specify) the monitor target detected by the detecting unit 3012 and track the monitor target by taking into consideration a known image recognition technology, a status of a change in the position (a movement status) of the monitor target in the monitor area after being detected in the monitor area by the detecting unit 3012, and the like.

The tracking unit 3013 may perform various determinations as follows by tracking the movement status of the monitor target in the monitor area detected by the detecting unit 3012.

For example, the tracking unit 3013 (an example of an exit determining unit) determines whether a monitor target, that is no longer detected after being detected in the monitor area by the detecting unit 3012, has moved out to a region that is farther away than the monitor area (horizontal monitor area) in the horizontal direction as viewed from the excavator 100 (hereinafter, a "distant region"), as viewed from the excavator 100. That is, the tracking unit 3013 determines whether the monitor target, which is no longer detected by the detecting unit 3012, has moved the distance D in the horizontal direction from the excavator 100 to a distant region exceeding the predetermined distance D2. Further, the tracking unit 3013 may determine that there is a possibility that a monitor target, that is no longer detected after being detected in the monitor area by the detecting unit 3012, exists in a region relatively close to the excavator 100 (hereinafter, a "proximity region") including the monitor area when the monitor target has not gone out to the distant region. As will be discussed later, the monitor area cannot cover the entire proximity region of the excavator 100. That is, the imaging apparatus 40 cannot cover the entire proximity region of the excavator 100 depending on the imaging range thereof. Further, as will be described later, even when a monitor target is present in the monitor area, the monitor target may not be detectable by the detecting unit 3012, because the monitor target is hidden by an obstacle.

For example, the tracking unit 3013 (an example of a presence determining unit) specifically determines whether a monitor target, that is no longer detected after being detected by the detecting unit 3012, is likely to be present in a proximity region near the excavator 100 but outside the monitor area (hereinafter, a "proximity region outside the monitor area"). That is, when the monitor target that has been detected by the detecting unit 3012 is no longer detected, the tracking unit 3013 may determine whether the monitor target has moved from within the monitor area to the proximity region outside the monitor area. The proximity region outside the monitor area may include, for example, the region in front of the upper turning body 3, the region (space) between the ground below the upper turning body 3 and the upper turning body 3, above the upper turning body 3, i.e., the region of a house portion, etc., as described below.

For example, the tracking unit 3013 determines whether the detecting unit 3012 has lost sight of the monitor target in the monitor area when the monitor target detected in the monitor area by the detecting unit 3012 is no longer detected. If the background of the captured image captured by the imaging apparatus 40 and the monitor target are assimilated or the monitor target is hidden by an obstacle, even when the monitor target is present in the monitor area, the monitor target may not be detected by the detecting unit 3012. Further, in a case where the detecting unit 3012 estimates the distance D in the horizontal direction from the excavator 100 to the monitor target based on the size of the monitor target included in the captured image captured by the imaging apparatus 40, even when the monitor target exists in the monitor area (horizontal monitor area), the detecting unit 3012 may determine that the monitor target is outside the monitor area. Specifically, when there is a difference in the height direction (i.e., the vertical direction as viewed from the excavator 100) between the position of the excavator 100 (i.e., the position of the work plane) and the position of the monitor target, the size of the monitor target included in the captured image captured by the imaging apparatus 40 may change as compared to the case where there is no difference in the height direction (i.e., the position of the monitor target is also on the work plane). Therefore, the detecting unit 3012 may determine that a monitor target, which is present in the monitor area, is outside the monitor area. In this case, when there is a difference in the height direction between the position of the excavator 100 (i.e., the position of the work plane) and the position of the monitor target, there may be a step difference between the work plane of the excavator 100 and the plane where the monitor target is located. Further, when there is a difference in the height direction between the position of the excavator 100 and the position of the monitor target, there may be a difference in the tilt angle between the work plane of the excavator 100 and the plane where the monitor target is located (e.g., where one is on a horizontal plane and the other is on a ramp plane, etc.).

The determination process and the proximity region outside the area will be described in detail below (see FIGS. 13A, 13B, 14, and FIGS. 15A to 15D).

The alarm output unit 3014 (an example of a control unit) outputs an alarm to the interior or the exterior of the cabin 10 when a monitor target is detected in the monitor area by the detecting unit 3012. Accordingly, the surrounding monitoring apparatus 150 can cause an operator or a worker, a supervisor, and the like in the surroundings of the excavator 100 to recognize that a monitor target (for example, a person such as a worker) has entered the monitor area in the surroundings of the excavator 100. Therefore, the surrounding monitoring apparatus 150 can urge an operator and the like to confirm the safety status in the surroundings of the excavator 100 and can urge a worker and the like in the monitor area to evacuate from the monitor area.

For example, the alarm output unit 3014 outputs an alarm in an auditory manner, that is, by sound. Specifically, the alarm output unit 3014 outputs a control instruction to the voice sound output apparatus 52 and causes the voice sound output apparatus 52 to output an alert sound.

Depending on various conditions, the alarm output unit 3014 may change the pitch, the sound pressure, the tone color, and the like of the alert sound, and may change the bellowing cycle, etc., when cyclically bellowing the alert sound (for example, a buzzer sound).

For example, the alarm output unit 3014 outputs an alarm in a visual manner, that is, by displaying an image on the display apparatus 50. Specifically, the alarm output unit 3014 transmits the alarm request to the display control unit 3011. Accordingly, the display control unit 3011 emphasizes the monitor target included in the monitor image (through-image or surroundings image) displayed on the display apparatus 50 in response to the alarm request, so that the display apparatus 50 can output an alarm to an operator.

The alarm output unit 3014 may output an alarm in a visual manner to a worker or a supervisor in the surroundings of the excavator 100 through an external display apparatus that may be separately provided in the house portion of the upper turning body 3. Further, the alarm output unit 3014 may output an alarm in a tactile manner, for example, through a vibration generating device that vibrates the operator seat on which the operator is seated.

The alarm output unit 3014 may change the type (alarm level) of the alarm depending on the positional relationship between the monitor target detected in the monitor area by the detecting unit 3012 and the excavator 100.

For example, the alarm output unit 3014 outputs an alarm having a relatively low alarm level (hereinafter, an "alarm of an attention level") to urge the attention of an operator and the like to the monitor target when the monitor target detected in the monitor area by the detecting unit 3012 is located at a position distant from the excavator 100. Specifically, the alarm output unit 3014 may output an alarm of an attention level when the distance D in the horizontal direction between the monitor target detected by the detecting unit 3012 and the excavator 100 exceeds the predetermined distance D1 (in the case of D1<D≤D2). Hereinafter, a region in which the distance D from the excavator 100 in the monitor area (horizontal monitor area) exceeds the predetermined distance D1 is referred to as an "attention region" as a matter of convenience. On the other hand, the alarm output unit 3014 outputs an alarm having a relatively high alarm level (hereinafter, referred to as an "alarm of a caution level") indicating that the monitor target is approaching the excavator 100 and the risk is increasing when the monitor target detected in the monitor area by the detecting unit 3012 is positioned relatively close to the excavator 100. Specifically, the alarm output unit 3014 may output an alarm of a caution level when the distance D in the horizontal direction from the monitor target detected by the detecting unit 3012 to the excavator 100 is less than or equal to the predetermined distance D1 (in the case of D≤D1). Hereinafter, a region where the distance D from the excavator 100 is less than or equal to the predetermined distance D1 in the monitor area (horizontal monitor area) is referred to as a "caution region".

In this case, the alarm output unit 3014 may change the pitch, the sound pressure, the tone color, the bellowing cycle, and the like of the sound output from the voice sound output apparatus 52, between the alarm of the attention level and the alarm of the caution level. The alarm output unit 3014 may change the color, the shape, the size, the presence or absence of blinking, the blinking cycle, and the like of a marker and the like for emphasizing the monitor target included in the monitor image (through-image or surroundings image) displayed on the display apparatus 50, between the alarm at the attention level and the alarm at the caution level. Accordingly, the surrounding monitoring apparatus 150 can cause an operator or the like to recognize the alarm level, that is, the proximity of the monitor target to the excavator 100, by the difference in the alarm sound or the marker and the like that highlights the monitor target displayed on the display apparatus 50.

The alarm output unit 3014 cancels the alarm output when the monitor target detected by the detecting unit 3012 is no longer detected or when the cancel switch 70 is operated after the alarm output starts. Details of the cancellation condition of the alarm output by the alarm output unit 3014 will be described below (see FIGS. 15A to 15D and 16).

The operation limiting unit 3015 (an example of a control unit) limits the operation of an operation element of the excavator 100 when a monitor target is detected in the monitor area by the detecting unit 3012. At this time, the operation element to be the target of the operation limitation includes some of or all of the lower traveling body 1, the upper turning body 3, the boom 4, the arm 5, and the bucket 6. For example, the operation limiting unit 3015 causes the gate lock valve 54 to switch the pilot line into a non-communication state by transmitting an ON signal as an instruction signal to the gate lock valve 54. Accordingly, the hydraulic oil (pilot pressure) is not supplied from the pilot pump to an operation apparatus which operates the operation element of the excavator 100, so that the operation element of the excavator 100 is prevented from operating even if an operator inputs an operation to the operation apparatus. Therefore, even in the case where a monitor target (for example, a person) enters the monitor area in the surroundings of the excavator 100, the operation of the excavator 100 is limited, so that the occurrence of collision between the excavator 100 and the monitor target can be prevented, and as a result, the safety can be maintained in the surroundings of the excavator 100.

For example, instead of the gate lock valve 54, a pressure reduction valve may be provided to depressurize the pilot pressure on the secondary side output from the operation apparatus which operates the operation element, and the operation limiting unit 3015 may control the pressure reduction valve. In this case, the pressure reduction valve reduces the pilot pressure on the secondary side output from the operation apparatus to a pressure value equivalent to a zero operation amount or less, thereby invalidating the operation performed with respect to the operation apparatus by the operator. Therefore, the operation limiting unit 3015 can control the pressure reduction valve to limit the operation of the operation element of the excavator 100 as a result. The operation limiting unit 3015 may control the pressure reduction valve so that the operation element of the excavator 100 is not stopped, but to limit the operation of the excavator 100 in a manner that the operation of each operation element relative to the operation by an operator is gradually limited than usual.

The operation limiting unit 3015 may change the level of the operation limitation in accordance with the positional relationship between the monitor target detected by the detecting unit 3012 and the excavator 100 as in the case of the alarm output unit 3014.

For example, the operation limiting unit 3015 limits the operation of the excavator 100 in a manner having a relatively low degree of limitation when a monitor target detected in the monitor area by the detecting unit 3012 is located at a position distant from the excavator 100. Specifically, the operation limiting unit 3015 may limit the operation of the excavator 100 in a manner having a relatively low degree of limitation (for example, the operation speed of the operation element relative to an operation amount with respect to the operation apparatus by an operator, is lower than usual) when the distance D in the horizontal direction from the monitor target detected by the detecting unit 3012 to the excavator exceeds the predetermined distance D1 (in the case of D1<D≤D2). On the other hand, the operation limiting unit 3015 limits the operation of the excavator 100 in a manner having a relatively high degree of limitation when a monitor target detected in the monitor area by the detecting unit 3012 is located at a position close to the excavator 100. Specifically, the operation limiting unit 3015 may limit the operation of the excavator 100 in a manner having a relatively high degree of limitation (for example, to stop the operation of the operation element) when the distance D in the horizontal direction from the monitor target detected by the detecting unit 3012 to the excavator 100 is less than or equal to the predetermined distance D1 (in the case of D≤D1).

The operation limiting unit 3015 cancels the operation limitation when the monitor target detected by the detecting unit 3012 is no longer detected or when the cancel switch 70 is operated after the start of the operation limitation of the excavator 100. Details of the cancellation condition for the operation limitation of the excavator 100 by the operation limiting unit 3015 will be described later (see FIGS. 15A to 15D).

<Details of Monitor Area of Surrounding Monitoring Apparatus>

Next, the monitor area of the surrounding monitoring apparatus 150 will be described in detail with reference to FIG. 13 (FIGS. 13A, 13B) and FIG. 14.

Figure 13A:
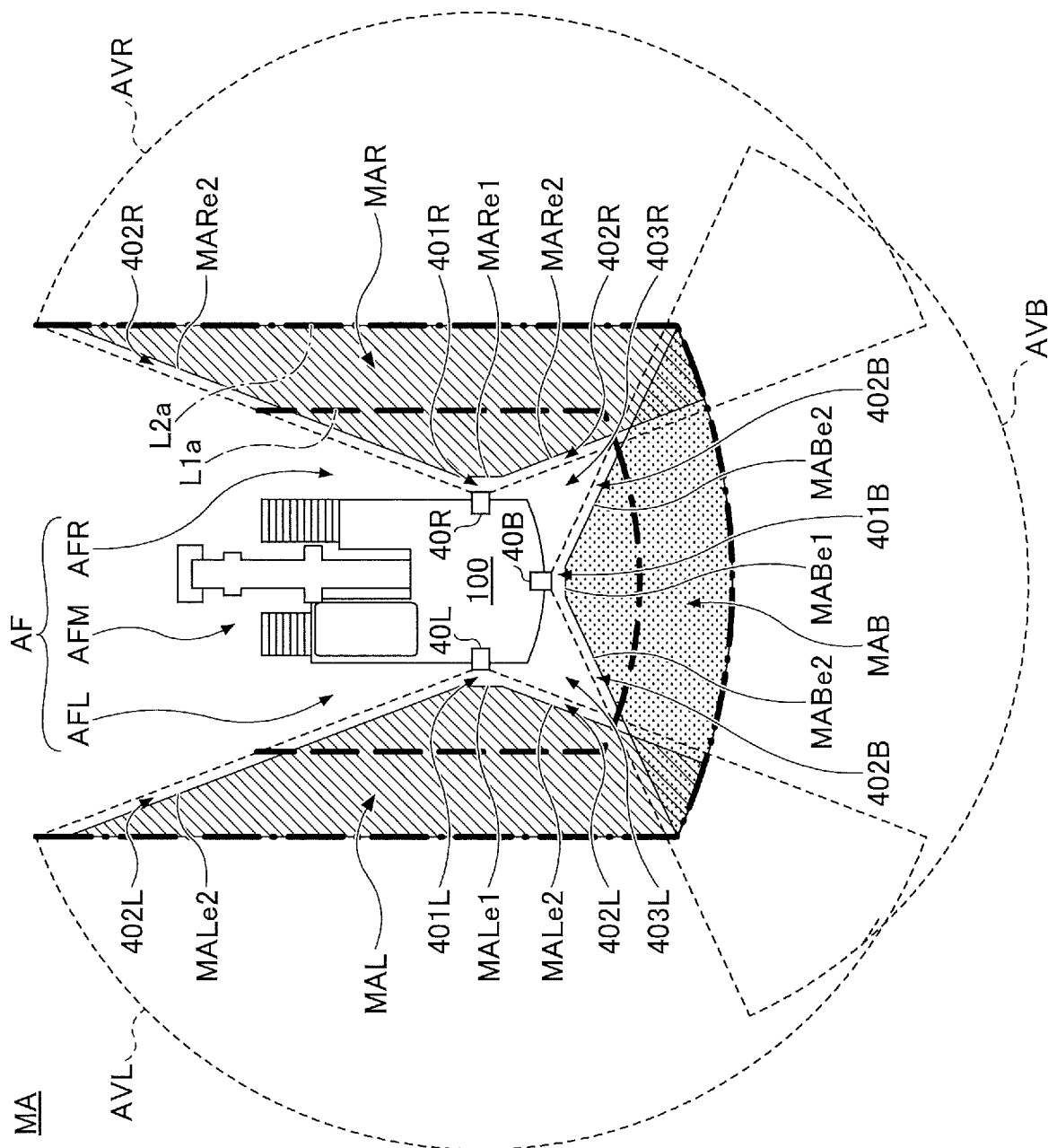
FIG. 13A is a diagram illustrating a monitor area of a surrounding monitoring apparatus.
Figure 13B:
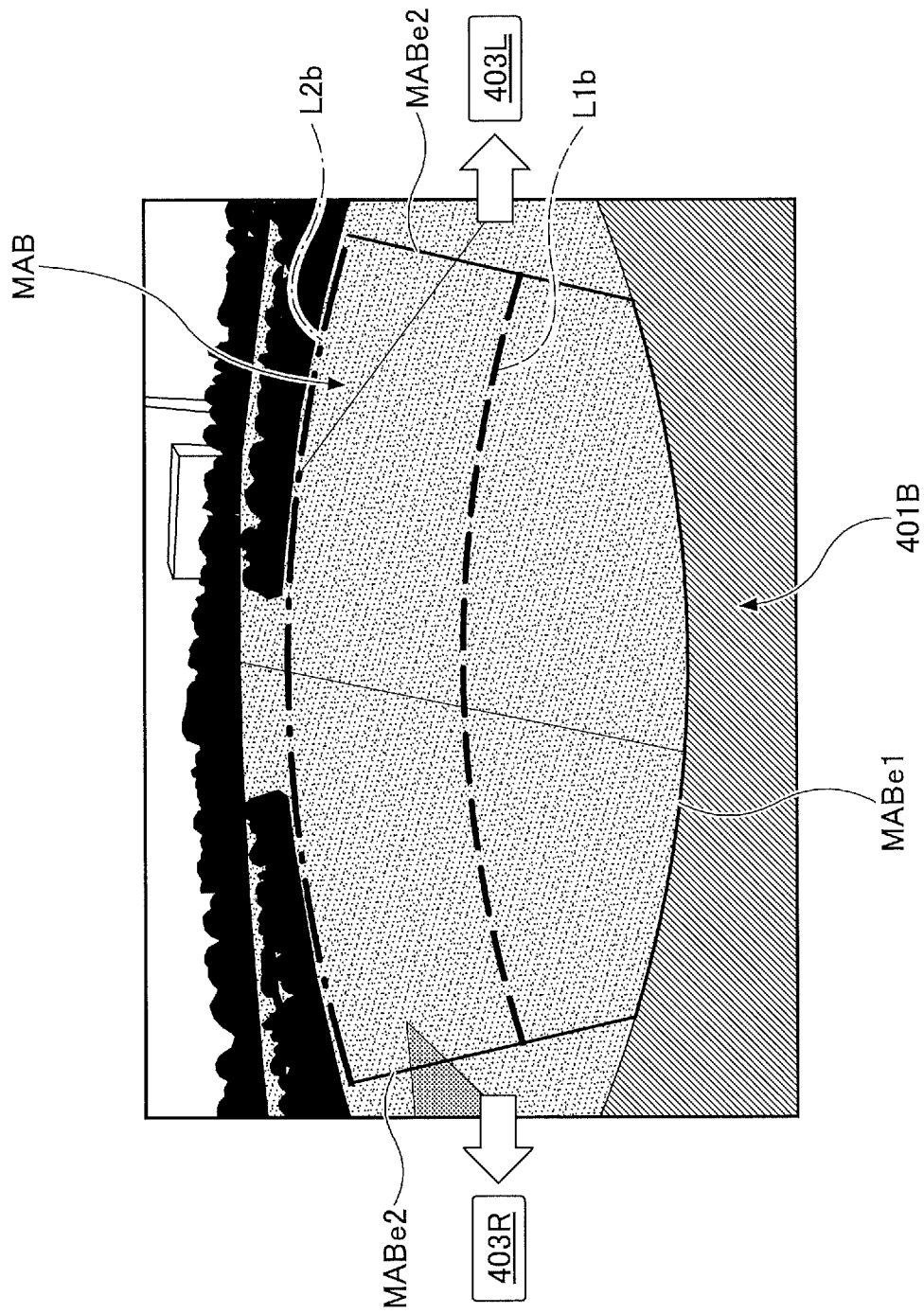
FIG. 13B is a diagram illustrating a monitor area of a surrounding monitoring apparatus.
Figure 14:
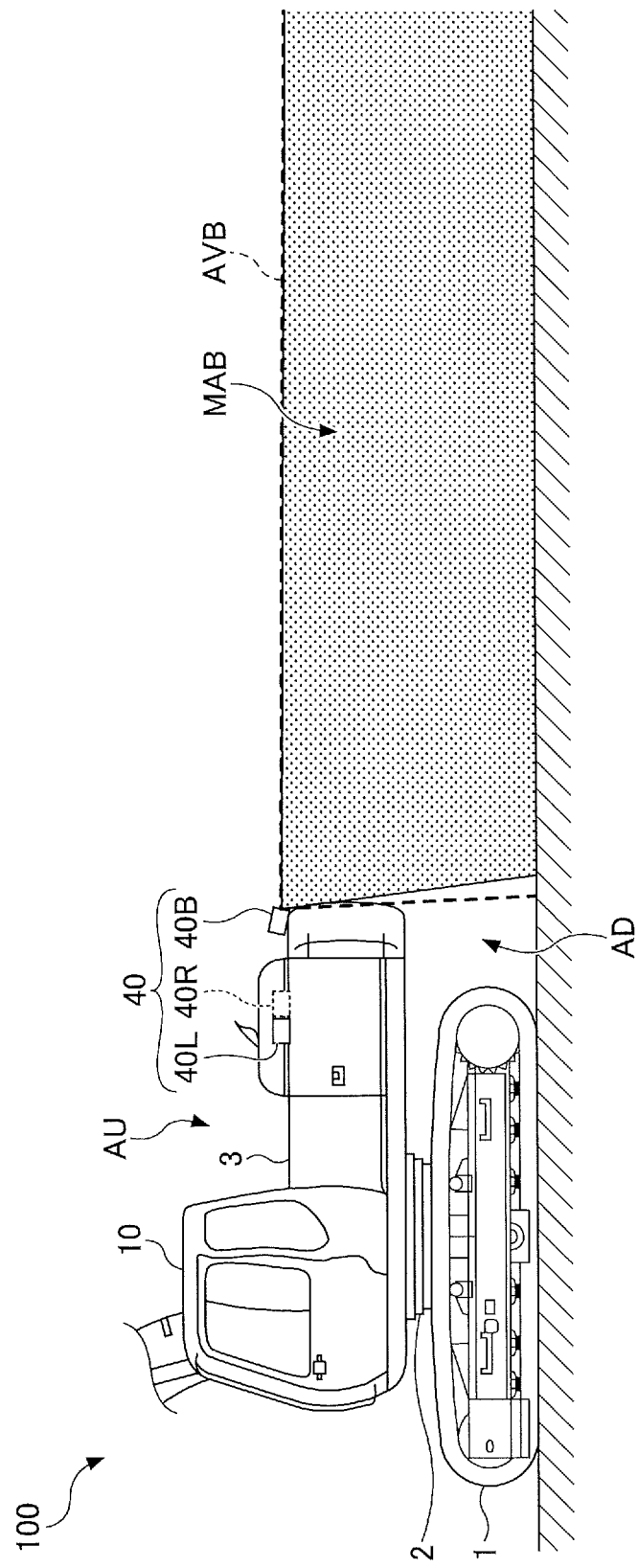
FIG. 14 is a diagram illustrating a monitor area of a surrounding monitoring apparatus.

FIG. 13 (FIGS. 13A and 13B) and FIG. 14 are diagrams illustrating an example of a monitor area (the monitor area MA) of the surrounding monitoring apparatus 150. Specifically, FIG. 13A is a diagram schematically illustrating the monitor area MA (the individual monitor areas MAB, MAL, and MAR corresponding to the cameras 40B, 40L, and 40R, respectively), when the excavator 100 is viewed in planar view. FIG. 13B is a diagram schematically illustrating the monitor area MA (the individual monitor area MAB) on the through-image of the camera 40B. FIG. 14 is a diagram schematically illustrating the monitor area MA (the individual monitor area MAB) when the excavator 100 is viewed from the side.

In FIG. 13A, the imaging possible ranges AVB, AVL, and AVR of the cameras 40B, 40L, and 40R, respectively, represent the ranges where the cameras 40B, 40L, and 40R can acquire images of monitor targets that are detectable by the detecting unit 3012. The imaging possible ranges AVB, AVL, and AVR may be defined, for example, by the angles of view in the horizontal direction of the cameras 40B, 40L, and 40R and the distance in the horizontal direction from the cameras 40B, 40L, and 40R, respectively.

In FIGS. 13A and 13B, guide lines L1a and L1b correspond to the position where the distance D in the horizontal direction from the excavator 100 is the predetermined distance D1, and guide lines L2a and L2b correspond to the position where the distance D in the horizontal direction from the excavator 100 is the predetermined distance D2, respectively.

As illustrated in FIGS. 13A and 13B, the individual monitor areas MAB, MAL, and MAR are mainly configured in a range where the distance D in the horizontal direction from the excavator 100 is less than or equal to the predetermined distance D2, among the imaging possible ranges AVB, AVL, and AVR, respectively. That is, the boundary line at the far end portion in the perspective direction (radial direction) viewed from the excavator 100 of the individual monitor areas MAB, MAL, and MAR, is defined by the line segments of guide lines L2a and L2b in the imaging possible ranges AVB, AVL, and AVR, respectively.

Further, the individual monitor areas MAB, MAL, and MAR do not include regions 401B, 401L, and 401R in the vicinity of cameras 40B, 40L, and 40R among the imaging possible ranges AVB, AVL, and AVR, respectively. That is, boundary lines MABe1, MALe1, and MARe1 at the proximate end portion in the perspective direction, viewed from the excavator 100, of the individual monitor areas MAB, MAL, and MAR, are each somewhat spaced apart from the excavator 100. As illustrated in FIG. 13B, in the captured image captured by the cameras 40B, 40R, and 40L, the vehicle body (the upper turning body 3) may appear. For this reason, when the monitor target enters a region very close to the excavator 100, a part of the monitor target may be hidden by the vehicle body, and the detecting unit 3012 may not be able to properly recognize (detect) the monitor target. Further, even when a part of the vehicle body does not appear in the captured image captured by the cameras 40B, 40R, and 40L, the cameras 40B, 40R, and 40L have a very wide vertical angle of view including a range from the ground near the excavator 100 to a distant location. Therefore, the ground portion in the proximity region very close to the excavator 100 (the cameras 40B, 40L, and 40R) may be excluded from the angle of view, resulting in the detecting unit 3012 not being able to properly recognize (detect) the monitor target because the entire monitor target does not appear in the captured image.

That is, regions 401B, 401L, and 401R in the vicinity of the cameras 40B, 40L, and 40R within the imaging possible ranges AVB, AVL, and AVR are outside the monitor area MA (the individual monitor areas MAB, MAL, and MAR) and correspond to the proximity region outside the monitor area.

Further, the individual monitor areas MAB, MAL, and MAR do not include regions 402B, 402L, and 402R at both end portions in the circumferential direction (the lateral direction) viewed from the excavator 100, defined by the angles of view in the horizontal direction in the imaging possible ranges AVB, AVL, and AVR, respectively. That is, the space between two of each of boundary lines MABe2, MALe2, and MARe2 at both ends of the circumferential direction (the lateral direction) viewed from the excavator 100, in each of the individual monitor areas MAB, MAL, and MAR, is slightly smaller than the angle of view in the horizontal direction of the cameras 40B, 40L, and 40R, respectively. As described above, the cameras 40B, 40L, and 40R have wide lenses, and, therefore, as illustrated in FIG. 13B, the distortion in the captured image increases toward the left and right from the center of the captured image, and a phenomenon in which an image inside the captured image collapses to the right and left (hereinafter, "image collapse phenomenon") is observed. Therefore, at the end portions of the angle of view in the horizontal direction of the cameras 40B, 40L, and 40R, the image collapse phenomenon may cause a part of the monitor target not to fit into the captured image, and as a result, the detecting unit 3012 may not be able to appropriately recognize (detect) the monitor target.

That is, the regions 402B, 402L, and 402R at both end portions in the circumferential direction (lateral direction) viewed from the excavator 100 of the imaging possible ranges AVB, AVL, and AVR, are outside the monitor area MA (the individual monitor areas MAB, MAL, and MAR) and correspond to the proximity region outside the monitor area.

Further, there are regions 403L and 403R that are not included in any of the imaging possible ranges AVB, AVL, and AVR of the cameras 40B, 40L, and 40R in the proximity regions at the left rear and right rear of the excavator 100. This is because the angle of view in the horizontal direction of the cameras 40B, 40L, and 40R is limited.

That is, the regions 403L and 403R on the left rear side and right rear side of the excavator 100 are outside the monitor area MA and correspond to proximity regions outside the monitor area.

Thus, for example, among the proximity regions in the horizontal direction as viewed from the excavator 100, the regions 401B, 401L, and 401R adjacent to each other in the planar view of the cameras 40B, 40L, and 40R, and the regions 403L and 403R at the rear side of the excavator 100, which are blind corners of the cameras 40B, 40L, and 40R, may not be included in the monitor area MA. Therefore, even when the monitor target enters the monitor area MA (the individual monitor area MAB, MAL, or MAR) and is detected by the detecting unit 3012, it is possible that the monitor target may subsequently move to the above-described region (the proximity region outside the monitor area), or that the excavator 100 moves so that the monitor target is relatively positioned in the above-described region (the proximity region outside the monitor area). That is, even though a monitor target exists near the excavator 100, the monitor target may not be detected by the detecting unit 3012.

Further, a front region AF, including a front central region AFM, a left front side region AFL, and a right front side region AFR, in the proximity region of the excavator 100, can be visually confirmed by the operator himself/herself, and, therefore, the front region AF is not set as the monitor area MA for monitoring the entry of a monitor target, in the first place.

That is, the front region AF of the excavator 100 is outside the monitor area MA and corresponds to the proximity region outside the monitor area.

Thus, in the proximate region in the horizontal direction from the excavator 100, the front region AF of the excavator 100 may not be included in the monitor area MA in the first place. Therefore, even when a monitor target enters the monitor area MA (the individual monitor area MAB, MAL, or MAR) and is detected by the detecting unit 3012, subsequently, there is a possibility that the monitor target moves to the front region AF or is positioned in the front region AF. That is, even though a monitor target exists near the excavator 100, the monitor target may not be detected by the detecting unit 3012.

Further, as illustrated in FIG. 14, when viewing the excavator 100 from the side, the imaging possible range AVB of the camera 40B can be defined by the angle of view in the vertical direction, from a direction substantially immediately below the camera 40B to a substantially horizontal direction. The individual monitor area MAB includes a region excluding the portion where the vehicle body of the excavator 100 (the upper turning body 3) appears, in the imaging possible range AVB of the camera 40B. The same applies to other cameras (the cameras 40L and 40R) included in the imaging apparatus 40. Therefore, a monitor target above the upper turning body 3, that is, in a region AU of the house portion (hereinafter, the "upper region"), or in a region AD (hereinafter, the "lower region") between the ground below the upper turning body 3 and the upper turning body 3 including the space between the left and right crawlers of the lower traveling body 1, cannot be detected by the detecting unit 3012. That is, the upper region AU and the lower region AD of the upper turning body 3 are not set as the monitor area in which entry of a monitor target is monitored, in the first place. In order for the monitor target to enter the upper region AU or the lower region AD, it is necessary for the monitor target to pass through the monitor area MA (horizontal monitor area) extending in the horizontal direction as viewed from the excavator 100 or to pass through the front region AF visible to the operator, so it is considered that the operator would notice the monitor target before the monitor target enters the proximity region.

That is, the proximity region in the vertical direction as viewed from the excavator 100 (the upper turning body 3), such as the upper region AU and the lower region AD of the upper turning body 3, is outside the monitor area MA and corresponds to the proximity region outside the monitor area.

Thus, the proximity region in the vertical direction as viewed from the excavator 100, i.e., the upper region AU and the lower region AD, may not be included in the monitor area MA in the first place. Therefore, even when the monitor target enters the monitor area MA (the individual monitor area MAB, MAL, or MAR) and is detected by the detecting unit 3012, subsequently, there is a possibility that the monitor target moves to the upper region AU using the lifting step of the upper turning body 3 and the like, moves down into the lower region AD, or is positioned in the lower region AD. That is, even though a monitor target exists near the excavator 100, the monitor target may not be detected by the detecting unit 3012.

<Specific Example of Operation of Surrounding Monitoring Apparatus>

Next, a specific operation of the surrounding monitoring apparatus 150 will be described with reference to FIGS. 15A to 15D.

Figure 15A:
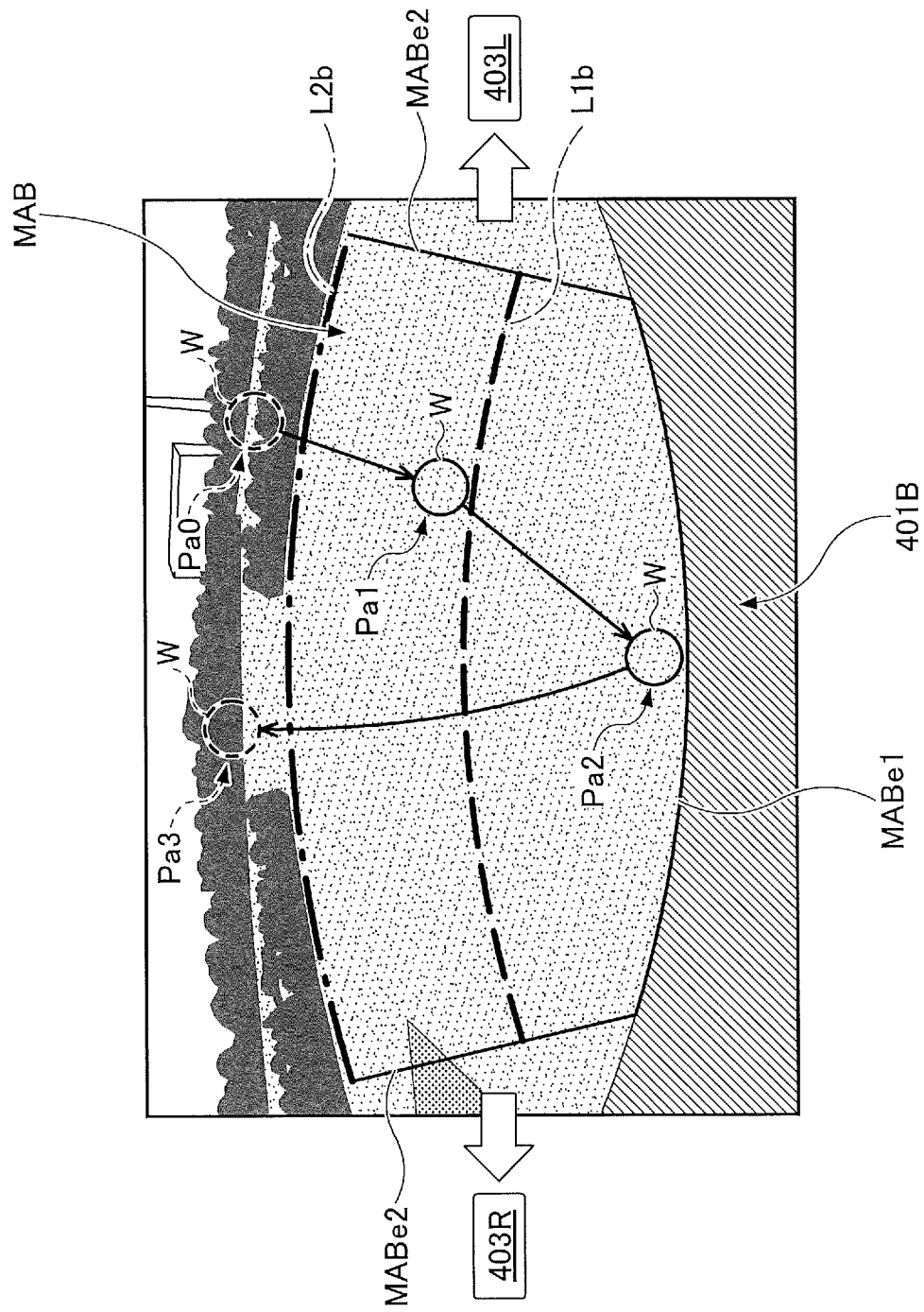
FIG. 15A is a diagram illustrating a first example of a specific operation of a surrounding monitoring apparatus.

First, FIG. 15A is a diagram illustrating a first example of a specific operation of the surrounding monitoring apparatus 150. Specifically, FIG. 15A schematically illustrates an example of a movement status of a worker W that is a monitor target, assuming the monitor area MA (the individual monitor area MAB) of FIG. 13B described above. In the drawing, the worker W illustrated by a solid line and the worker W illustrated by a dotted line represent a state where the worker W is detected by the detecting unit 3012 and a state where the worker W is not detected by the detecting unit 3012, respectively. Hereinafter, the same shall apply to FIGS. 15B to 15D.

In this example, the worker W at a position Pa0 in a distant region enters an attention region (position Pa1) in the monitor area (the individual monitor area MAB), enters a caution region (position Pa2), and then moves away from the excavator 100 to the distant region from the monitor area.

When the worker W enters the attention region (position Pa1) in the monitor area from the distant region (position Pa0), the detecting unit 3012 detects the worker W. Then, the alarm output unit 3014 and the operation limiting unit 3015 respectively start the alarm output and the operation limitation of the excavator 100 in response to the detection of the worker W by the detecting unit 3012.

Thereafter, when the worker W moves from the attention region (position Pa1) to the caution region (position Pa2) in the monitor area, the detecting unit 3012 recognizes that the worker W that has entered the monitor area has entered the caution region. The alarm output unit 3014 and the operation limiting unit 3015 respectively increase the alarm level and the limitation level of the operation limitation of the excavator 100 in response to a change in the relative position of the worker W with respect to the excavator 100 recognized by the detecting unit 3012.

Thereafter, when the worker W exits the monitor area and goes out to the distant region, the detecting unit 3012 no longer detects the worker W. Further, the detecting unit 3012 no longer detects the worker W, who had been continuously detected in the monitor area, after the worker W is last detected near the boundary line (i.e., the guide line L2b) with respect to the distant region in the monitor area, and, therefore, the tracking unit 3013 can determine that the worker W has gone out to the distant region. Specifically, the tracking unit 3013 can determine that the monitor target (the worker W), who has been detected by the detecting unit 3012, has gone out to the distant region when the monitor target (the worker W) is no longer detected in a relatively distant region from the excavator 100 within the monitor area (horizontal monitor area). At this time, the region that is relatively distant from the excavator 100 in the monitor area is, for example, the attention region where the distance D from the excavator 100 in the monitor area exceeds the predetermined distance D1. The region that is relatively distant from the excavator 100 within the monitor area may also be a region that is farthest from the excavator 100 when the monitor area (horizontal monitor area) is divided into three or more regions in a direction towards a location away from the excavator 100. The tracking unit 3013 may further determine whether the monitor target has moved out to a distant region considering the movement status, that is, the movement direction and the movement speed, of the monitor target, which is detected by the detecting unit 3012. For example, the tracking unit 3013 may determine whether the monitor target has gone out to the distant region based on whether the movement direction of the monitor target is toward the distant region before the monitor target is no longer detected by the detecting unit 3012, whether the movement speed of the monitor target is greater than or equal to a predetermined speed that is considered to be a speed at which the monitor target has gone out to the distant region, and the like.

In this case, the alarm output unit 3014 and the operation limiting unit 3015 cancel the alarm output and the operation limitation of the excavator 100, respectively. This is because it is recognized that the worker W has gone out from the monitor area to the distant region in the direction away from the excavator 100, and the safety of the area in the surroundings of the excavator 100 is secured.

As described above, the alarm output unit 3014 and the operation limiting unit 3015 cancel the alarm output and the operation limitation of the excavator 100 when it is determined that the monitor target who has been detected by the detecting unit 3012 is no longer detected and the tracking unit 3013 determines that the monitor target has gone out to the distant region.

Figure 15B:
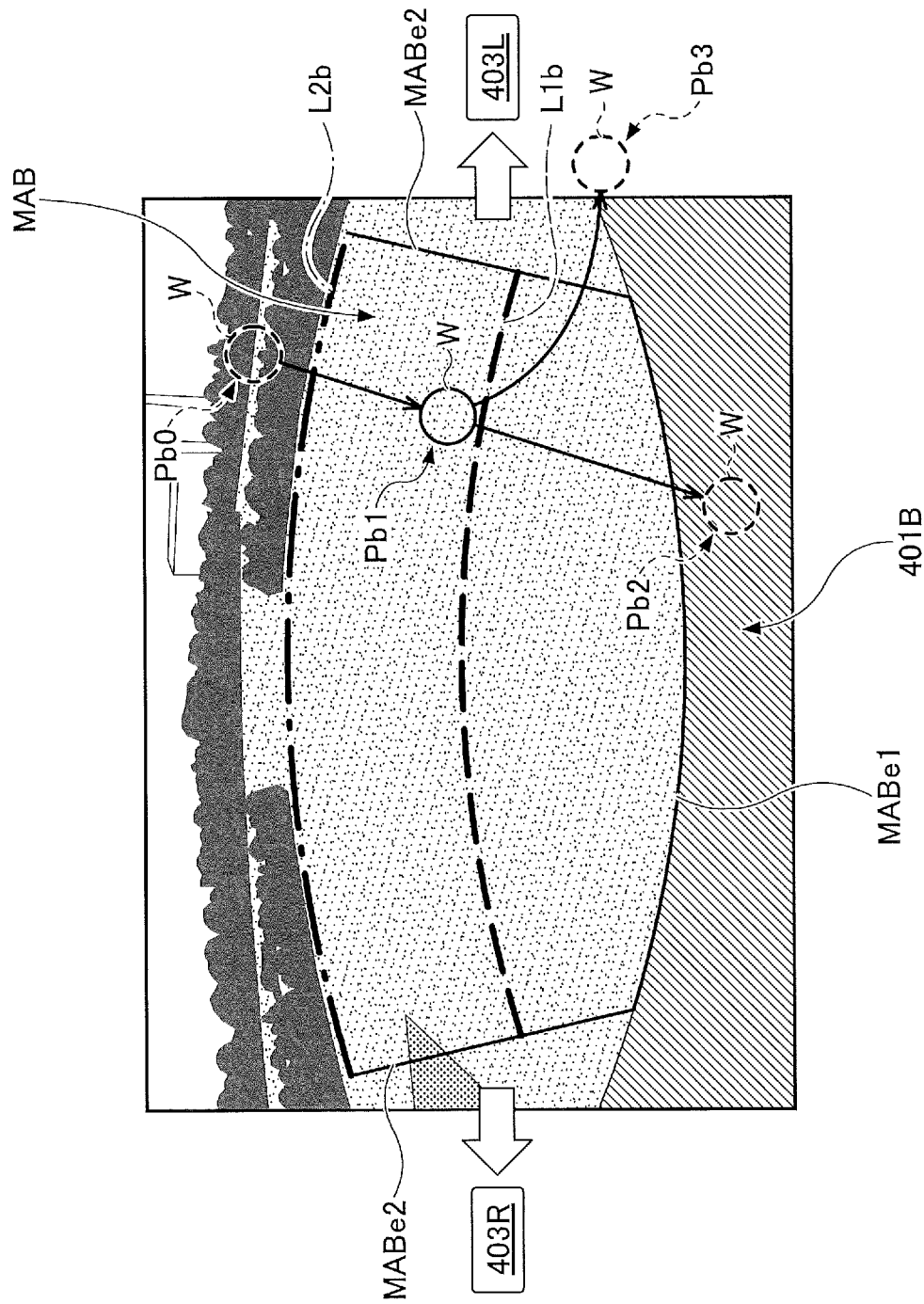
FIG. 15B a diagram illustrating a second example of a specific operation of a surrounding monitoring apparatus.

Subsequently, FIG. 15B is a diagram illustrating a second example of a specific operation of the surrounding monitoring apparatus 150.

In this example, the worker W at a position Pb0 in a distant region enters an attention region (position Pb1) in the monitor area (the individual monitor area MAB), approaches the excavator 100, and exits from the monitor area and goes out to a region 401B (position Pb2) or a region 403L (position Pb3), i.e., the proximity region outside the monitor area. Hereinafter, the operation of the surrounding monitoring apparatus 150 when the worker W moves from the position Pb0 to the position Pb1 is the same as the operation when the worker W moves from the position Pa0 to the position Pa1 in the first example of FIG. 15A, and, therefore, the description thereof will be omitted.

When the worker W exits the monitor area (position Pb1) and goes out to the proximity regions outside the monitor area (positions Pb2 and Pb3), the detecting unit 3012 no longer detects the worker W that had been detected in the monitor area. Further, the worker W, which had been continuously detected in the monitor area by the detecting unit 3012, is no longer detected after the worker W is last detected in the monitor area near the boundary line with respect to the proximity region outside the monitor area, and, therefore, the tracking unit 3013 may determine that the worker W has not gone out to the distant region, that is, the worker W may still be present in the proximity region of the excavator 100. The tracking unit 3013 may specifically determine that the worker W has gone out to the proximity region outside the monitor area based on the above-described status. Specifically, the tracking unit 3013 may determine that the monitor target (the worker W) that has been detected by the detecting unit 3012 has not gone out to the distant region (that is, the monitor target (the worker W) may be present in a proximity region), when it has been determined that the monitor target (the worker W) is no longer detected when the monitor target was in a region other than a region relatively distant from the excavator 100, within the monitor area (horizontal monitor area). In this case, the region that is relatively distant from the excavator 100 within the monitor area is, for example, an attention region where the distance D from the excavator 100 in the monitor area exceeds the predetermined distance D1, as in the first example of FIG. 15A. The region that is relatively distant from the excavator 100 within the monitor area, may also be the region that is farthest from the excavator 100 when the monitor area is divided into three or more regions in a direction away from the excavator 100, as is the case with the first example of FIG. 15A. Further, the tracking unit 3013 may determine that the monitor target has gone out to the proximity region outside the monitor area when it is determined that the monitor target is no longer detected in a region relatively close to the excavator 100 in the monitor area (horizontal monitor area). At this time, the region relatively close to the excavator 100 in the monitor area is, for example, a caution region in the monitor area where the distance D from the excavator 100 is less than or equal to the predetermined distance D1. The region that is relatively close to the excavator 100 within the monitor area may be a region other than a region that is farthest from the excavator 100 when the monitor area is divided into three or more regions in a direction away from the excavator 100. The tracking unit 3013 may further determine whether the monitor target has gone out to the proximity region outside the monitor area considering the movement status, that is, the movement direction and the movement speed, of the monitor target that had been detected by the detecting unit 3012. For example, the tracking unit 3013 may determine whether the monitor target has gone out to the proximity region outside the monitor area based on whether the movement direction of the monitor target before the monitor target is no longer detected by the detecting unit 3012 is toward the proximity region outside the monitor area, whether the movement speed of the monitor target is greater than or equal to a predetermined speed that is considered to be a speed at which the monitor target has gone out to the proximity region outside the monitor area, and the like. When it is determined that the monitor target, that had been detected by the detecting unit 3012, is no longer detected at an end portion facing the proximity region outside the monitor area within the monitor area (that is, in the vicinity of a boundary line facing the proximity region outside the monitor area), the tracking unit 3013 may determine that the monitor target has gone out to the proximity region outside the monitor area. In this example, when it is determined that the monitor target, that had been detected by the detecting unit 3012, is no longer detected at both ends in the lateral direction as viewed from the excavator 100 in the monitor area (that is, near the boundary line MABe2 in the monitor area), the tracking unit 3013 may determine that the monitor target has gone out to the proximity region. When it is determined that the monitor target, that had been detected by the detecting unit 3012, is no longer detected at an end portion facing the excavator 100 (the camera 40B) in a planar view in the monitor area (that is, in the vicinity of the boundary line MABe1 in the monitor area), the tracking unit 3013 may determine that the monitor target has gone out to the proximity region.

In this case, the alarm output unit 3014 and the operation limiting unit 3015 continue the alarm output and the operation limitation of the excavator 100, respectively. Although the detecting unit 3012 does not detect the worker W any longer, it is possible that the worker W is still present in a proximity region that is close to the excavator 100, specifically, the proximity region outside the monitor area. Therefore, it is not possible to determine that the safety of the excavator 100 is secured. The alarm output unit 3014 and the operation limiting unit 3015 may change the mode of the alarm output or the mode of the operation limitation of the excavator 100 when the alarm output and the operation limitation of the excavator 100 are continued. Accordingly, the operator and the like can recognize a status in which the monitor target is not detected by the detecting unit 3012 but the monitor target may still exist in a proximity region including the monitor area of the excavator 100 (in the case where it is determined that the monitor target has gone out to the proximity region outside the monitor area by the tracking unit 3013, the proximity region outside the monitor area). That is, the alarm output unit 3014 and the operation limiting unit 3015 may provide the operator with information indicating that a monitor target may still exist in a proximity region including the monitor area or in the proximity region outside the monitor area, by changing the alarm output mode or the mode of the operation limitation. For example, the alarm output unit 3014 may provide different types of alarm sounds (the sound pressure, the tone color, the bellowing cycle, etc.).

As described above, even when the monitor target, that had been detected by the detecting unit 3012, is no longer detected, the alarm output unit 3014 and the operation limiting unit 3015 continue the alarm output and the operation limitation of the excavator 100, when it is determined by the tracking unit 3013 that the monitor target has not gone out to a distant region (that is, may still be present in a proximity region) or that the monitor target has gone out to a proximity region outside the monitor area. This allows the surrounding monitoring apparatus 150 to continue outputting an alarm or limiting the operation of the excavator 100 in a status where the monitor target may be in a proximity region near the excavator 100.

For example, during the idling of excavator 100, there may be cases where the operator is away from the excavator 100 and another operator and the like approaches the excavator 100 for the purpose of inspection and the like and exists in the proximity region outside the monitor area. In this case, when the operator returns to the excavator 100, the surrounding monitoring apparatus 150 causes the alarm output or the operation limitation of the excavator 100 to be continued because of the presence of a worker and the like in the proximity region of the excavator 100, thereby preventing a situation where the operator starts work with the excavator 100 in such a status.

Figure 15C:
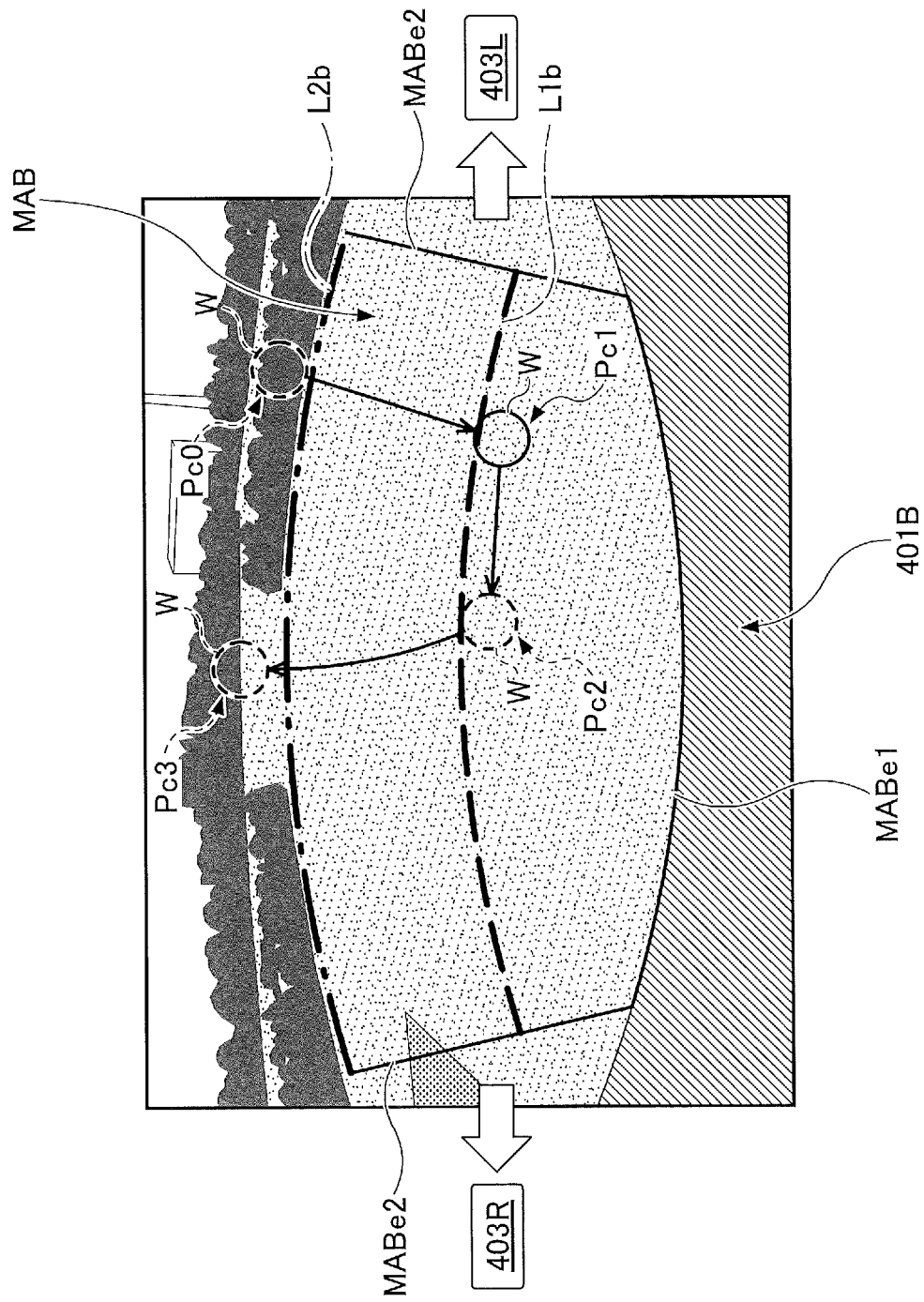
FIG. 15C a diagram illustrating a third example of a specific operation of a surrounding monitoring apparatus.

Subsequently, FIG. 15C illustrates a third example of a specific operation of the surrounding monitoring apparatus 150.

In this example, the worker W at a position Pc0 in a distant region enters an attention region (position Pc1) in the monitor area (the individual monitor area MAB) from the distant region (position Pc0) outside the monitor area. Thereafter, the worker W is in the monitor area (position Pc2) but is no longer detected by the detecting unit 3012, and goes out from the monitor area to a distant region (position Pc3) without being detected again by the detecting unit 3012. Hereinafter, the operation of the surrounding monitoring apparatus 150 when the worker W moves from the position Pc0 to the position Pc1 is the same as the operation when the worker W moves from the position Pa0 to the position Pa1 in the first example of FIG. 14A, and, therefore, the description thereof will be omitted.

Even when the worker W is in the monitor area (position Pc2), if the background of the captured image captured by the imaging apparatus 40 and the worker W are assimilated or the worker W is hidden by an obstacle as described above, the worker W will no longer be detected by the detecting unit 3012. As described above, also when a difference in the height direction arises between the position of the worker W and the position of the excavator 100, the worker W may no longer be detected by the detecting unit 3012. The tracking unit 3013 can determine that the detecting unit 3012 has lost sight of the worker W in the monitor area when the worker W, that had been continuously detected by the detecting unit 3012, is no longer detected without any sign of the worker W going out of the monitor area. Specifically, the tracking unit 3013 may determine that the detecting unit 3012 has lost sight of a monitor target (the worker W) in the monitor area when it is determined that the monitor target (the worker W) is no longer detected in a region relatively distant from the boundary of the monitor area (that is, a predefined central region in the horizontal monitor area). The tracking unit 3013 may determine whether the detecting unit 3012 has lost sight of the worker W in the monitor area, considering the movement status of the monitor target within the monitor area, that is, the movement direction and the movement speed. For example, the tracking unit 3013 determines whether the detecting unit 3012 has lost sight of the monitor target based on whether the movement speed of the monitor target is less than a predetermined speed that is considered to be a speed at which the monitor target has gone out by crossing the boundary of the monitor area.

In this case, the alarm output unit 3014 and the operation limiting unit 3015 continue the alarm output and the operation limitation of the excavator 100, respectively. Although the detecting unit 3012 no longer detects the worker W, it is possible that the worker W that has been lost from the sight of the detecting unit 3012 is still in a proximate area including a monitor area, specifically, within the monitor area, and thus it cannot be determined that the safety of the excavator 100 is secured. Similar to the second example of FIG. 15B, the alarm output unit 3014 and the operation limiting unit 3015 may change the mode of the alarm output and the mode of the operation limitation of the excavator 100 when the alarm output and the operation limitation of the excavator 100 are continued. Accordingly, the operator and the like can recognize a status in which the monitor target is no longer detected by the detecting unit 3012 but the monitor target may still exist in a proximate area including the monitor area of the excavator 100. That is, the alarm output unit 3014 and the operation limiting unit 3015 can provide the operator with information indicating that a monitor target may still be present in a proximity region including the monitor area, by changing the alarm output mode or the operation limiting mode. The alarm output unit 3014 and the operation limiting unit 3015 may change the alarm output mode and the operation limiting mode of the excavator 100 to a mode different from that in the second example of FIG. 15B, that is, when the monitor target has gone out to the proximity region outside the monitor area. Accordingly, the operator and the like can recognize a status in which a monitor target is not detected by the detecting unit 3012, but the monitor target may still exist in the monitor area of the excavator 100. That is, the alarm output unit 3014 and the operation limiting unit 3015 can provide the operator with information, by distinguishing between information about the possibility that a monitor target may be still present in the monitor area and information about the possibility that a monitor target may be still present in the proximity region outside the monitor area, by changing the alarm output mode or the operation limiting mode. For example, the alarm output unit 3014 may provide different types of alarm sounds (the sound pressure, the tone color, the bellowing cycle, etc.) as in the second example of FIG. 15B.

Note that the detecting unit 3012 may detect the worker W again in the monitor area before the worker W exits the monitor area (position Pc3). For example, when the worker W or the excavator 100 moves, assimilation of the worker W and the background on the captured image captured by the imaging apparatus 40 may be eliminated, or a state where the worker W is hidden by an obstacle as viewed from the imaging apparatus 40 may be eliminated. In this case, the tracking unit 3013 can determine that the worker W has left the monitor area and has gone out to a distant region, and, therefore, the alarm output and the operation limitation of the excavator 100 are canceled depending on the result of the determination by the tracking unit 3013.

As described above, even when the monitor target that had been detected by the detecting unit 3012 is no longer detected, the alarm output unit 3014 and the operation limiting unit 3015 continue the alarm output and the operation limitation of the excavator 100 when it is determined by the tracking unit 3013 that the detecting unit 3012 has lost sight of the monitor target in the monitor area. This allows the surrounding monitoring apparatus 150 to continue outputting an alarm or limiting the operation of the excavator 100 in a status where a monitor target that has been lost from the sight of the detecting unit 3012 in the monitor area, may exist in a proximity region near the excavator 100.

Figure 15D:
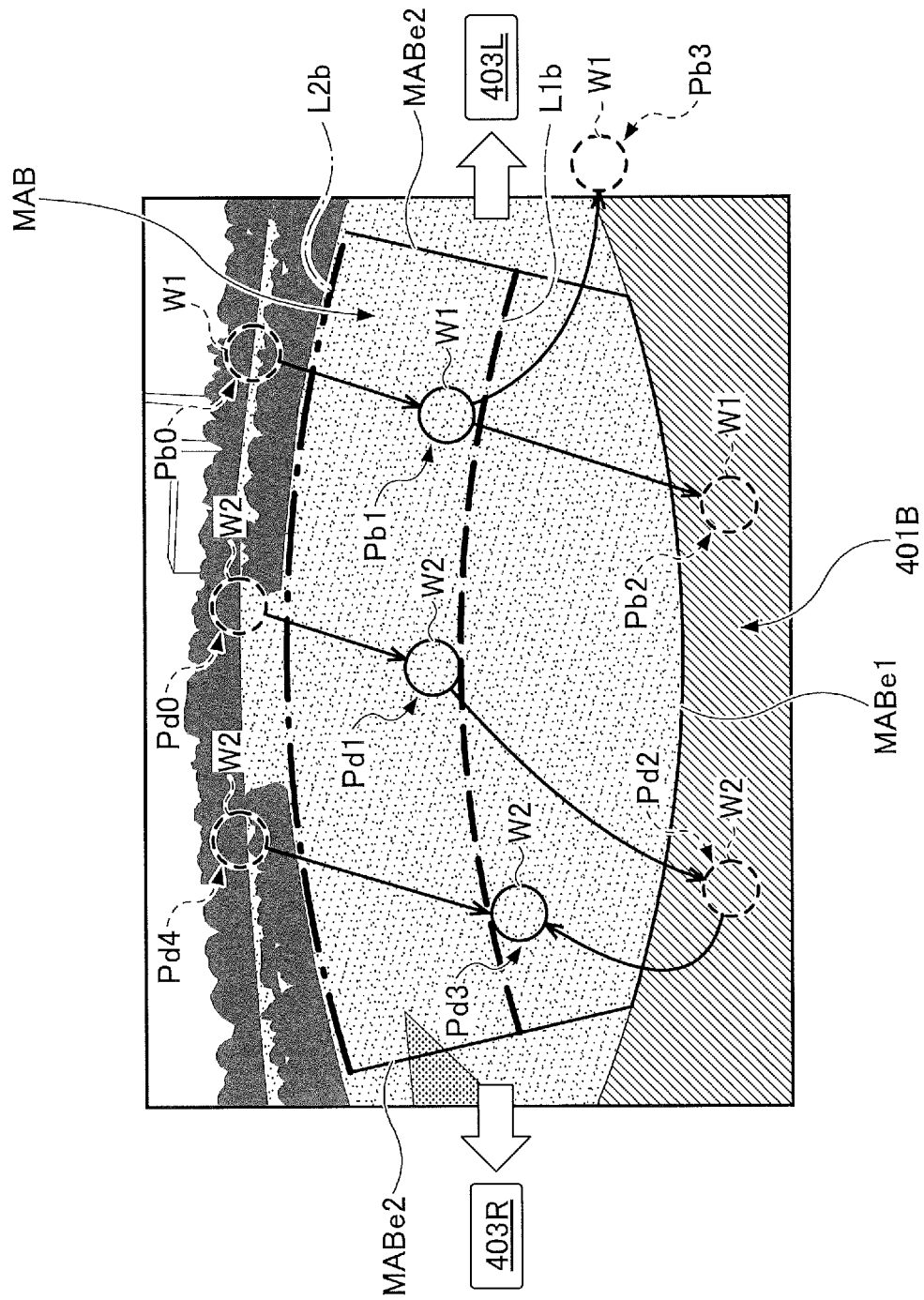
FIG. 15D is a diagram illustrating a fourth example of a specific operation of a surrounding monitoring apparatus.

Subsequently, FIG. 15D is a diagram illustrating a fourth example of a specific operation of the surrounding monitoring apparatus 150.

In this example, a worker W1 at the position Pb0 in the distant region enters the monitor area (the individual monitor area MAB) (position Pb1), approaches the excavator 100, and exits from the monitor area and goes out to the region 401B (position Pb2) or a region 403L (position Pb3), i.e., a proximity region outside the monitor area of the excavator 100. Also, at the same timing, a worker W2 at a position Pd0 in a distant region enters the monitor area (position Pd1), approaches the excavator 100, and exits from the monitor area and goes out to the region 401B (position Pd2), i.e., a proximity region outside the monitor area of the excavator 100. Subsequently, the worker W2 moves away from the excavator 100, returns from the proximity region outside the monitor area to the monitor area (position Pd3), and exits from the monitor area and goes out to the distant region (position Pd4). Hereinafter, the operations of the surrounding monitoring apparatus 150 when the workers W1 and W2 move from the positions Pb0 and Pd0 to the positions Pb1 and Pd1, respectively, are the same as the operation when the worker W moves from the position Pa0 to the position Pa1 in the first example of FIG. 14A, and, therefore, the description thereof will be omitted.

When the workers W1 and W2 exit from the monitor area (positions Pb1 and Pd1) and go out to the proximity region outside the monitor area (positions Pb2, Pb3 and Pd2), the detecting unit 3012 no longer detects the workers W1 and W2 that had been detected in the monitor area. Further, the detecting unit 3012 no longer detects the workers W1 and W2, that had been continuously detected in the monitor area, after the workers W1 and W2 are last detected in the monitor area near the boundary line with respect to the proximity region outside the monitor area, and, therefore, the tracking unit 3013 can determine that the worker W has not gone out to the distant region, that is, the worker W may still be present in the proximity region including the monitor area, as in the second example of FIG. 15B. Further, the tracking unit 3013 counts the number (hereinafter, the "number of the undetected monitor targets", as a matter of convenience) of the monitor targets that have not gone out to the distant region, that is, the monitor targets that may be still present in the proximity region (hereinafter, the "undetected monitor target", as a matter of convenience), among the monitor targets that are no longer detected after being detected by the detecting unit 3012. An undetected monitor target includes not only a monitor target that has gone out to the proximity region outside the monitor area as in this example, but also a monitor target that has been lost from the sight of the detecting unit 3012 in the monitor area, as in the third example of FIG. 15C. In this example, the tracking unit 3013 counts the number of undetected monitor targets as "2" when the workers W1 and W2 exit from the monitor area and go out to the proximity region outside the monitor area and are no longer detected by the detecting unit 3012.

In this case, the alarm output unit 3014 and the operation limiting unit 3015 continue the alarm output and the operation limitation of the excavator 100, respectively, as in the second example of FIG. 15B. As in the case of the second example of FIG. 15B, when the alarm output and the operation limitation of the excavator 100 are continued, the alarm output unit 3014 and the operation limiting unit 3015 may change the mode of the alarm output or the mode of the operation limitation of the excavator 100 in order to cause the operator to recognize that a monitor target may still be present in a proximity region.

Thereafter, when the worker W2 returns from the proximity region outside the monitor area (position Pd2) to the inside of the monitor area (position Pd3), the detecting unit 3012 detects the worker W2 again. At this time, the detecting unit 3012 may apply a known image recognition technology and, for example, by comparing the feature quantity of the monitor target that is no longer detected with the feature quantity of the monitor target that is detected, it is possible to identify that the monitor target detected again is the same target as the previously detected monitor target (the worker W2). Further, the tracking unit 3013 changes the number of the undetected monitor targets to "1", because the only undetected monitor target is the worker W1 as the worker W2 is detected again by the detecting unit 3012.

In this case, the alarm output unit 3014 and the operation limiting unit 3015 continue the alarm output and the operation limitation of the excavator 100, respectively. This is because the detecting unit 3012 has detected the worker W2 in the monitor area, and a status in which there is a possibility that the monitor target (the worker W1) still exists in a proximity region including the monitor area, is still continued. Further, the alarm output unit 3014 and the operation limiting unit 3015 may continue the alarm output and the operation limitation of the excavator 100 in a mode that causes the operator to recognize that the monitor target may still be present in a proximity region including the monitor area. This is because it is considered that it is more difficult for the operator to recognize the monitor target (the worker W1) that is no longer detected by the detecting unit 3012 than the monitor target (the worker W2) in the monitor area detected by the detecting unit 3012.

Thereafter, when the worker W2 moves from the monitor area (position Pd3) to the distant region (position Pd4), the detecting unit 3012 no longer detects the worker W2. The tracking unit 3013 can determine that the worker W2 has gone out to the distant region, because the worker W2, that had been continuously detected in the monitor area by the detecting unit 3012, is no longer detected after being last detected in the monitor area near the boundary line with respect to the distant region. On the other hand, the tracking unit 3013 retains "1" as the number of undetected monitor targets because it is possible that the status, in which the monitor target (the worker W1) still exists in the proximity region including the monitor area, is continued, even though the worker W2 has gone out to the distant region.

In this case, the alarm output unit 3014 and the operation limiting unit 3015 continue the alarm output and the operation limitation of the excavator 100, respectively. This is because although the monitor target is no longer detected by the detecting unit 3012, the number of undetected monitor targets is "1", and it is possible that the monitor target (the worker W1) is still present in a proximity region including the monitor area.

As described above, the alarm output unit 3014 and the operation limiting unit 3015 continue the alarm output and the operation limitation when the number of the undetected monitor targets counted by the tracking unit 3013 is not zero, even when the monitor target is no longer detected by the detecting unit 3012. On the other hand, the alarm output unit 3014 and the operation limiting unit 3015 cancel the alarm output and the operation limitation of the excavator 100, when the monitor target is no longer detected by the detecting unit 3012 and the number of the undetected monitor targets counted by the tracking unit 3013 is zero. Accordingly, the surrounding monitoring apparatus 150 can recognize whether there is a monitor target (undetected monitor target) that has not gone out to a distant region, among the monitor targets that are no longer detected by the detecting unit 3012, in a status where a plurality of monitor targets enter and exit the monitor area. The surrounding monitoring apparatus 150 can continue outputting an alarm or limiting an operation when there is an undetected monitor target, according to the recognition of the presence or absence of an undetected monitor target.

<Details of Surrounding Monitoring Process by Surrounding Monitoring Apparatus>

Next, with reference to FIG. 16, the details of the process related to the alarm output and the operation limitation of the excavator 100 based on the detection of the monitor target by the surrounding monitoring apparatus 150 according to the present embodiment (hereinafter, "surrounding monitoring process"), specifically, the process flow, will be described.

Figure 16:
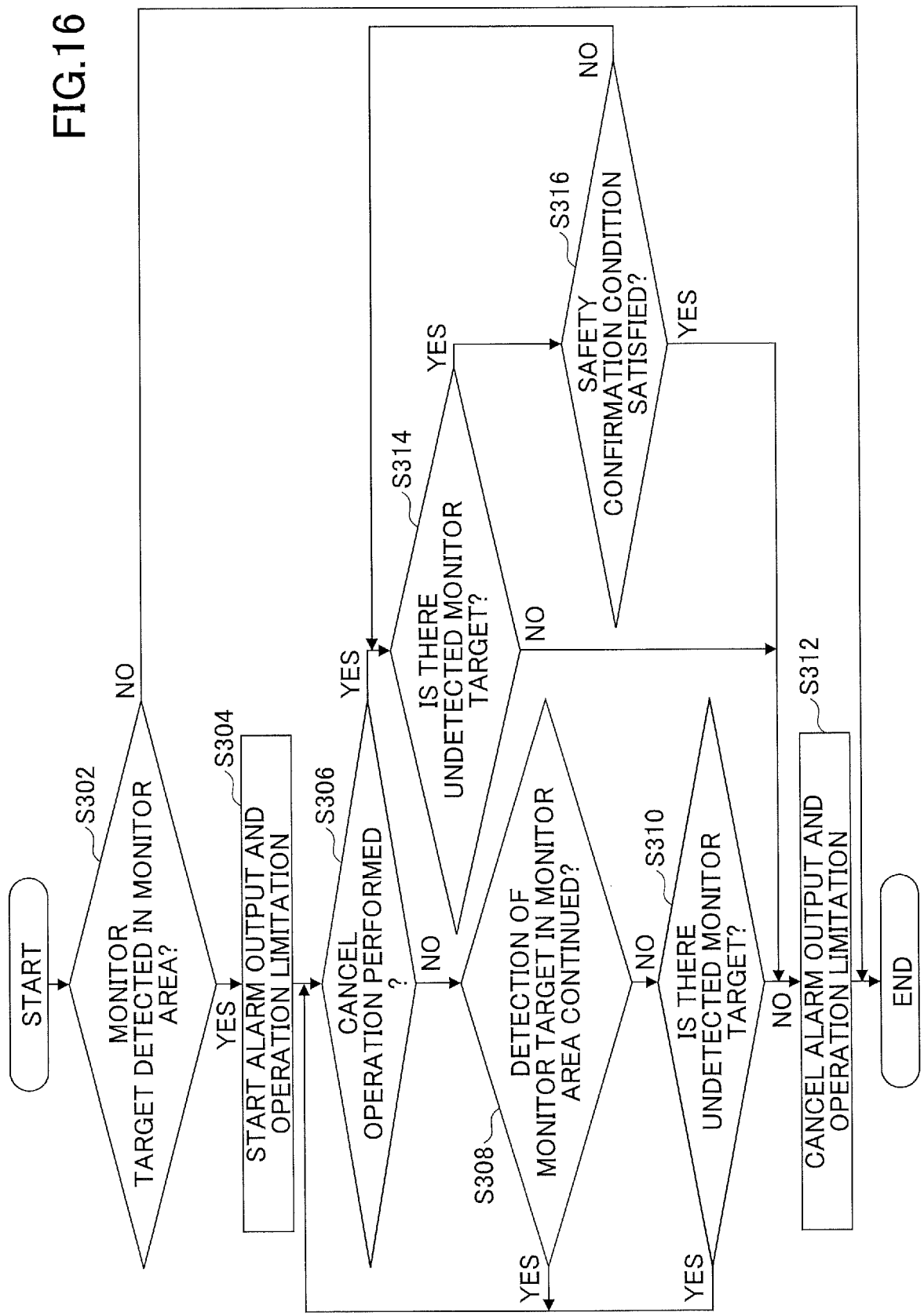
FIG. 16 is a flowchart schematically illustrating an example of a monitoring process by a surrounding monitoring apparatus.

FIG. 16 is a flowchart schematically illustrating an example of a surrounding monitoring process performed by the surrounding monitoring apparatus 150 (the controller 30). For example, the process according to the flowchart is executed repeatedly for each predetermined processing cycle while the excavator 100 is in operation, when the alarm output and the operation limitation of the excavator 100 by the alarm output unit 3014 and the operation limiting unit 3015 are not performed.

The processes of steps S302 and S306 to S316 may be performed by at least one of the alarm output unit 3014 and the operation limiting unit 3015, and, therefore, the subject of the operations of these processes will be referred to as the "alarm output unit 3014 and the like" as a matter of convenience.

In step S302, the alarm output unit 3014 and the like determines whether a monitor target is detected in the monitor area by the detecting unit 3012, and more specifically, whether a monitor target in the monitor area is recognized in a captured image captured by the imaging apparatus 40. When a monitor target is detected in the monitor area by the detecting unit 3012, the alarm output unit 3014 and the like proceeds to step S304. When a monitor target is not detected, the alarm output unit 3014 and the like terminates the current process.

In step S304, the alarm output unit 3014 starts the alarm output through the display apparatus 50 and the voice sound output apparatus 52, and the operation limiting unit 3015 controls the gate lock valve 54 and starts the operation limitation of the excavator 100.

In step S306, the alarm output unit 3014 and the like determines whether the cancel switch 70 is operated by an operator and the like. When the cancel switch 70 is not operated by an operator and the like, the alarm output unit 3014 and the like proceeds to step S308, and when the cancel switch 70 is operated, the alarm output unit 3014 and the like proceeds to step S314.

In step S308, the alarm output unit 3014 and the like determines whether a state in which the monitor target is detected in the monitor area by the detecting unit 3012 is continued. When the monitor target is not continuously detected in the monitor area by the detecting unit 3012, that is, when the monitor target is no longer detected by the detecting unit 3012, the alarm output unit 3014 and the like proceeds to step S310. Otherwise, the alarm output unit 3014 and the like returns to step S306 and repeats the processes from step S306 and onwards. Accordingly, the surrounding monitoring apparatus 150 may continue to output an alarm or limit the operation of the excavator 100 to improve the safety of the excavator 100 in the status where a monitor target is continuously present in the monitor area.

In step S310, the alarm output unit 3014 and the like determines whether there is a monitor target (that is, an undetected monitor target) that may be still present in a proximity region including the monitor area among the monitor targets that are no longer detected after being detected by the detecting unit 3012. Specifically, the alarm output unit 3014 and the like determines whether the number of the undetected monitor targets counted by the tracking unit 3013 is one or more. When there is no undetected monitor target, that is, when the number of undetected monitor targets counted by the tracking unit 3013 is zero, the alarm output unit 3014 and the like proceeds to step S312. On the other hand, when there is an undetected monitor target, that is, when the number of undetected monitor targets counted by the tracking unit 3013 is not zero, the alarm output unit 3014 and the like returns to step S306 and repeats the processes from step S306 and onwards. Thus, the surrounding monitoring apparatus 150 can continue to output an alarm and limit the operation of the excavator 100 to further improve the safety of the excavator 100 in a status where a monitor target may still be present in a proximity region including the monitor area of the excavator 100.

In step S312, the alarm output unit 3014 cancels the alarm output through the display apparatus 50 and the voice sound output apparatus 52, and the operation limiting unit 3015 controls the gate lock valve 54 to cancel the operation limitation of the excavator 100, and the current process is terminated.

On the other hand, in step S314, similarly to step S310, the alarm output unit 3014 and the like determines whether there is an undetected monitor target, that is, whether the number of undetected monitor targets counted by the tracking unit 3013 is one or more. When there is no undetected monitor target, that is, when the number of undetected monitor targets counted by the tracking unit 3013 is zero, the alarm output unit 3014 and the like proceeds to step S312. On the other hand, when there is an undetected monitor target, that is, when the number of undetected monitor targets counted by the tracking unit 3013 is not zero, the alarm output unit 3014 and the like proceeds to step S316.

In step S316, the alarm output unit 3014 and the like determines whether an additional condition (hereinafter, the "safety confirmation condition") indicating that the safety in the surroundings of the excavator 100 is confirmed is satisfied.

For example, the safety confirmation condition is that "the operator has confirmed the safety of the surroundings of the excavator 100". The controller 30 may determine whether the safety confirmation condition is satisfied based on the elapsed time between the start of the alarm output and the operation limitation of the excavator 100, and the operation of the cancel switch 70. When the elapsed time is relatively long, it may be determined that the safety in the surroundings of the excavator 100 is highly likely to have been confirmed by the operator. The controller 30 may specifically determine whether the safety confirmation condition is satisfied based on the detection information of a sensor (for example, a line-of-sight sensor, a camera, and the like) that detects the operation of an operator.

For example, the safety confirmation condition is that "the cancellation of the alarm output and the operation limitation of the excavator 100 is permitted outside the excavator 100". The controller 30 may determine whether the safety confirmation condition is satisfied based on whether a predetermined pose or gesture indicating cancel permission has been performed by a worker, a supervisor, and the like in the surroundings of the excavator 100 appearing in a captured image captured by the imaging apparatus 40. Further, the controller 30 may determine whether the safety confirmation condition is satisfied based on whether a signal corresponding to cancel permission (hereinafter, a "cancel permission signal") is received through a predetermined communication device (not illustrated) from a mobile terminal (for example, a general-purpose smartphone, a tablet terminal, or an exclusive-use mobile terminal) possessed by a supervisor of a worksite, a management terminal located at a management office of the worksite, or a management server installed outside the worksite and the like. In this case, the mobile terminal, the management terminal, or the management server may acquire a captured image of the surroundings of the excavator 100 from a drone or another excavator at the worksite. Accordingly, the mobile terminal, the management terminal, or the management server can confirm the safety in the surroundings of the excavator 100 by analyzing the captured image and automatically transmit a cancel permission signal to the excavator 100 when the safety is confirmed. The cancel permission signal may also be transmitted directly from the drone or another excavator to the excavator 100. Further, the excavator 100 may transmit a signal corresponding to a request for cancellation (a cancel request signal) to the mobile terminal, the management terminal, the management server, the drone, or another excavator in response to a request (for example, a predetermined operation) from an operator and the like. When the mobile terminal, the management terminal, the management server, the drone, or another excavator and the like receives the cancel request signal and subsequently accepts an operation to permit the cancellation of the output of an alarm or the operation limitation of the excavator 100 from a supervisor or a manager of the worksite or an administrator of the management server, the cancel permission signal may be transmitted to the excavator 100.

When the safety confirmation condition is satisfied, the alarm output unit 3014 and the like proceeds to step S312. When the safety condition is not satisfied, the alarm output unit 3014 and the like returns to step S314 and repeats the process. Accordingly, even when the cancel switch 70 is operated in a status where a monitor target may still exist in a proximity region including the monitor area of the excavator 100, if the safety confirmation is insufficient, that is, if the safety confirmation condition is not satisfied, the alarm output and the operation limitation of the excavator 100 can be continued to further improve the safety of the excavator 100.

<Functions>

As described above, in the present embodiment, after the alarm output and the operation limitation of the excavator 100 starts, even when the monitor target that had been detected by the detecting unit 3012 is no longer detected, the alarm output unit 3014 and the operation limiting unit 3015 continue the output of the alarm and the operation limitation of the excavator 100, depending on the status when the monitor target shifts from a state of being detected by the detecting unit 3012 to a state of not being detected. As described above, depending on the status when the monitor target shifts from a state of being detected by the detecting unit 3012 to a state of not being detected, there may be cases where it is highly likely that the monitor target is still present in a proximity region including the monitor area of the excavator 100. To address such a status, the surrounding monitoring apparatus 150 may continue to output an alarm or limit the operation of the excavator 100 so as to provide information to an operator about the possibility that a monitor target may still be in the proximity region of the excavator 100, including the monitor area. Therefore, the surrounding monitoring apparatus 150 according to the present embodiment can improve the safety of the excavator 100.

Further, in the present embodiment, by continuing the alarm output and the operation limitation of the excavator 100, information relating to the possibility that a monitor target still exists in a proximity region relatively close to the excavator 100 including the monitor area, may be provided to the operator and the like, but the information may be provided by other methods. For example, when there is a possibility that a monitor target, which is no longer detected by the detecting unit 3012, is still present in a proximity region, the surrounding monitoring apparatus 150 may display a message indicating this possibility on the display apparatus 50, or may output a voice sound indicating this possibility through the voice sound output apparatus 52. Further, when there is a possibility that a monitor target, which is no longer detected by the detecting unit 3012, is still present in a proximity region, the surrounding monitoring apparatus 150 may display the above-described number of undetected monitor targets on the display apparatus 50 or may output a voice sound expressing the above-described number of undetected monitor targets through the voice sound output apparatus 52. That is, the surrounding monitoring apparatus 150 may provide information relating to the possibility that a monitor target still exists in a proximity region relatively close to the excavator 100 that includes the monitor area of the detecting unit 3012, specifically, information relating to the possibility that a monitor target that is not detected by the detecting unit 3012 may still exist in a proximity region of the excavator 100 that includes the monitor area, to an operator by any method. Accordingly, the surrounding monitoring apparatus 150 may inform an operator, a worker in the surroundings of the excavator 100, and the like that an undetected monitor target may exist in a proximity region of the excavator 100 even when the monitor target is not detected by the detecting unit 3012.

<Modifications/Variations>

Although the second embodiment has been described in detail above, various modifications and variations can be made within the scope of the gist of the contents of the present embodiment.

For example, in the present embodiment, the monitor area of the surrounding monitoring apparatus 150 is configured only by the area defined (extending) in a horizontal direction as viewed from the excavator 100, i.e., the horizontal monitor area, but the monitor area may include a monitor area in the vertical direction as viewed from the excavator 100, i.e., a vertical monitor area (hereinafter, a "vertical monitor area", as a matter of convenience). Hereinafter, the surrounding monitoring apparatus 150 in which a monitor area including the vertical monitor area in addition to the horizontal monitor area is set, will be described with reference to FIGS. 17 and 18.

Figure 17:
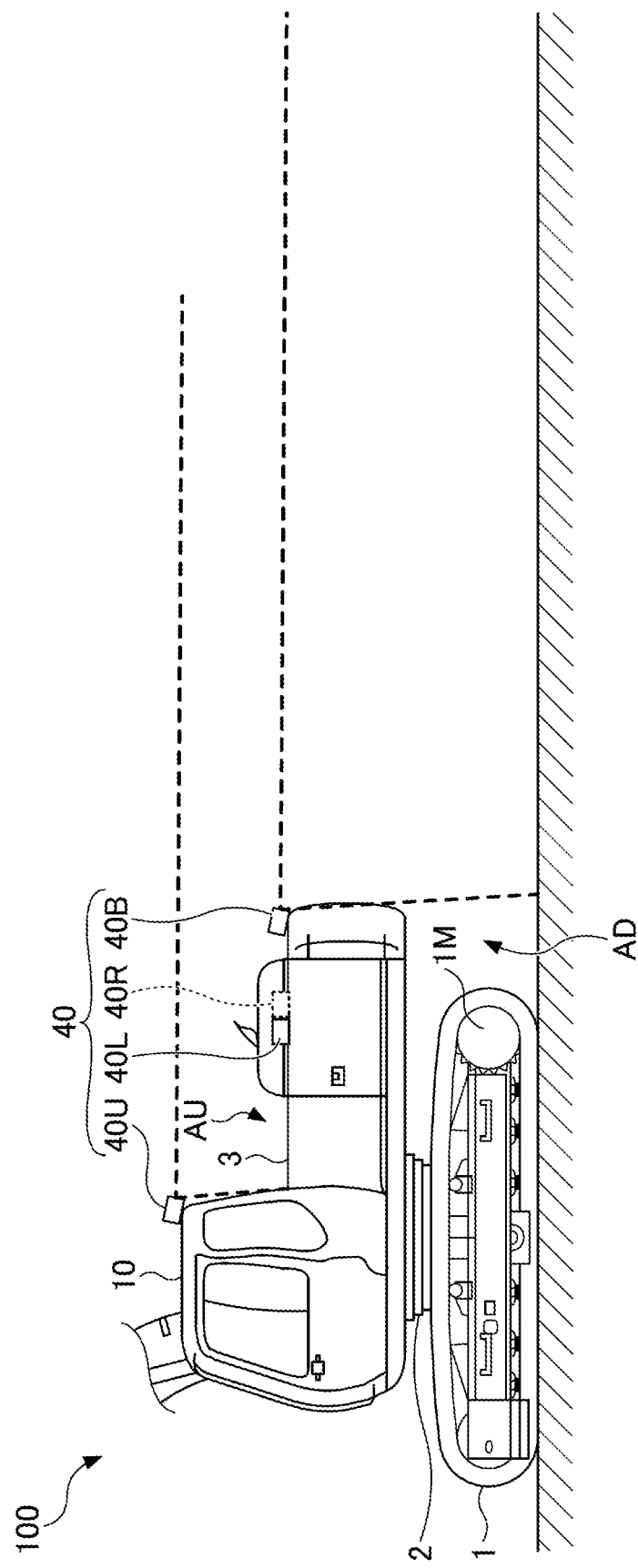
FIG. 17 is a diagram illustrating another example of a configuration of a surrounding monitoring apparatus.
Figure 18:
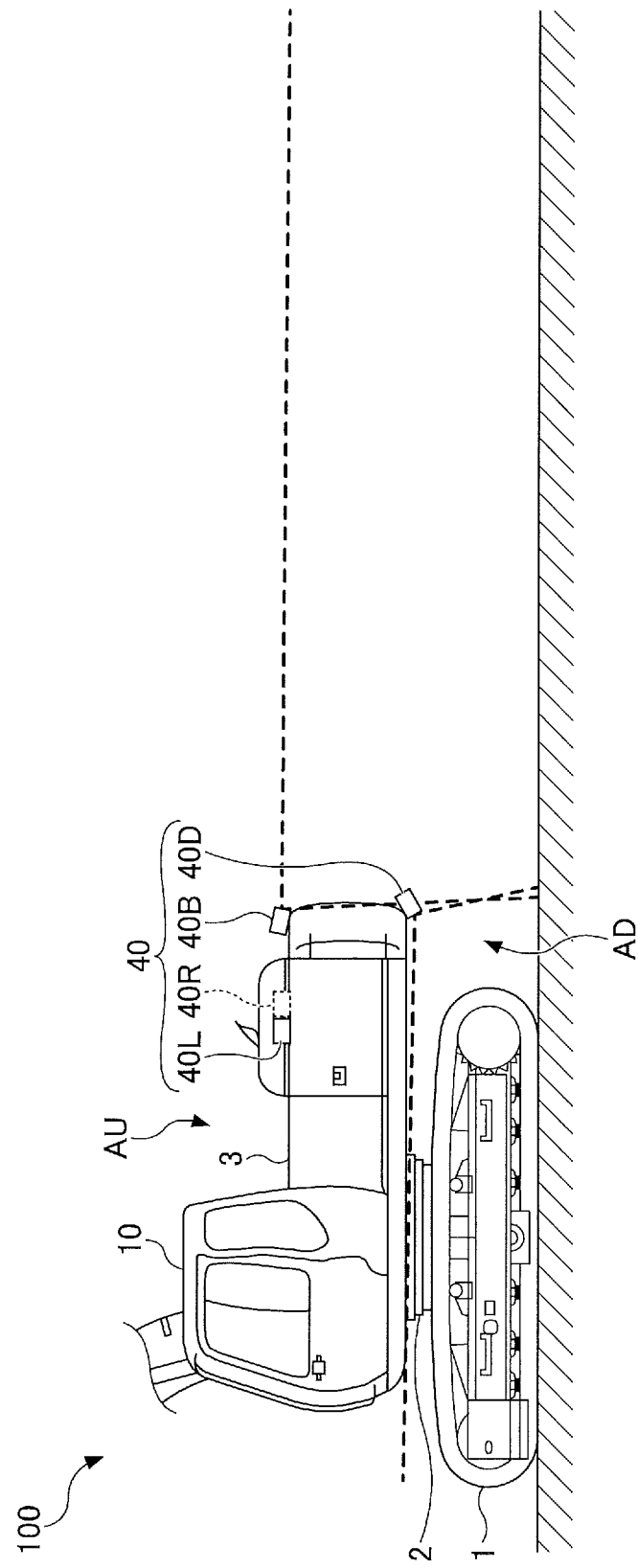
FIG. 18 illustrates yet another example of a configuration of a surrounding monitoring apparatus.

FIGS. 17 and 18 are diagrams illustrating another example and yet another example, respectively, of the configuration of the surrounding monitoring apparatus 150.

As illustrated in FIG. 17, in this example, the imaging apparatus 40 includes a camera 40U for imaging an upper region AU of the excavator 100 (the upper turning body 3) in addition to the cameras 40B, 40L, and 40R.

The camera 40U may be disposed at any position in a manner capable of imaging the entire upper portion (house portion) of the upper turning body 3 extending from the rear of the cabin 10 to the left side, for example, the camera 40U may be mounted to the upper rear end of the cabin 10. This allows the camera 40U to output, to the controller 30, a captured image including a monitor target (e.g., a person such as a worker) that may exist on top of the upper turning body 3. Therefore, the detecting unit 3012 can detect a monitor target in the upper region AU of the excavator 100 (the upper turning body 3) in the proximity region of the excavator 100.

As illustrated in FIG. 18, in this example, the imaging apparatus 40 includes a camera 40D for imaging a lower region AD of the excavator 100 (the upper turning body 3) in addition to the cameras 40B, 40L, and 40R.

The camera 40D may be disposed in any position in a manner capable of imaging the entire space between the upper turning body 3 and the ground below, for example, the camera 40D is mounted to the lower rear end of the upper turning body 3. Accordingly, the camera 40D can output, to the controller 30, a captured image including a monitor target (e.g., a person such as a worker) that may exist in the space between the upper turning body 3 and the ground below the upper turning body 3 including the space between a pair of crawlers on the left and right sides of the lower traveling body 1. Therefore, the detecting unit 3012 can detect a monitor target in the lower region AD of the excavator 100 (the upper turning body 3) in the proximity region of the excavator 100.

Also, as a matter of course, the imaging apparatus 40 of the surrounding monitoring apparatus 150 may include both the camera 40U and the camera 40D. Accordingly, the detecting unit 3012 can detect a monitor target in both the upper region AU and the lower region AD of the excavator 100 in the proximity region of the excavator 100.

Instead of or in addition to the cameras 40U, 40D, there may be provided other sensors (e.g., the above-described stereo camera, millimeter wave radar, LIDAR, etc.) that can output detection information regarding an object present in the upper region AU or the lower region AD of the excavator 100. Accordingly, the detecting unit 3012 can detect a monitor target that is present in the upper region AU or the lower region AD of the excavator 100 based on the detection information of other sensors.

In this manner, the monitor area of the surrounding monitoring apparatus 150 may include a vertical monitor area including the upper region AU or the lower region AD of the excavator 100 in addition to the horizontal monitor area. Accordingly, even when the monitor target moves out from the horizontal monitor area to the proximity region outside the monitor area and it is not possible to detect the monitor target any longer, the surrounding monitoring apparatus 150 may be able to detect the monitor target again in the vertical monitor area. That is, the proximity region outside the monitor area in the proximity region of the excavator 100, that is, the dead angle of the detecting unit 3012, can be reduced. Therefore, the safety of the excavator 100 can be further improved.

Also, in the present embodiment, the monitor area (horizontal monitor area) of the surrounding monitoring apparatus 150 does not include the front region AF of the excavator 100; however, there may be examples in which the front area AF is included in the monitor area. Accordingly, the proximity region outside the monitor area in the proximity region of the excavator 100, that is, the dead angle of the detecting unit 3012, can be reduced. Therefore, the safety of the excavator 100 can be further improved. In this case, the imaging apparatus 40 of surrounding monitoring apparatus 150 may include, in addition to the cameras 40B, 40L, and 40R, a camera for imaging a region in front of the excavator 100. Further, instead of or in addition to the camera for imaging a region in front of the excavator 100, other sensors (e.g., a stereo camera, millimeter-wave radar, LIDAR, etc., described above) capable of outputting detection information about an object present in front of excavator 100 may be provided. Accordingly, the detecting unit 3012 can detect a monitor target in a monitor area including the front region AF of the excavator 100.

Also, in the present embodiment, the surrounding monitoring apparatus 150 includes both the alarm output unit 3014 and the operation limiting unit 3015, but there may be examples in which only one of these is included. That is, the surrounding monitoring apparatus 150 may be configured to perform only one of alarm output and operation limitation of the excavator 100 when a monitor target is detected in the monitor area. In this case, the surrounding monitoring apparatus 150 will, as a matter of course, continue only one of the alarm output and the operation limitation of the excavator 100, in the status where an undetected monitor target may still be present in the proximity region of the excavator 100 including the monitor area.

In the present embodiment, the excavator 100 is configured to hydraulically drive all of various operation elements such as the lower traveling body 1, the upper turning body 3, the boom 4, the arm 5, and the bucket 6, but some of or all of these operation elements may be electrically driven. That is, the configuration and the like disclosed in the above-described embodiments may be applied to a hybrid excavator, an electric excavator, and the like.

The present embodiment further discloses the following.

(1)

A surrounding monitoring apparatus, including:
a detecting unit configured to detect a predetermined monitor target within a monitor range set in a surrounding area of a work machine; and
a control unit configured to output an alarm or implement operation limitation of the work machine when the monitor target is detected by the detecting unit, wherein
when the monitor target detected by the detecting unit is no longer detected, information relating to the possibility that the monitor target still exists in a proximity region relatively close to the work machine including the monitor range, is provided to an operator.

(2)

The surrounding monitoring apparatus described in (1), wherein
the operator is provided with the information indicating that the monitor target may still exist in the proximity region outside the monitor range when the monitor target detected by the detecting unit is no longer detected.

(3)

The surrounding monitoring apparatus described in (1) or (2), wherein
the operator is provided with the information indicating that the monitor target may still exist in the monitor range, when the monitor target detected by the detecting unit is no longer detected.

(4)

The surrounding monitoring apparatus described in any one of (1) to (3), wherein
the control unit continues the alarm output or the operation limitation even when the monitor target detected by the detecting unit is no longer detected after the start of the alarm output or the operation limitation, depending on the status when the monitor target shifts from a state of being detected by the detecting unit to a state of not being detected.

(5)

The surrounding monitoring apparatus described in (4), wherein
the control unit continues the alarm output or the operation limitation when it is determined that the monitor target which has been detected by the detecting unit is no longer detected at a position relatively close to the work machine in the monitor range after the start of the alarm output or the operation limitation.

(6)

The surrounding monitoring apparatus described in (5), further including:
a presence determining unit configured to determine whether the monitor target is likely to still exist in the proximity region outside the monitor range based on a position within the monitor range when the monitor target had been detected by the detecting unit, when the monitor target detected by the detecting unit is no longer detected, wherein
when it is determined that the monitor target, which has been detected by the detecting unit, is no longer detected at a position relatively close to the work machine in the horizontal direction viewed from the work machine in the monitor range, the presence determining unit determines that the monitor target may still exist in the proximity region outside the monitor range, and
the control unit continues the alarm output or the operation limitation even when the monitor target detected by the detecting unit is no longer detected after the start of alarm output or the operation limitation, when it is determined that the monitor target may still exist in the proximity region outside the monitor range by the presence determining unit.

(7)

The surrounding monitoring apparatus described in (5) or (6), wherein
the monitor range includes a first range closest to the work machine, a second range farthest from the work machine, and a third range between the first range and the second range, in a horizontal direction as viewed from the work machine, and
after the start of the alarm output or the operation limitation, when the monitor target detected by the detecting unit is no longer detected in the second range, the control unit cancels the alarm output or the operation limitation, and when the monitor target detected by the detecting unit is no longer detected in the first range or the third range, the control unit continues the alarm output or the operation limitation.

(8)

The surrounding monitoring apparatus described in any one of (4) to (7), wherein
  the control unit cancels the alarm output or the operation limitation when the monitor target detected by the detecting unit exits the monitor range and goes to a distant region from the monitor range in a horizontal direction viewed from the work machine after the start of the alarm output or the operation limitation.

(9)

The surrounding monitoring apparatus described in (8), further including:
  an exit determining unit that determines whether the monitor target has moved out from the monitor range to the distant region based on a position within the monitor range where the monitor target had been detected by the detecting unit, when the monitor target detected by the detecting unit is no longer detected, wherein
  when it is determined by the exit determining unit that the monitor target detected by the detecting unit has gone out from the monitor range to the distant region after the start of the alarm output or the operation limitation, the control unit cancels the alarm output or the operation limit.

(10)

The surrounding monitoring apparatus described in in any one of (1) to (9), wherein
  the monitor range includes a horizontal monitor range extending in a horizontal direction as viewed from the work machine, and
  the control unit continues the alarm output or the operation limitation when the monitor target detected by the detecting unit is no longer detected at end positions in the lateral position as viewed from the work machine in the horizontal monitor range or at an end position facing the work machine in the horizontal monitor range, after the start of the alarm output or the operation limitation.

(11)

The surrounding monitoring apparatus described in (9), further including:
  a counting unit for counting the number of the monitor targets that are no longer detected by the detecting unit even though the monitor target is not determined to have gone out from the monitor range to the distant region by the exit determining unit, wherein
  the control unit cancels the alarm output or the operation limitation when the monitor target is no longer detected by the detecting unit and the number of monitor targets counted by the counting unit is zero after the start of the alarm output or the operation limit.

Third Embodiment

Next, a third embodiment will be described.

In the related art, techniques for preventing contact between an excavator and a surrounding worker have been known.

However, at a construction site, the status may change not only due to internal factors such as the movement of an excavator and a worker, but also due to external factors such as the entrance of trucks for carrying in materials from outside and carrying out waste materials. Therefore, although the operator of the excavator can recognize the relationship with a worker inside the construction site, there may be a delay in noticing, for example, a truck and the like entering from the outside, or the operator may not notice such a truck in the first place. Therefore, it is desirable to ensure the safety of the excavator in response to changes in the overall status of the construction site, including not only internal factors but also external factors.

Accordingly, in the present embodiment, an excavator and the like that can improve the safety in response to changes in the overall status of a construction site, is provided.

<Outline of Site Safety Support System>

First, a site safety support system SYS2 according to the present embodiment will be described with reference to FIG. 19.

Figure 19:
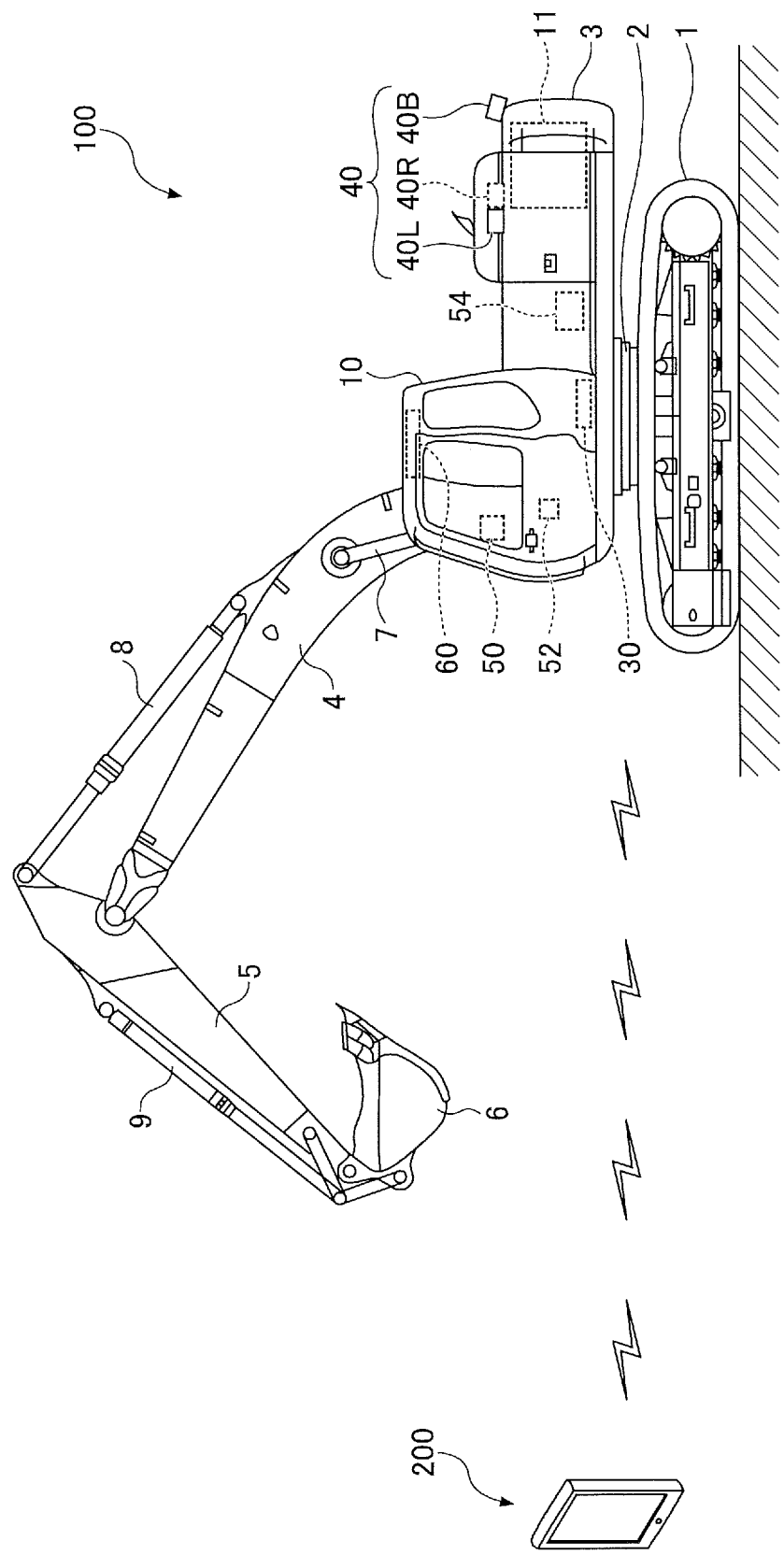
FIG. 19 is a schematic diagram illustrating an example of a site safety support system.

FIG. 19 is a schematic diagram illustrating an example of the configuration of the site safety support system SYS2.

The site safety support system SYS2 includes the excavator 100 and the support apparatus 200, and evokes the attention of an operator of the excavator 100 towards the surroundings of the excavator 100 upon being triggered by an instruction transmitted from the support apparatus 200 to the excavator 100 (hereinafter, an "attention evocation instruction") according to a user's operation. This allows a user of the support apparatus 200 to evoke the attention of an operator of the excavator 100 towards the surroundings of the excavator 100, from outside the excavator 100. The number of the excavators 100 included in the site safety support system SYS2 may be one or more. Similarly, the number of the support apparatuses 200 included in the site safety support system SYS2 may be one or more. That is, for example, one support apparatus 200 may transmit an attention evocation instruction to a plurality of the excavators 100 within the same construction site. Further, one excavator 100 may evoke the attention of an operator towards the surroundings of the excavator 100 in accordance with an attention evocation instruction from each of a plurality of support apparatuses 200 possessed by a plurality of workers working at the same construction site.

Figure 20:
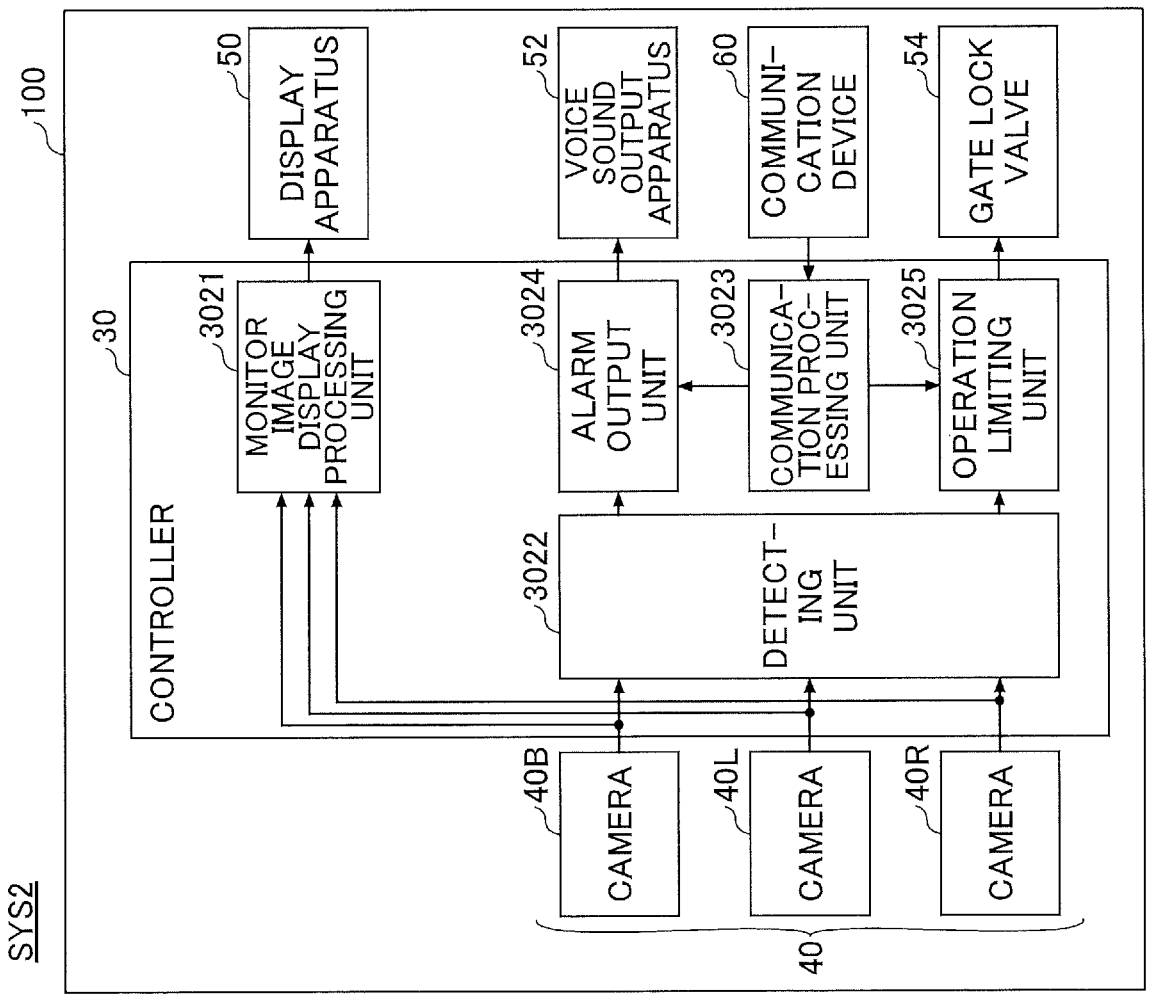
FIG. 20 is a configuration diagram illustrating an example of the configuration of a site safety support system.

Note that in FIGS. 19 and 20, as a matter of convenience, one excavator 100 and one support apparatus 200 are illustrated. The safety support system SYS2 may also include other types of work machines in place of or in addition to the excavator 100. For example, the safety support system SYS2 may include a lifting magnet machine with a lifting magnet attached as an end attachment, a bulldozer, a wheel loader, an asphalt finisher, a forestry machine, a crawler crane, and the like.

<Overview of Excavator>

The excavator 100 includes a lower traveling body 1, an upper turning body 3 that is turnably mounted to the lower traveling body 1 via a turning mechanism 2, a boom 4 as an attachment (working apparatus), an arm 5, a bucket 6, a cabin 10, and an engine 11.

The lower traveling body 1 includes, for example, a pair of crawlers on the left and right, and each crawler travels by being hydraulically driven by the traveling hydraulic motor 1M.

The upper turning body 3 is hydraulically driven by a turning hydraulic motor or electrically driven by an electric motor to rotate relative to the lower traveling body 1.

The boom 4 is vertically pivotably mounted to the front center of the upper turning body 3, the arm 5 is vertically pivotably mounted to the front end of the boom 4, and the bucket 6 is vertically pivotably mounted to the front end of the arm 5. The boom 4, the arm 5, and the bucket 6 are hydraulically driven by a boom cylinder 7, an arm cylinder 8, and a bucket cylinder 9, respectively.

The cabin 10 is an operator compartment in which an operator rides and is mounted on the front left side of the upper turning body 3.

The engine 11 is the driving source of the excavator 100 and is mounted, for example, on the rear of the upper turning body 3. The engine 11 is, for example, a diesel engine fueled with diesel oil. The engine 11 operates to maintain a predetermined revolution speed. The rotating shaft of the engine 11 is coupled to a main pump which supplies hydraulic oil to a hydraulic actuator including the traveling hydraulic motor 1M, a turning hydraulic motor, the boom cylinder 7, the arm cylinder 8, and the bucket cylinder 9, and a pilot pump which generates a pilot pressure source for operating the hydraulic actuator.

The excavator 100 may be connected to the support apparatus 200 by P2P (Peer-to-Peer) to communicate with each other, for example, by predetermined methods of short range communication such as Bluetooth (registered trademark) communication, Wi-Fi (registered trademark), or RF (Radio Frequency) communication. Accordingly, the excavator 100 can acquire (receive) various kinds of information including instruction information such as the above-described attention evocation instruction from the support apparatus 200. Details will be described below.

The excavator 100 may have a configuration of being connected to the support apparatus 200 by P2P (peer-to-peer) to communicate with each other through a wide area communication network including, for example, a mobile communication network or an Internet network in which a base station is the terminal. The excavator 100 and the support apparatus 200 may each be communicatively connected to, for example, a management server installed outside a construction site or a management terminal installed in a building of a management office of a construction site through a communication network and communicate with each other via the management server or the management terminal.

<Overview of Support Apparatus>

The support apparatus 200 (an example of an external apparatus) is a mobile terminal possessed by, for example, a user who may be in the surroundings of excavator 100 at a construction site such as a worker, a supervisor, or maintenance personnel at a construction site (hereinafter, a "worker and the like", as a matter of convenience). The support apparatus 200 may be, for example, a general-purpose notebook PC, a tablet terminal, a smartphone, and the like possessed by a user. The support apparatus 200 may be an exclusive-use terminal for transmitting instruction information such as an attention evocation instruction to the excavator 100 (for example, a remote operation terminal including an operation unit such as a button for transmitting particular instruction information such as an attention evocation instruction described above).

As described above, the support apparatus 200 is connected to the excavator 100 by P2P by a predetermined method of short range communication, such as Bluetooth communication or Wi-Fi communication, and can communicate with each other. Accordingly, the support apparatus 200 can transmit instruction information such as the above-described attention evocation instruction to the excavator 100 according to an operation by the user. Details will be described below.

<Configuration of Site Safety Support System>

Next, a specific configuration of the site safety support system SYS2 according to the present embodiment will be described with reference to FIG. 20 in addition to FIG. 19.

FIG. 20 is a configuration diagram illustrating an example of the configuration of the site safety support system SYS2.

<Configuration of Excavator>

The excavator 100 includes the controller 30, the imaging apparatus 40, the display apparatus 50, the voice sound output apparatus 52, the gate-lock valve 54, and the communication device 60.

The controller 30 performs drive control of the excavator 100. The controller 30 may implement the functions thereof by any hardware, software, or a combination thereof. The controller 30 is mainly configured by a microcomputer including, for example, a CPU (Central Processing Unit), a RAM (Random Access Memory), a ROM (Read Only Memory), an auxiliary storage device, an RTC (Real-time Clock), various communication interfaces, and the like. Hereinafter, the same shall apply to the control apparatus 210 of the support apparatus 200.

For example, the controller 30 controls the monitoring of the surroundings the excavator 100. Specifically, the controller 30 controls the imaging apparatus 40 to acquire information about the status in the surroundings of the excavator 100, that is, a captured image indicating the status (appearance) in the surroundings of the excavator 100. The controller 30 detects a predetermined monitor target within a predetermined monitor range in the surroundings of the excavator 100 based on information (a captured image) acquired from the imaging apparatus 40. Here, the monitor target may include any object, such as a stationary obstacle such as materials or earth and sand in the construction site, or a mobile obstacle such as another work machine or a truck in the construction site (i.e., a mobile object), in addition to a person such as a worker working in the surroundings of the excavator 100 or a supervisor of the construction site and the like.

For example, the controller 30 implements control to evoke the attention of an operator of the excavator 100 towards the surroundings of the excavator 100. Specifically, the controller 30 evokes the attention of an operator of the excavator 100 towards the excavator 100 in response to an attention evocation instruction received from the support apparatus 200.

The controller 30 includes a monitor image display processing unit 3021, a detecting unit 3022, a communication processing unit 3023, an alarm output unit 3024, and an operation limiting unit 3025 as functional units implemented by executing, for example, one or more programs stored in ROM or a non-volatile auxiliary storage device, on the CPU.

The imaging apparatus 40 is mounted on the top of the upper turning body 3 to capture images of the surroundings of the excavator 100. The imaging apparatus 40 includes cameras 40B, 40L, and 40R.

The camera 40B, the camera 40L, and the camera 40R are mounted on the upper back end, the upper left end, and the upper right end of the upper turning body 3, respectively, to capture images of the back, the left side, and the right side of the upper turning body 3. For example, the camera 40B, the camera 40L, and the camera 40R are single-eye wide angle cameras each having a very wide angle of view. Specifically, the camera 40B, the camera 40L, and the camera 40R are respectively mounted so that the optical axis is directed obliquely downward at the upper portion of the upper turning body 3, and capture images of a vertical imaging range from the ground near the excavator 100 to an area far away from the excavator 100. The camera 40B, the camera 40L, and the camera 40R each output captured images at a predetermined cycle (e.g., 1/30 second) while the excavator 100 is operating, and the output captured image is loaded into the controller 30.

The display apparatus 50 is provided around the operator seat within the cabin 10, specifically at a position easily visible to an operator seated in the operator seat, and displays various kinds of image information to be reported to the operator. The display apparatus 50 is, for example, a liquid crystal display or an organic EL (Electroluminescence) display, and may be a touch panel display type in which a touch panel which also serves as an operation unit is mounted. Specifically, as described below, the display apparatus 50 displays a captured image captured by the imaging apparatus 40 (hereinafter, sometimes referred to as a "through-image") or a composite image (for example, a viewpoint conversion image to be described later) that is generated (combined) based on a captured image captured by the imaging apparatus 40, as a monitor image indicating the appearance of the surroundings of the excavator 100.

The voice sound output apparatus 52 is provided around the operator seat in the cabin 10 and outputs various kinds of voice sound information to be reported to the operator. The voice sound output apparatus 52 may be, for example, a speaker or a buzzer. Specifically, the voice sound output apparatus 52 outputs an alarm sound.

The gate lock valve 54 is provided at the most upstream side of the pilot line, which is for supplying pilot pressure from the pilot pump described above to an operation apparatus operated by an operator, etc., to operate various operation elements of the excavator 100 (i.e., the lower traveling body 1, the upper turning body 3, the boom 4, the arm 5, and the bucket 6, etc.), and switches between communication and non-communication of the pilot line.

For example, the gate lock valve 54 usually switches between communication and non-communication of the pilot line in accordance with an output signal (ON/OFF) of a gate lock switch in conjunction with the operation state of a gate lock lever provided at a portion corresponding to the entrance to the operator seat within the cabin 10. Specifically, the gate lock valve 54 switches the pilot line to a communication state when the output signal of the gate lock switch is a signal corresponding to a state in which the gate lock lever is pulled up (i.e., the operator is seated in the operator seat) (hereinafter, "OFF signal" as a matter of convenience). On the other hand, the gate lock valve 54 switches the pilot line to a non-communication state when the output signal of the gate lock switch is a signal corresponding to a state in which the gate lock lever is lowered (i.e., the operator has left the operator seat) (hereinafter, "ON signal" as a matter of convenience).

For example, the gate lock valve 54 is also configured to receive instruction signals input from the controller 30. Specifically, the gate lock valve 54 may have a signal input unit that is connected to a logic circuit into which an instruction signal from the controller 30 can interrupt. This allows the gate lock valve 54 to switch between communication and non-communication of the pilot line in response to an instruction signal (OFF signal/ON signal) from the controller 30. That is, the gate lock valve 54, under the control of the controller 30, can switch the pilot line to a non-communication state even when the gate lock lever is pulled up.

The communication device 60 is, for example, a device compliant with a predetermined method of a short range communication standard which is capable of implementing mutual communication in a relatively small area, i.e., a construction site, such as the above-described Bluetooth communication, Wi-Fi communication, and RF communication. Various types of information received from the outside by the communication device 60 are loaded into the controller 30.

The monitor image display processing unit 3021 displays the monitor image on the display apparatus 50 based on the captured image captured by the imaging apparatus 40.

For example, the monitor image display processing unit 3021 displays an image captured by at least one of the cameras 40B, 40L, and 40R on the display apparatus 50 as a monitor image.

For example, the monitor image display processing unit 3021 generates a separate image (hereinafter, a "surroundings image" as a matter of convenience) representing the appearance of the surroundings of the excavator 100 as the monitor image, based on the captured image captured by the imaging apparatus 40. Specifically, the monitor image display processing unit 3021 may generate the surroundings image by combining the images captured by the cameras 40B, 40L, and 40R or by performing a process for converting the viewpoint. The monitor image display processing unit 3021 displays the monitor image including the generated surroundings image on the display apparatus 50.

More specifically, the monitor image display processing unit 3021 performs a known viewpoint conversion process on the basis of the images captured by the cameras 40B, 40L, and 40R, thereby generating, as the surroundings image, a viewpoint conversion image viewed from a virtual viewpoint, and displays the generated image on the display apparatus 50. When displaying the surroundings image on the display apparatus 50, the monitor image display processing unit 3021 displays an excavator image schematically representing the excavator 100 on the display apparatus 50 together with the surroundings image, in order to clearly indicate the relative positional relationship between the imaging range of the image capturing device 40 and the excavator 100. That is, the monitor image display processing unit 3021 generates the monitor image including the excavator image and the surroundings image disposed around the excavator image in accordance with the relative positional relationship between the excavator 100 and the imaging area of the imaging apparatus 40, and displays the monitor image on the display apparatus 50.

For example, on the display apparatus 50, the monitor images illustrated in FIGS. 5A and 5B described above are displayed.

As illustrated in FIGS. 5A and 5B, in this example, the display apparatus 50 includes the display part 50A, which is a display region in which various kinds of information images are displayed, and the operation part 50B, which is hardware-based, such as a button switch, which can receive operations by an operator and the like with respect to the various kinds of information images displayed in the display part 50A.

The display part 50A is, for example, a horizontal rectangular display (e.g., a display having an aspect ratio of 4:3) of the display apparatus 50.

As illustrated in FIG. 5A, in this example, a through-image of any of the cameras 40B, 40L, and 40R is displayed in the display part 50A as the monitor image MP1 as described above.

In this example, a guide line GLa is superimposed on the monitor image MP1 (through-image). The guide line GLa represents, for example, a position where a distance D in the horizontal direction from the excavator 100, is a predetermined distance D1. Accordingly, the operator and the like can recognize how far away the position of a monitor target is from the excavator 100, when the monitor target and the like appears (is included) in the through-image.

The position of the predetermined distance D1 may be suitably set within a predetermined distance D2 or less corresponding to the monitor area as described below.

As illustrated in FIG. 5B, in this example, the monitor image MP2, including the excavator image CG and the surroundings image EP disposed around the excavator image CG, is displayed in the display part 50A as described above. Accordingly, the operator and the like can appropriately recognize the positional relationship between the monitor target appearing in the surroundings image EP and the excavator 100.

The surroundings image EP of this example is a viewpoint conversion image which is a combination of a birds-eye image BVP that is a view from directly above the surrounding region that is adjacent to the excavator 100, and a horizontal image HVP that is a horizontal view of the surrounding region from the excavator 100 disposed around the relevant bird-eye image BVP. The surroundings image EP, which is a viewpoint conversion image, is obtained by projecting the captured images captured by the cameras 40B, 40L, and 40R into a spatial model and re-projecting the projected images projected into the spatial model to another two-dimensional plane. A spatial model is a projection target of a captured image in a virtual space and is formed of one or more planes or curved planes that include planes or curved planes other than the plane where the captured image is positioned.

Further, a guide line GLb is superimposed on the monitor image MP2. The guide line GLb is similar to the guide line GLa of the monitor image MP1 (through-image) of FIG. 5A, in that the guide line GLb represents a position where the distance D in the horizontal direction from the excavator 100 is the predetermined distance D1. That is, the guide line GLb is a line in which the contour shape of the excavator image CG corresponding to a plan view viewed directly from above the excavator 100, is offset (enlarged) by an amount corresponding to the predetermined distance D1 on the outside of the excavator image CG. Thus, similar to the guide line GLa of FIG. 5A, the operator and the like can recognize how far away the position of a monitor target is from the excavator 100, when the monitor target and the like appears (is included) in the surroundings image EP.

Returning to FIGS. 19 and 20, the detecting unit 3022 detects the monitor target in the monitor area in the surroundings of the excavator 100 based on the captured image captured by the imaging apparatus 40, specifically in the horizontal direction viewed from the excavator 100, that is, in the monitor area along the plane where the excavator 100 is carrying out the work (where the lower traveling body 1 is contacting). Specifically, the detecting unit 3022 detects a monitor target within a monitor area in which the distance D in the horizontal direction from the excavator 100 is within the predetermined distance D2 (for example, 5 meters).

For example, the monitor area is indicated as in FIG. 6 described above.

Note that a dashed line L1 and a dashed line L2 in the drawing correspond to the position of the predetermined distance D1 and the position of the predetermined distance D2, respectively, of the distance D in the horizontal direction from the excavator 100.

As illustrated in FIG. 6, the monitor area MA (the shaded portion in the drawing) is defined as a range in which the distance D in the horizontal direction from the excavator 100 is less than or equal to the predetermined distance D2, among imaging possible ranges AVB, AVL, and AVR, respectively defined by the angle of view in the horizontal direction of each of the cameras 40B, 40L, and 40R.

Referring back to FIGS. 19 and 20, for example, the detecting unit 3022 recognizes a monitor target in the captured image, by optionally applying a machine learning-based classifier and the like including various known image processing techniques or artificial intelligence (AI).

Further, by applying various known methods, the detecting unit 3022 can determine (estimate) a position (hereinafter, an "actual position"; for example, a foot position of a person as a monitor target) where a recognized monitor target is present, included in a captured image captured by the imaging apparatus 40 of a single-eye type.

For example, the detecting unit 3022 estimates a position in the horizontal direction (hereinafter, a "horizontal position") viewed from the excavator 100, based on a size (for example, a size in the height direction in a captured image) of a recognized monitor target in the captured image. This is because the size of a recognized monitor target in the captured image is correlated with the position; as the monitor target moves away from the excavator 100, the size of the monitor target becomes small. Specifically, a range of the assumed size may be defined for the monitor target (e.g., a range of the assumed human height), and, therefore, the correlation between the horizontal position of the monitor target included in the range of assumed size viewed from the excavator 100 and the size of the monitor target in the captured image may be predefined. Therefore, the detecting unit 3022 can estimate the actual position (horizontal position from the excavator 100) of the recognized monitor target based on a map or a conversion equation representing a correlation between the size of the monitor target in the captured image and the horizontal position viewed from the excavator 100 stored in advance in an internal memory such as an auxiliary storage device of the controller 30.

For example, assuming that the monitor target is on the same plane as the excavator 100 (the lower traveling body 1), the detecting unit 3022 can estimate an actual position of the monitor target (for example, a foot position) by performing projection conversion (homography) and the like on the captured image with respect to the plane. In this case, a portion (a point) of the captured image corresponds to a position on the same plane as the excavator 100.

The detecting unit 3022 may detect a monitor target in a monitor area in the surroundings of the excavator 100 based on detection information of another sensor that may be mounted on the excavator 100, instead of, or in addition to, the captured image captured by the imaging apparatus 40. For example, the detecting unit 3022 may detect a monitor target in a monitor area in the surroundings of the excavator 100 based on detection information obtained by another sensor such as a stereo camera, a millimeter-wave radar, and a LIDAR (Light Detecting and Ranging).

The communication processing unit 3023 controls the communication device 60 and establishes the P2P connection by the predetermined method of short range communication between the excavator 100 and the support apparatus 200 possessed by a worker and the like in the surroundings of the excavator 100.

Specifically, first, the communication processing unit 3023 detects a device (hereinafter, a "connectable device", as a matter of convenience) capable of being P2P-connected by a predetermined method of short range communication, in the surroundings of the excavator 100.

For example, the communication processing unit 3023 intermittently transmits, through the communication device 60, a signal (hereinafter, an "advertisement signal") including identification information of the excavator 100 or the device corresponding to the communication device 60 within a predetermined range in the surroundings of the excavator 100, that is, within a communicable range (for example, a few meters to several tens of meters). Accordingly, the connectable device such as the support apparatus 200 can receive the advertisement signal when the connectable device is positioned within the communicable range of the excavator 100 (that is, when the connectable device enters the communicable range of the excavator 100). Then, by receiving, through the communication device 60, a signal requesting the P2P connection (hereinafter, a "connection request signal", as a matter of convenience) from the connectable device that has received the advertisement signal, the communication processing unit 3023 can detect the connectable device that is the transmission source of the connection request signal.

For example, by receiving the advertisement signal through the communication device 60, the communication processing unit 3023 can detect the connectable device that that is the transmission source of the advertisement signal.

Next, the communication processing unit 3023 determines whether the detected connectable device in the surroundings of the excavator 100 is the connection target device, that is, the support apparatus 200. For example, the communication processing unit 3023 determines whether the detected connectable device is the connection target device, based on various kinds of information for specifying (identifying) the transmission source of the signal included in the advertisement signal or the connection request signal.

Lastly, when it is determined that the detected connectable device is the connection target device, the communication processing unit 3023 establishes the P2P connection with the detected connectable device.

For example, when the communication processing unit 3023 detects the connectable device that is the transmission source by receiving the connection request signal through the communication device 60, the communication processing unit 3023 performs a process for establishing the P2P connection at the excavator 100. The communication processing unit 3023 transmits a signal (hereinafter, a "connection response signal", as a matter of convenience) reporting the connection completion to the connectable device through the communication device 60, thereby establishing the P2P connection with the detected connectable device, that is, the support apparatus 200.

For example, when the communication processing unit 3023 detects the connectable device that is the transmission source by receiving an advertisement signal through the communication device 60, the communication processing unit 3023 transmits a connection request signal to the detected connectable device. The communication processing unit 3023 receives a connection response signal from the connectable device through the communication device 60 and performs a process for establishing the P2P connection at the excavator 100 in response to the reception of the connection response signal, thereby establishing the P2P connection with the detected connectable device, that is, the support apparatus 200.

As described above, the communication processing unit 3023 can establish the P2P connection when the excavator 100 and the connection target device (the support apparatus 200) are positioned in the communicable range of each other.

The communication processing unit 3023 may establish a P2P connection between the excavator 100 and the support apparatus 200 only when a request is made from the support apparatus 200 (for example, when a connection request signal is received from the support apparatus 200).

The communication processing unit 3023 receives, through the communication device 60, various kinds of information transmitted from the support apparatus 200 for which the P2P connection with the excavator 100 has been established.

For example, when the communication processing unit 3023 (an example of a first information acquiring unit and a second information acquiring unit) receives instruction information such as an attention evocation instruction or a cancel instruction is received from the support apparatus 200 through the communication device 60, the communication processing unit 3023 reports this to the alarm output unit 3024 and the operation limiting unit 3025.

The alarm output unit 3024 outputs an alarm directed toward the inside and outside of the cabin 10 of the excavator 100.

For example, the alarm output unit 3024 outputs an alarm to the interior or the exterior of the cabin 10 when a monitor target is detected in the monitor area by the detecting unit 3022. Accordingly, the controller 30 can cause an operator or a worker, a supervisor, and the like in the surroundings of the excavator 100 to recognize that a monitor target has entered the monitor area in the surroundings of the excavator 100. Therefore, the controller 30 can urge an operator and the like to confirm the safety status in the surroundings of the excavator 100 and can urge a worker and the like in the monitor area to evacuate from the monitor area. In the following, this alarm is referred to as a "monitor target detection alarm" as a matter of convenience.

For example, the alarm output unit 3024 (an example of an attention evoking unit) outputs an alarm to evoke the attention of an operator in the cabin 10 with respect to the surrounding status of the excavator 100, when the attention evocation instruction is received from the support apparatus 200 by the communication processing unit 3023. This allows the controller 30 to prompt the operator to confirm the surrounding status of the excavator 100. Hereinafter, this alarm is referred to as an "attention evocation alarm" as a matter of convenience.

The alarm output unit 3024 may output an alarm (a monitor target detection alarm or an attention evocation alarm) by any method.

For example, the alarm output unit 3024 outputs an alarm in an auditory manner, that is, by sound.

Specifically, the alarm output unit 3024 may output a control instruction to the voice sound output apparatus 52 to output an alert sound. At this time, the alarm output unit 3024 may change the pitch, the sound pressure, the tone color, and the like of the alert sound, and may change the bellowing cycle, etc., when cyclically bellowing the alert sound (for example, a buzzer sound), depending on various conditions (for example, the type of the alarm, that is, a distinction between a monitor target detection alarm and an attention evocation alarm).

The alarm output unit 3024 may output, through the voice sound output apparatus 52 such as a speaker, a voice sound to indicate that a monitor target has been detected and a voice sound to instruct (prompt) confirmation of the surrounding status of the excavator 100.

For example, the alarm output unit 3024 outputs an alarm in a visual manner, that is, by displaying an information image on the display apparatus 50.

Specifically, the alarm output unit 3024 transmits an alarm request to the monitor image display processing unit 3021. Accordingly, the monitor image display processing unit 3021 can output a monitor target detection alarm to an operator through the display apparatus 50 by highlighting the monitor target included in the monitor image (through-image or surroundings image) displayed on the display apparatus 50, in response to the alarm request.

The alarm output unit 3024 may output an attention evocation alarm to an operator by causing the display apparatus 50 to display text information and the like to prompt confirmation of the surroundings of the excavator 100.

The alarm output unit 3024 may output an alarm in a tactile manner. Specifically, an alarm may be output through, for example, a vibration generating device and the like for vibrating the operator seat in which the operator is seated. In this case, the alarm output unit 3024 may change the magnitude, the vibration cycle, and the like of the vibration output from the vibration generating device, according to the type of alarm, that is, the distinction between the monitor target detection alarm and the attention evocation alarm.

The alarm output unit 3024 may change the type (alarm level) of the monitor target detection alarm depending on the positional relationship between the monitor target detected in the monitor area by the detecting unit 3022 and the excavator 100.

For example, the alarm output unit 3024 outputs a monitor target detection alarm having a relatively low alarm level (hereinafter, a "monitor target detection alarm of an attention level") to urge the attention of an operator and the like to the monitor target when the monitor target detected in the monitor area by the detecting unit 3022 is located at a position distant from the excavator 100. Specifically, the alarm output unit 3024 may output a monitor target detection alarm of an attention level when the distance D in the horizontal direction between the monitor target detected by the detecting unit 3022 and the excavator 100 exceeds the predetermined distance D1 (in the case of D1<D≤D2). Hereinafter, a region in which the distance D from the excavator 100 in the monitor area exceeds the predetermined distance D1 is referred to as an "attention region" as a matter of convenience. On the other hand, the alarm output unit 3024 outputs an alarm having a relatively high alarm level (hereinafter, referred to as a "monitor target detection alarm of a caution level") indicating that the monitor target is approaching the excavator 100 and the risk is increasing when the monitor target detected in the monitor area by the detecting unit 3022 is positioned relatively close to the excavator 100. Specifically, the alarm output unit 3024 may output an alarm of a caution level when the distance D in the horizontal direction from the monitor target detected by the detecting unit 3022 to the excavator 100 is less than or equal to the predetermined distance D1 (in the case of D≤D1). Hereinafter, a region where the distance D from the excavator 100 is less than or equal to the predetermined distance D1 in the monitor area is referred to as a "attention region".

In this case, the alarm output unit 3024 may change the pitch, the sound pressure, the tone color, the bellowing cycle, and the like of the sound output from the voice sound output apparatus 52, between the monitor target detection alarm of the attention level and the monitor target detection alarm of the caution level. The alarm output unit 3024 may change the color, the shape, the size, the presence or absence of blinking, the blinking cycle, and the like of a marker and the like for emphasizing the monitor target included in the monitor image (through-image or surroundings image) displayed on the display apparatus 50, between the alarm at the attention level and the alarm at the caution level. Accordingly, the controller 30 can cause an operator or the like to recognize the alarm level, that is, the proximity of the monitor target to the excavator 100, by the difference in the alarm sound or the marker and the like that highlights the monitor target displayed on the display apparatus 50.

The alarm output unit 3024 cancels the monitor target detection alarm output when the monitor target detected by the detecting unit 3022 is no longer detected or when a predetermined cancel operation is performed after the alarm output starts.

The alarm output unit 3024 terminates the attention evocation alarm when a cancel instruction from the support apparatus 200 is received by the communication processing unit 3023, after the attention evocation alarm starts to be output.

The alarm output unit 3024 may terminate the attention evocation alarm, regardless of the reception of the cancel instruction, when the operator has confirmed the surrounding status of the excavator 100. In this case, for example, the alarm output unit 3024 may terminate the attention evocation alarm when a predetermined time (for example, one minute and the like) has elapsed from the start of output of the attention evocation alarm, by which it can be determined that an operator has confirmed the surrounding status of the excavator 100. For example, the alarm output unit 3024 may confirm the operator's line-of-sight status by using a line-of-sight sensor and the like installed in the cabin 10 and terminate the attention evocation alarm when it is determined that the operator has confirmed the surrounding status of the excavator 100. For example, the alarm output unit 3024 may terminate the attention evocation alarm when a confirmation operation, indicating that the surrounding status of the excavator 100 has been confirmed by an operator, is performed after the display apparatus 50 displays text information indicating a query as to whether the surrounding status of the excavator 100 has been confirmed. For example, according to a predetermined operation performed by an operator, the excavator 100 may transmit, through the communication processing unit 3023, a signal (hereinafter, a "cancel request signal") that requests the support apparatus 200, that is the transmission source of the attention evocation alarm, to cancel the attention evocation alarm. In this case, when the support apparatus 200 receives the cancel request signal from the excavator 100, the display apparatus 240 may display an operation screen described below to be used for permitting the cancellation of the attention evocation alarm, and when a permission operation is accepted from the user, the support apparatus 200 may return a signal to permit the cancellation (hereinafter referred to as a "cancel permission signal") to the excavator 100. When a cancel permission signal is received from the support apparatus 200 through the communication processing unit 3023, the alarm output unit 3024 terminates the attention evocation alarm. Even when a cancel permission signal is not received from the support apparatus 200, the alarm output unit 3024 may terminate the attention evocation alarm when a predetermined time elapses from the transmission of the cancel request signal.

The operation limiting unit 3025 limits the operation of an operation element of the excavator 100 when a predetermined condition for securing the safety in the surroundings of the excavator 100 is satisfied. At this time, the operation element that is the target of the operation limitation includes some of or all of the lower traveling body 1, the upper turning body 3, the boom 4, the arm 5, and the bucket 6. For example, the operation limiting unit 3025 controls the gate lock valve 54, by transmitting an instruction signal (ON signal) to the gate lock valve 54, to cause the pilot line to be in a non-communication state. Therefore, the hydraulic oil (pilot pressure) is not supplied from the pilot pump to the operation apparatus which operates the operation element of the excavator 100, and, therefore, it is possible to limit the operation element of the excavator 100 to not operate even if an operator inputs an operation to the operation apparatus. Therefore, it is possible to reduce the occurrence of collision and the like with an object present in a relatively close region in the surroundings of the excavator 100.

For example, the operation limiting unit 3025 limits the operation of an operation element of the excavator 100 when a monitor target is detected in the monitor area by the detecting unit 3022. Accordingly, even in the case where a monitor target (for example, a person) enters the monitor area in the surroundings of the excavator 100, the operation of the excavator 100 is limited, and the occurrence of a collision between the excavator 100 and the monitor target can be reduced. Therefore, it is possible to maintain the safety in the surroundings of the excavator 100.

For example, when an attention evocation instruction is received from the support apparatus 200 by the communication processing unit 3023, the operation limiting unit 3025 limits the operation of an operation element of the excavator 100. Accordingly, in the status where an attention evocation instruction is transmitted from the support apparatus 200, that is, the status where an operator is to pay attention to the surrounding status of the excavator 100, collision and the like between the excavator 100 and an object that causes the attention evocation (e.g., a truck that has entered the construction site), can be prevented. Therefore, it is possible to maintain the safety in the surroundings of the excavator 100.

At this time, the operation limiting unit 3025 may start limiting the operation of the excavator 100 after attention evocation is started to cause the operator to pay attention to the surrounding status of the excavator 100, that is, after output of the attention evocation alarm is started by the alarm output unit 3024. Specifically, the operation limiting unit 3025 may start the operation limitation of the excavator 100 when a predetermined time (for example, a few seconds) elapses after the alarm output unit 3024 starts the output of the attention evocation alarm. Thus, operation of the excavator 100 is limited after the operator confirms the attention evocation alarm output by the alarm output unit 3024. Therefore, it is possible to prevent a situation in which the operation limitation of the excavator 100 is suddenly started so that the operator feels like something is wrong or the position of the excavator 100 becomes unstable due to a sudden stop of an operation element that is operating.

The operation limiting unit 3025 (an example of the reporting unit) may report, to an operator, that the operation limitation will be started (hereinafter, an "operation limitation advance report") through the display apparatus 50 or the voice sound output apparatus 52 after the alarm output unit 3024 starts the output of the attention evocation alarm and before the operation limitation of the excavator 100 starts. This allows the user to recognize that the operation limitation will be started before the operation limitation of the excavator 100 is started. Therefore, it is possible to further prevent a situation in which the operation limitation of the excavator 100 is suddenly started so that the operator feels like something is wrong or the position of the excavator 100 becomes unstable due to a sudden stop of an operation element that is operating. At this time, the operation limitation advance report displayed on the display apparatus 50 may include the time remaining until the start of the operation limitation of the excavator 100, which is indicated by a countdown format. This allows the user to actually recognize when the operation limitation of the excavator 100 will start.

For example, instead of the gate lock valve 54, a pressure reduction valve may be provided to depressurize the pilot pressure on the secondary side output from the operation apparatus which operates the operation element, and the operation limiting unit 3025 may control the pressure reduction valve. In this case, the pressure reduction valve reduces the pilot pressure on the secondary side output from the operation apparatus to a pressure value equivalent to a zero operation amount or less, thereby invalidating the operation performed with respect to the operation apparatus by the operator. Therefore, the operation limiting unit 3025 can control the pressure reduction valve to limit the operation of the operation element of the excavator 100 as a result. The operation limiting unit 3025 may control the pressure reduction valve so that the operation element of the excavator 100 is not stopped, but to limit the operation of the excavator 100 in a manner that the operation of each operation element relative to the operation by an operator is gradually limited than usual.

The operation limiting unit 3025 may change the level of the operation limitation of the excavator 100 caused by the detection of a monitor target, in accordance with the positional relationship between the monitor target detected by the detecting unit 3022 and the excavator 100 as in the case of the alarm output unit 3024.

For example, the operation limiting unit 3025 limits the operation of the excavator 100 in a manner having a relatively low degree of limitation when a monitor target detected in the monitor area by the detecting unit 3022 is located at a position distant from the excavator 100. Specifically, the operation limiting unit 3025 may limit the operation of the excavator 100 in a manner having a relatively low degree of limitation (for example, the operation speed of the operation element relative to an operation amount with respect to the operation apparatus by an operator, is lower than usual) when the distance D in the horizontal direction from the monitor target detected by the detecting unit 3022 to the excavator exceeds the predetermined distance D1 (in the case of D1<D≤D2). On the other hand, the operation limiting unit 3025 limits the operation of the excavator 100 in a manner having a relatively high degree of limitation when a monitor target detected in the monitor area by the detecting unit 3022 is located at a position close to the excavator 100. Specifically, the operation limiting unit 3025 may limit the operation of the excavator 100 in a manner having a relatively high degree of limitation (for example, to stop the operation of the operation element) when the distance D in the horizontal direction from the monitor target detected by the detecting unit 3022 to the excavator 100 is less than or equal to the predetermined distance D1 (in the case of D≤D1).

The operation limiting unit 3025 cancels the operation limitation of the excavator 100 caused by the detection of a monitor target by the detecting unit 3022, when the monitor target detected by the detecting unit 3022 is no longer detected or when the above-described cancel operation is performed after the start of the operation limitation of the excavator 100.

The operation limiting unit 3025 cancels the operation limitation of the excavator 100 when a cancel instruction is received from the support apparatus 200 after the operation limitation of the excavator 100 starts due to the reception of the attention evocation instruction.

When both the operation limitation implementation condition relating to the detection of the monitor target by the detecting unit 3022 and the operation limitation implementation condition relating to the reception of the attention evocation instruction are satisfied, the operation limiting unit 3025 may not cancel the operation limitation of the excavator 100 unless the cancel conditions of both of the aforementioned operation limitation implementations are satisfied. Specifically, when both of the implementation conditions are satisfied, the operation limiting unit 3025 may not cancel the operation limitation of the excavator 100 unless the cancel conditions are satisfied for both of the aforementioned operation limitation implementations, whether the trigger of the operation limitation of the excavator 100 is the detection of the monitor target by the detecting unit 3022 or the reception of the cancel instruction from the support apparatus 200. This further improves the safety of the excavator 100.

<Configuration of Support Apparatus>

The support apparatus 200 includes the control apparatus 210, the communication device 220, the operation apparatus 230, and the display apparatus 240.

The control apparatus 210 controls various operations of the support apparatus 200. The control apparatus 210 includes a communication processing unit 2104, an attention evocation instruction unit 2105, and a cancel instruction unit 2106 as functional units that are implemented by executing, for example, one or more programs stored in a ROM or a non-volatile auxiliary storage device, on the CPU.

The communication device 220 is, for example, a device compliant with the same method of a short range communication standard as the communication device 60 of the excavator 100, such as the above-described Bluetooth communication, WIFI communication, and RF communication. Accordingly, the communication device 220 can receive a signal transmitted from the communication device 60 of the excavator 100 or transmit a signal that can be received by the communication device 60 of the excavator 100.

The operation apparatus 230 accepts various operations performed with respect to the support apparatus 200 by a user. The operation apparatus 230 includes, for example, a hardware operation unit including buttons, a keyboard, a mouse, a touchpad, and a touch panel mounted on the display apparatus 50. The operation apparatus 230 may be a combination of a hardware operation unit, such as a touch panel mounted on the display apparatus 240 and a software operation unit, such as a button icon on an operation screen displayed on the display apparatus 240.

The display apparatus 240 displays various kinds of information images. The display apparatus 240 may be, for example, a liquid crystal display or an organic EL display.

The communication processing unit 2104 controls the communication device 220 and establishes a P2P connection between the support apparatus 200 and the excavator 100 in the surroundings of the support apparatus 200 by the predetermined method of short range communication described above. The method of establishing the P2P connection with the excavator 100 by the communication processing unit 2104 is the same as the method of establishing the P2P connection with the support apparatus 200 by the communication processing unit 3023 of the excavator 100, other than changing the connection destination from the support apparatus 200 to the excavator 100. Therefore, the description thereof will be omitted.

The communication processing unit 2104 controls the communication device 220 and transmits various kinds of instruction information to the excavator 100 in response to a request from the attention evocation instruction unit 2105 or the cancel instruction unit 2106.

The attention evocation instruction unit 2105 transmits an attention evocation instruction to the excavator 100 through the communication processing unit 2104 when an operation to instruct the transmission of an attention evocation instruction (hereinafter, "operation to transmit the attention evocation instruction") is performed by a user such as a worker at the construction site through the operation apparatus 230. Accordingly, the user such as the worker at the construction site and the like can cause the excavator 100 to evoke the attention of an operator of the excavator 100 towards the surrounding status, when it is desired to prompt the operator of the excavator 100 to confirm the surrounding status (for example, when a truck and the like, that has entered the construction site, approaches the excavator 100).

Figure 21:
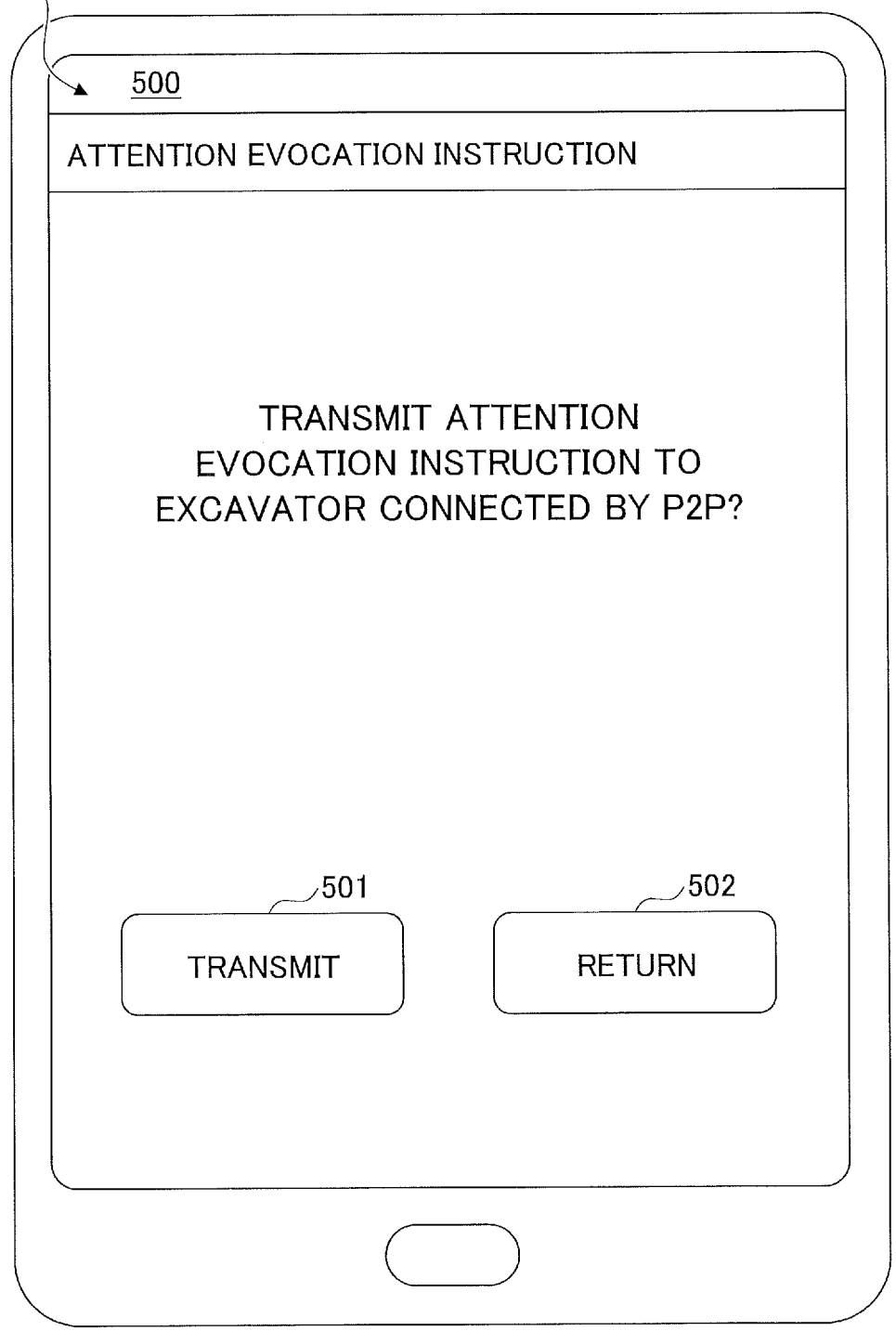
FIG. 21 is a diagram illustrating an example of an attention evocation operation screen.

For example, FIG. 21 is a diagram illustrating an example (an attention evocation operation screen 500) of an operation screen (hereinafter, an "attention evocation operation screen") on which an operation to transmit an attention evocation instruction is performed, displayed on the display apparatus 240.

As illustrated in FIG. 21, the attention evocation operation screen 500 includes button icons 501 and 502 that are operable with the operation apparatus 230 such as a touch panel mounted on the display apparatus 240.

The button icon 501 has the text information of "transmit" appended thereto, and the user can perform a transmission operation of the attention evocation instruction by operating the button icon 501 through the operation apparatus 230. That is, when the button icon 501 is operated through the operation apparatus 230 and the like, the attention evocation instruction unit 2105 transmits an attention evocation instruction to the excavator 100 through the communication processing unit 2104. At this time, when the support apparatus 200 is connected to a plurality of the excavators 100 by P2P, the attention evocation instruction unit 2105 broadcasts the attention evocation instruction to the plurality of the excavators 100. Accordingly, the user can evoke the attention of an operator of each of the plurality of the excavators 100 towards the surrounding status, by a single operation of transmitting an attention evocation instruction.

When the support apparatus 200 is P2P connected to the plurality of the excavators 100, an operation screen for selecting the excavator 100 to be the transmission destination, may be displayed on the display apparatus 240. This allows the user to transmit an attention evocation instruction only to the excavator 100 corresponding to an operator for which attention evocation is needed.

The button icon 502 has the text information of "return" appended thereto, and the user can cause the display contents of the display apparatus 50 to return to the screen immediately before the attention evocation operation screen 500 is displayed, by operating the button icon 502 through the operation apparatus 230.

Returning to FIGS. 19 and 20, when an operation to instruct to transmit the cancel instruction (hereinafter, "operation to transmit the cancel instruction") is performed by the user such as a worker at the construction site through the operation apparatus 230, the cancel instruction unit 2106 transmits the cancel instruction to the excavator 100 through the communication processing unit 2104. Accordingly, the user such as a worker at the construction site can cancel the attention evocation alarm or the operation limitation of the excavator 100 when, for example, a truck and the like that has entered the construction site moves away from the excavator 100 to a distant location.

Figure 22:
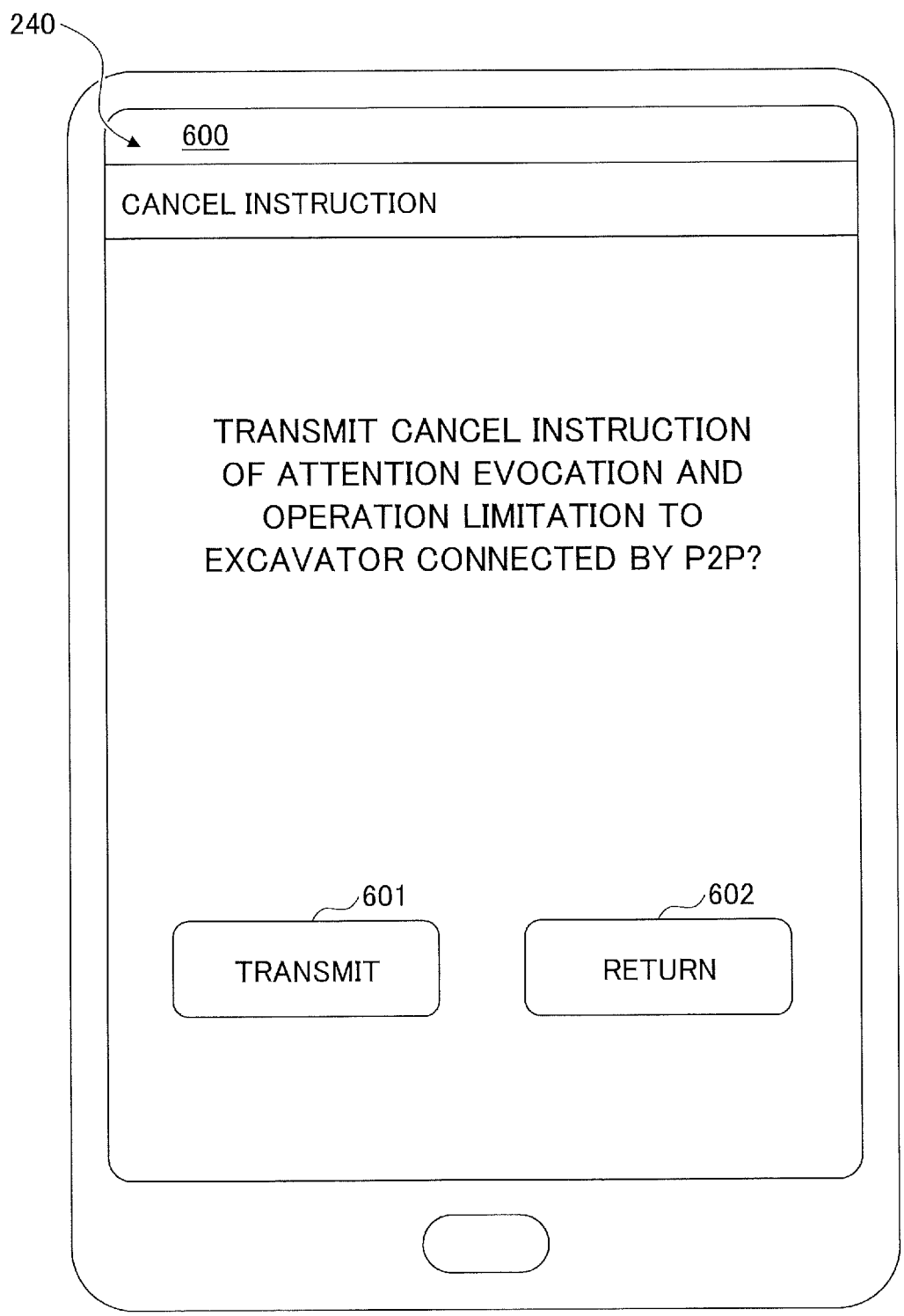
FIG. 22 is a diagram illustrating an example of a cancel operation screen.

For example, FIG. 22 is a diagram illustrating an example (a cancel operation screen 600) of an operation screen (hereinafter, a "cancel operation screen") on which an operation to transmit a cancel instruction is performed, displayed on the display apparatus 240.

As illustrated in FIG. 22, the cancel operation screen 600 includes button icons 601 and 602 that are operable with the operation apparatus 230 such as a touch panel mounted on the display apparatus 240.

The button icon 601 has the text information of "transmit" appended thereto, and the user can perform an operation of transmitting a cancel instruction by operating the button icon 601 through the operation apparatus 230. That is, when the button icon 601 is operated through the operation apparatus 230 and the like, the cancel instruction unit 2106 transmits the cancel instruction to the excavator 100 through the communication processing unit 2104. At this time, when the support apparatus 200 is connected to a plurality of the excavators 100 by P2P, the cancel instruction unit 2106 broadcasts the cancel instruction to the plurality of the excavators 100. The cancel instruction unit 2106 may select only the excavator 100 to which the attention evocation instruction has been previously transmitted, from among a plurality of the excavators 100 connected to the support apparatus 200 by the P2P, and multicast or unicast the cancel instruction to the selected excavator 100. Accordingly, the user can cancel the attention evocation given to an operator with respect to the surrounding status and the operation limitation with respect to a plurality of the excavators, by a single operation of transmitting the cancel instruction.

When the support apparatus 200 is P2P connected to the plurality of the excavators 100, an operation screen for selecting the excavator 100 to be the transmission destination may be displayed on the display apparatus 240. Accordingly, the user can select the excavator 100 that is the target of the cancel instruction by himself/herself to cancel the attention evocation given to an operator with respect to the surrounding status and the operation limitation with respect to the selected excavator 100.

<Outline of Operation of the Site Safety Support System>

Next, an outline of the operation of the site safety support system SYS2 will be described with reference to FIG. 23.

Figure 23:
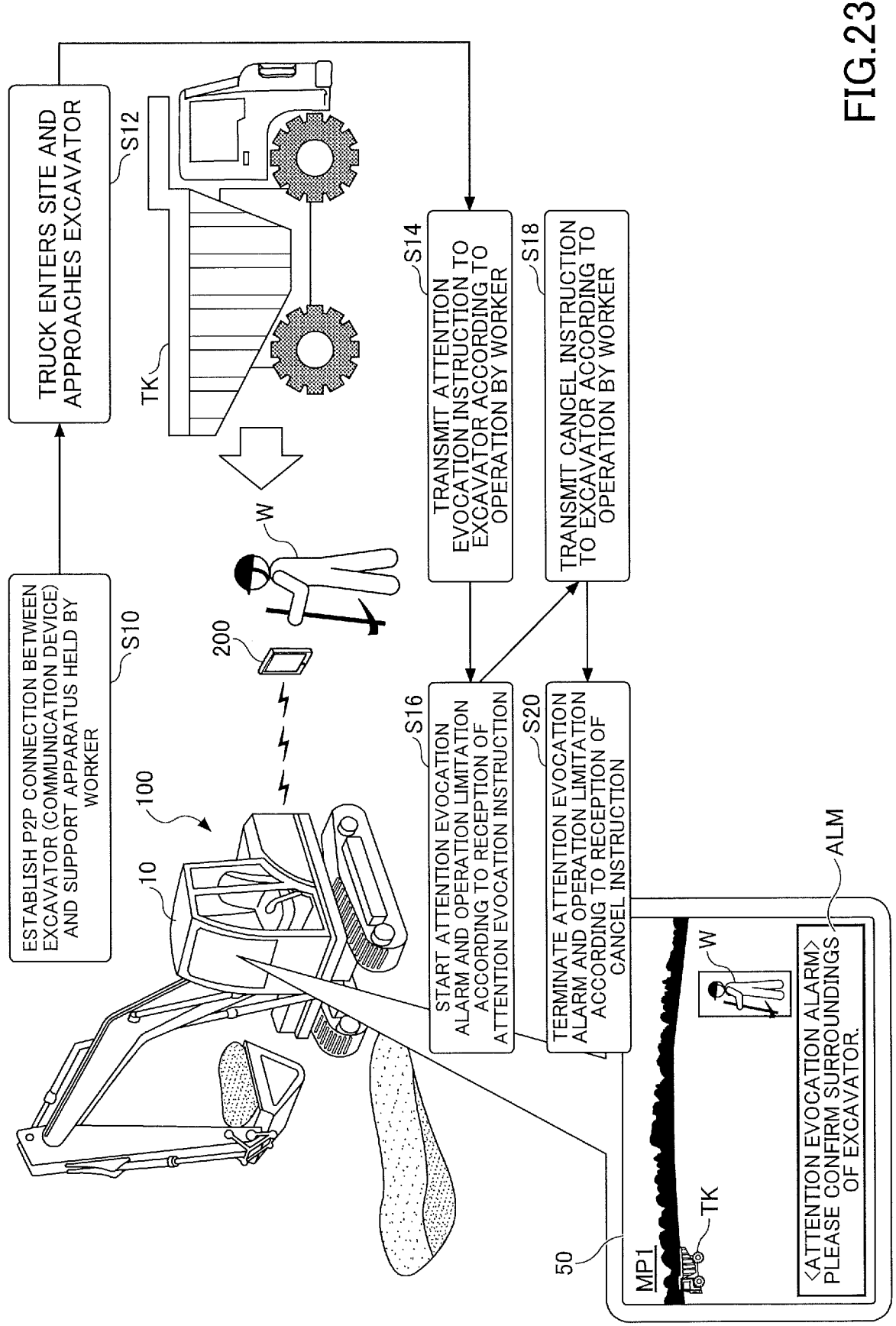
FIG. 23 is a schematic diagram illustrating the operation of the site safety support system.

FIG. 23 is a diagram illustrating an outline of an operation of the site safety support system SYS2. Specifically, FIG. 23 illustrates the status of the excavator 100 and the construction site where the worker W carrying the support apparatus 200 performs the work, and the flow of the operation of the excavator 100 and the support apparatus 200. Hereinafter, in this example, the description is given on the assumption that the worker W is in the communicable range of the communication device 60 of the excavator 100, and the excavator 100 is in the communicable range of the communication device 220 of the support apparatus 200.

In step S10, the excavator 100 and the support apparatus 200 establish a P2P connection with each other.

In step S12, a truck TK enters the construction site and approaches the excavator 100.

In step S14, when the worker W notices that the truck TK has entered the construction site, he/she operates the support apparatus 200 to transmit an attention evocation instruction, and the support apparatus 200 transmits the attention evocation instruction to the excavator 100 in accordance with the transmission operation by the worker W.

In step S16, the excavator 100 receives the attention evocation instruction from the support apparatus 200 and starts outputting an attention evocation alarm in response to the attention evocation instruction.

For example, as illustrated in FIG. 23, the controller 30 (the alarm output unit 3024) of the excavator 100 displays an attention evocation alarm ALM that prompts an operator to confirm the surroundings of the excavator 100, on a monitor image MP1 (a through-image) displayed on the display apparatus 50. Accordingly, the operator can easily recognize that an attention evocation alarm has been output, in a status of working while confirming the monitor image displayed on the display apparatus 50. Further, the operator can simultaneously recognize the start of output of the attention evocation alarm and confirm the surrounding status of the excavator 100 displayed on the monitor image MP1 (for example, the worker W and the status of the truck that has entered the construction site and the like).

When an information image other than the monitor image is displayed on the display apparatus 50, the controller 30 of the excavator 100 may automatically switch the display contents of the display apparatus 50 to a monitor image (for example, a monitor image including a through-image or a surroundings image of the camera 40B). This eliminates the need for the operator to perform an operation for confirming the surrounding status of a location where direct confirmation is difficult, such as the rear of the excavator 100, thereby improving the convenience of the operator.

Then, the excavator 100 starts the operation limitation after the attention evocation instruction is started. Accordingly, the excavator 100 (the controller 30) can prevent contact and the like with an approaching truck TK caused by the operation of the excavator 100.

In step S18, when it is confirmed that the truck TK has moved away from the excavator 100, the worker W operates the support apparatus 200 to transmit a cancel instruction, and the support apparatus 200 transmits the cancel instruction to the excavator 100 in accordance with the transmission operation by the worker W.

In step S20, the excavator 100 receives the cancel instruction from the support apparatus 200 and cancels the attention evocation alarm and the operation limitation in response to the cancel instruction. This allows the excavator 100 to return to performing normal operations.

As described above, the support apparatus 200 transmits an instruction (an attention evocation instruction) to cause the excavator 100 to evoke the attention of the operator of the excavator 100 towards the surrounding status of the excavator 100 in accordance with the operation of the user (the worker W). The excavator 100 receives the attention evocation instruction from the support apparatus 200 and evokes the attention of an operator with respect to the surrounding status of the excavator 100, specifically, the excavator 100 outputs an attention evocation alarm. Typically, the operator pays attention to the operation of the attachment of the excavator 100, and, therefore, the operator is less likely to notice a change in the status of the construction site caused by external factors, than the external worker W. Therefore, the site safety support system SYS2 can improve the safety of the excavator 100 by prompting the operator to confirm the surrounding status of the excavator 100 in response to a change in the status of the construction site due to external factors such as the truck TK entering the construction site. Accordingly, the site safety support system SYS2 can respond to changes in the overall status of the construction site and improve safety.

Further, the excavator 100 limits the operation in response to the receipt of an attention evocation instruction. That is, the support apparatus 200 transmits an attention evocation instruction to the excavator 100 to evoke the attention of the operator of the excavator 100 towards the surrounding status of the excavator 100, and to limit the operation of the excavator 100. Accordingly, the site safety support system SYS2 limits the operation of the excavator 100 in response to a change in the status of the construction site due to external factors such as the truck TK entering the construction site, thereby further improving the safety of the excavator 100.

Further, the worker W may operate the support apparatus 200 to transmit an attention evocation instruction, in a case where an abnormality occurs, for example, when another worker working in the surroundings of the excavator 100 performs a sudden action or drops down due to a sudden change in his/her physical condition, or when an abnormality occurs when the worker W drops down due to a sudden change in his/her physical condition. When an abnormality occurs in a worker working in the surroundings of the excavator 100, the worker may enter the path on which the excavator 100 travels or a range where the upper turning body 3 passes due to turning. Therefore, by prompting an operator to confirm the surrounding status of the excavator 100 or by limiting the operation of the excavator 100 in response to a change in the status of the construction site caused by an internal factor such as an abnormality of a worker, the site safety support system SYS2 can further improve the safety of the excavator 100.

The excavator 100 acquires the attention evocation instruction as information about a change in the surrounding status of the excavator 100 from the outside (hereinafter, the "attention evocation information", as a matter of convenience) from the support apparatus 200, but may acquire the attention evocation information by a method other than the attention evocation instruction. That is, the worker W may communicate a change in the surrounding status of the excavator 100 to the excavator 100, by another method. For example, the worker W may perform a predetermined gesture or pose toward the excavator 100 to inform of a change in the surrounding status of the excavator 100, such as the approach of the truck TK. In this case, the controller 30 of the excavator 100 can recognize a gesture or a pose by the worker W by performing an image recognition process on a captured image captured by the imaging apparatus 40. That is, the excavator 100 may acquire a captured image captured by the imaging apparatus 40 including a predetermined person such as a worker performing a predetermined pose or gesture in the surroundings of the excavator 100, as attention evocation information. Accordingly, the excavator 100 can recognize the worker W performing a predetermined gesture or pose from a captured image captured by the imaging apparatus 40 and evoke the attention of an operator towards the surrounding status of the excavator 100 or limit the operation of the excavator 100. Similarly, the excavator 100 may acquire information about the cancel of the attention evocation alarm or the operation limitation of the excavator 100 (hereinafter, "cancel information", as a matter of convenience) from the outside by a method other than the cancel instruction. Specifically, the excavator 100 may acquire the cancel information through a captured image captured by the imaging apparatus 40 including a predetermined person such as a worker performing a predetermined gesture or pose that is different from that performed in the case of the attention evocation information, in the surroundings of the excavator 100.

Further, the worker W may transmit an attention evocation instruction to the excavator 100 by using the support apparatus 200 installed near the work area of the construction site without carrying the support apparatus 200 individually. That is, one or more support apparatuses 200 may be provided in a work area where the excavator 100 performs work and may be shared by workers and the like working in the work area.

<Detailed Operation of Site Safety Support System>

Next, the operation of the site safety support system SYS2 will be described in detail with reference to FIG. 24.

Figure 24:
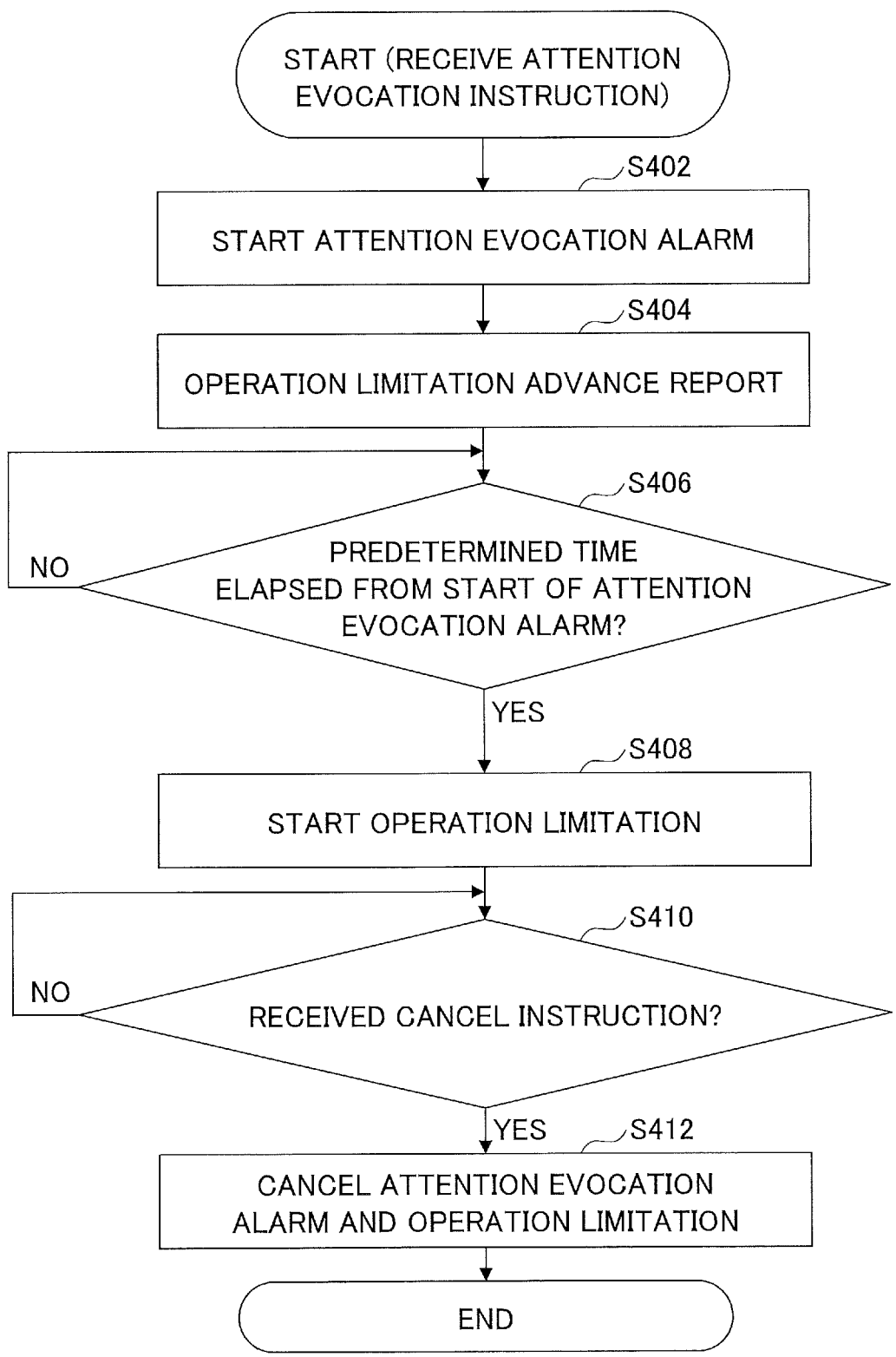
FIG. 24 is a flowchart schematically illustrating an example of the operation of a site safety support system.

FIG. 24 is a flowchart schematically illustrating an example of a process relating to evoke the attention of an operator towards the surrounding status by the controller 30 of the excavator 100. The process according to the flowchart is executed when an attention evocation instruction is received from the support apparatus 200 by the communication processing unit 3023.

In step S402, the alarm output unit 3024 outputs an attention evocation alarm to an operator in the cabin 10 through the display apparatus 50, the voice sound output apparatus 52, and the like in response to an attention evocation instruction received from the support apparatus 200 by the communication processing unit 3023.

In step S404, the operation limiting unit 3025 outputs an operation limitation advance report through the display apparatus 50 or the voice sound output apparatus 52 after the attention evocation alarm by the alarm output unit 3024 starts. This allows the operator to recognize that the operation limitation of the excavator 100 will start, and the operator can stop the operation of the excavator 100 in advance.

In step S406, the operation limiting unit 3025 determines whether a predetermined time has elapsed from when the alarm output unit 3024 has started outputting the attention evocation alarm. When a predetermined time has elapsed from the start of the output of the attention evocation alarm, the operation limiting unit 3025 proceeds to step S408. When a predetermined time has not elapsed, the operation limiting unit 3025 waits until a predetermined time elapses (repeats the process of this step).

In step S408, the operation limiting unit 3025 controls the gate lock valve 54 and starts the operation limitation of the excavator 100.

In step S410, the communication processing unit 3023 determines whether a cancel instruction is received from the support apparatus 200. When the cancel instruction is received from the support apparatus 200, the communication processing unit 3023 proceeds to step S412. When the cancel instruction is not received, the communication processing unit 3023 waits until the cancel instruction is received (repeats the process of this step).

The controller 30 may proceed to step S412 considering that the safety in the surroundings of the excavator 100 is secured when a cancel instruction is not received even after a time period (for example, several tens of minutes), which is a sufficiently longer time than the time required for securing the safety in the surroundings of the excavator 100, has elapsed from the receipt of the attention evocation instruction. This is because it is possible that the excavator 100 may not be able to receive a cancel instruction because a communication failure and the like occurs or the user of the support apparatus 200 forgets to transmit a cancel instruction.

In step S412, the alarm output unit 3024 and the operation limiting unit 3025 cancel the attention evocation alarm and the operation limitation of the excavator 100, respectively, and terminate the current process.

<Modifications/Variations>

Although the third embodiment has been described in detail above, various modifications and variations can be made within the scope of the gist of the contents of the present embodiment.

For example, in the present embodiment, the excavator 100 (the communication processing unit 3023) establishes a P2P connection with the support apparatus 200, but may establish a P2P connection with another excavator 100 in the same site. In this case, the one excavator 100 may transmit various kinds of instruction information such as an attention evocation instruction or a cancel instruction to the other excavator 100 in accordance with an operation by an operator and the like, as in the case of the support apparatus 200. Thus, for example, if an operator of one excavator 100 finds a truck and the like approaching the other excavator 100, the excavator 100 may evoke the attention of the operator of the other excavator 100 towards the surrounding status or cause a temporary operation limitation of the other excavator 100.

Further, in the present embodiment, the excavator 100 acquires the attention evocation information or the cancel information from an object (another excavator 100, the support apparatus 200, a worker, etc.) within the same construction site, but the present invention is not limited to such an embodiment. Specifically, the excavator 100 may acquire attention evocation information (e.g., an attention evocation instruction) from an object that enters the site from the outside, that is, an object (e.g., a truck) that is an external factor of a change in the status of the construction site, and may evoke the attention of an operator towards the surrounding status of the excavator 100 in accordance with the attention evocation information. In this case, for example, a truck (an example of an external apparatus) is mounted with a communication device that performs the same predetermined method of short range communication as the communication device 60 of the excavator 100. Accordingly, the driver of a truck that has entered the construction site from the outside can perform a predetermined operation when approaching the excavator 100 during work, to transmit an attention evocation instruction from the truck to the excavator 100. Accordingly, the truck driver can cause the excavator 100 to evoke the attention of the operator towards the surrounding status of the excavator 100 and make the operator of the excavator 100 notice of the truck driven by the truck driver. The truck driver then causes the truck to transmit a cancel instruction to the excavator 100 when it is determined that the operator of the excavator 100 has noticed the truck. This allows the truck driver to cause the excavator 100 to cancel the attention evocation alarm or the operation limitation of the excavator 100. Further, the excavator 100 may acquire an attention evocation instruction from an object that can monitor the status of the construction site from outside the construction site, for example, a management apparatus such as an external server (an example of an external apparatus) that is installed outside the construction site and that manages the working status and a work machine such as the excavator 100 in the construction site, and evoke the attention of the operator towards the surrounding status of the excavator 100 in accordance with the attention evocation information. In this case, the excavator 100 is mounted with a communication device (e.g., a mobile communication module) for communicating with the management apparatus through a communication network such as a mobile communication network or the Internet network having a base station as a terminal. Further, the management apparatus can recognize the change of the status of the construction site by acquiring, through the communication network, for example, a captured image captured by a security camera installed at various locations in the construction site, the imaging apparatus 40 of the excavator 100 which works at various locations in the construction site, or a camera mounted on a drone which flies over the construction site. Accordingly, the administrator or the operator of the management apparatus may cause the management apparatus to transmit an attention evocation instruction to the excavator 100 through the communication network by performing a predetermined operation in a status where a change has occurred due to an internal or external factor in the construction site. Then, the administrator or the operator of the management apparatus, etc. causes the management apparatus to transmit a cancel instruction to the excavator 100 when it is determined that the change in the status of the construction site has been stabilized. Accordingly, the administrator or the operator of the management apparatus can cause the excavator 100 to return to performing normal operations.

Also, in the present embodiment, the excavator 100 (the controller 30) includes both the alarm output unit 3024 and the operation limiting unit 3025, but only one of these may be included. That is, the controller 30 of the excavator 100 may only perform only one of an alarm output and an operation limitation of the excavator 100 when a monitor target is detected in a monitor area in the horizontal direction as viewed from the excavator 100.

Further, in the present embodiment, the excavator 100 is configured to hydraulically drive all of various operation elements such as the lower traveling body 1, the upper turning body 3, the boom 4, the arm 5, and the bucket 6, but some of the operation elements of the excavator 100 may be electrically driven. That is, the configuration and the like disclosed in the present embodiment may be applied to a site safety support system including a hybrid excavator, an electric excavator as described above, and the like.

Further, the following is disclosed with respect to the present embodiment.

(1)

An excavator including:

a first information acquiring unit configured to acquire information relating to a change in a surrounding status of the excavator from outside; and an attention evoking unit configured to evoke attention of an operator towards a surrounding area of the excavator when the information is acquired by the first information acquiring unit.

(2)

The excavator described in (1), further including:

an operation limiting unit configured to limit an operation of the excavator when the information is acquired by the first information acquiring unit.

(3)

The excavator described in (2), wherein the operation limiting unit starts the operation limitation of the excavator after the attention evocation is performed by the attention evoking unit.

(4)

The excavator described in (3), further including:

a reporting unit configured to report, to the operator, that the operation limitation of the excavator will be performed, before the operation limitation of the excavator by the operation limiting unit is started, when the information is acquired by the first information acquiring unit.

(5)

The excavator described in (2) or (3), further including:

a second information acquiring unit configured to acquire information relating to cancellation of the operation limitation of the excavator by the operation limiting unit from the outside of the excavator, wherein the operation limiting unit cancels the operation limitation of the excavator when the information is acquired by the second information acquiring unit after the operation limitation of the excavator starts.

(6)
The excavator described in any one of (1) to (5), wherein the first information acquiring unit acquires instruction information requesting the attention evocation received from a predetermined external apparatus.

(7)
The excavator described in any one of (1) to (5), further including:
an imaging apparatus configured to capture an image of the surrounding area of the excavator, wherein
the first information acquiring unit acquires a captured image captured by the imaging apparatus including a predetermined person performing a predetermined pose or gesture in the surrounding area of the excavator.

(8)
The excavator described in any one of (1) to (7), wherein the attention evoking unit outputs an alarm into a cabin of the excavator by a visual method, an auditory method, or a tactile method.

(9)
A support apparatus capable of communicating with an excavator, wherein
the support apparatus transmits an instruction to the excavator to evoke the attention of an operator toward a surrounding area of the excavator in response to an operation by a user.

(10)
The support apparatus described in (9),
wherein the support apparatus transmits, to the excavator, the instruction to cause the excavator to perform the attention evocation and to limit an operation of the excavator, in response to an operation by a user.

(11)
A support method executed by a support apparatus that can communicate with the excavator, including
transmitting an instruction to the excavator to cause the excavator to evoke the attention of an operator towards the surrounding area of the excavator in response to an operation by a user.

(12)
A support program that causes a support apparatus capable of communicating with an excavator to execute the support method described in (11).

According to an aspect of the present invention, it is possible to provide a work machine and the like capable of enabling a user, such as a worker, a supervisor, and the like to confirm the status of the worksite from outside the worksite.

It should be understood that the invention is not limited to the above-described embodiment, but may be modified into various forms on the basis of the spirit of the invention. Additionally, the modifications are included in the scope of the invention.

For example, the configurations and techniques disclosed in the above-described embodiments (first to third embodiments) may be suitably combined.

What is claimed is:
1. A work machine comprising:
a traveling body;
an actuator configured to drive the traveling body to travel;
a sensor configured to acquire information relating to a status of a surrounding area of the work machine; and
a hardware processor configured to
transmit, to an external apparatus outside the work machine, the information acquired by the sensor or information generated based on the information acquired by the sensor, the generated information relating to the status of the surrounding area of the work machine; and
activate a monitoring unit in a sleep state in response to an instruction received from the external apparatus, while an engine of the work machine is stopped, the monitoring unit including at least the sensor and a first part of the hardware processor which first part is configured to transmit the information acquired by the sensor or the information generated based on the information acquired by the sensor.

2. The work machine according to claim 1, wherein
the sensor includes a camera configured to capture an image of the surrounding area of the work machine, and
the hardware processor is configured to transmit, to the external apparatus, the image of the surrounding area of the work machine captured by the camera.

3. The work machine according to claim 1, wherein when the monitoring unit is activated, activation of at least one device among a plurality of devices that are activated in accordance with activation of the work machine, is limited.

4. The work machine according to claim 1, wherein
the hardware processor is further configured to
detect a predetermined monitor target within a predetermined range in the surrounding area of the work machine, based on the information acquired by the sensor,
activate a second part of the hardware processor which second part is configured to detect the predetermined monitor target, in addition to the sensor and the first part of the hardware processor as the monitoring unit, while the engine of the work machine is stopped, and
transmit, to the external apparatus, or records, in a predetermined storage, information relating to the detected predetermined monitor target.

5. The work machine according to claim 1, further comprising:
a power source configured to supply power to a device of the work machine including the monitoring unit, wherein
the monitoring unit is configured to be operable when a suppliable power amount of the power source is greater than a predetermined threshold value, while the engine of the work machine is stopped.

6. The work machine according to claim 5, wherein the hardware processor is configured to activate the monitoring unit upon detecting that the suppliable power amount of the power source exceeds a predetermined first threshold.

7. The work machine according to claim 5, wherein
the hardware processor is further configured to terminate the monitoring unit upon detecting that the suppliable power amount of the power source has decreased to less than or equal to a predetermined second threshold, when the monitoring unit has been activated while the engine of the work machine is stopped.

8. The work machine according to claim 5, wherein
the hardware processor is further configured to transmit, to the external apparatus, a report indicating that the monitoring unit is not in an operable status, upon detecting that the suppliable power amount of the power source is less than or equal to the predetermined threshold, while the engine of the work machine is stopped.

9. The work machine according to claim 5, wherein the monitoring unit includes an operation mode of operating by limiting at least one function among functions of the monitoring unit, such that a consumption amount of the power supplied from the power source is reduced, while the engine of the work machine is stopped.

10. The work machine according to claim 5, wherein
the hardware processor is further configured to report, to the external apparatus, information relating to the suppliable power amount of the power source or information relating to a time during which the monitoring unit is operable by the power supplied from the power source, while the engine of the work machine is stopped.

11. The work machine according to claim 5, wherein the power source includes at least one of a primary battery, a secondary battery, a capacitor, and a generator.

12. The work machine according to claim 1, wherein
the hardware processor is further configured to report, to an operator, that the information acquired by the sensor or the generated information is to be transmitted to the external apparatus by the transmitting unit, while the engine of the work machine is operating.

13. The work machine according to claim 1, further comprising:
a permission operation unit configured to accept a predetermined operation for giving permission to remotely operate the work machine.

14. The work machine according to claim 1, wherein the hardware processor is configured to activate the monitoring unit in response to the instruction received from the external apparatus, the instruction being transmitted from the external apparatus based on a predetermined operation from a user.

15. The work machine according to claim 1, further comprising:
a power source,
wherein the hardware processor is constantly connected electrically to the power source,
the hardware processor is further configured to
acquire the instruction from the external apparatus, a second part of the hardware processor which second part is configured to acquire the instruction from the external apparatus being activated while the engine of the work machine is stopped,
determine whether the engine of the work machine is in operation in response to acquiring the instruction, and
activate the monitoring unit in response to determining that the engine of the work machine is not in operation.

16. The work machine according to claim 15, wherein
the hardware processor is configured to transmit the information acquired by the sensor or the generated information to the external apparatus in response to determining that the engine of the work machine is in operation.

17. The work machine according to claim 15, wherein
the hardware processor is further configured to
determine whether a remaining capacity of the power source exceeds a predetermined threshold value in response to the instruction acquiring unit determining that the engine of the work machine is not in operation, and
activate the monitoring unit in response to determining that the remaining capacity of the power source exceeds the predetermined threshold value.

18. A work machine surrounding monitor system comprising:
a work machine; and
an information processing apparatus outside the work machine, the information processing apparatus being configured to communicate with the work machine,
wherein the work machine includes
a traveling body;
an actuator configured to drive the traveling body to travel;
a sensor configured to acquire information relating to a status of a surrounding area of the work machine;
a power source; and
a first hardware processor constantly connected electrically to the power source and configured to
transmit, to the information processing apparatus, the information acquired by the sensor or information generated based on the information acquired by the sensor, the generated information relating to the status of the surrounding area of the work machine; and
activate a monitoring unit in response to an instruction received from the information processing apparatus, while the work machine is stopped, the monitoring unit including at least the sensor and a first part of the first hardware processor which first part is configured to transmit the information acquired by the sensor or the information generated based on the information acquired by the sensor, and
wherein the information processing apparatus includes
a second hardware processor configured to
transmit the instruction to the work machine in response to a predetermined operation from a user;
acquire information transmitted from the work machine in response to the instruction, the transmitted information being the information acquired by the sensor or the generated information; and
report, to the user, the acquired information transmitted from the work machine.

19. The work machine surrounding monitor system according to claim 18, wherein
the second hardware processor is further configured to acquire, from the work machine in response to the instruction, information relating to whether the monitoring unit is activatable while the work machine is stopped, or whether, after the monitoring unit has been activated, the activated monitoring unit is able to continue operation.

20. The work machine surrounding monitor system according to claim 18, wherein
the power source is configured to supply power to the monitoring unit in the work machine, and
the second hardware processor is further configured to acquire information relating to a state of the power source from the work machine.

21. A work machine according to claim 1, comprising:
a traveling body;
an actuator configured to drive the traveling body to travel;
a sensor configured to acquire information relating to a status of a surrounding area of the work machine; and
a hardware processor configured to
transmit, to an external apparatus outside the work machine, the information acquired by the sensor or information generated based on the information acquired by the sensor, the generated information relating to the status of the surrounding area of the work machine:

activate a monitoring unit in response to an instruction received from the external apparatus, while an engine of the work machine is stopped, the monitoring unit including at least the sensor and a first part of the hardware processor which first part is configured to transmit the information acquired by the sensor or the information generated based on the information acquired by the sensor;

acquire the instruction from the external apparatus, a second part of the hardware processor which second part is configured to acquire the instruction from the external apparatus being activated while the engine of the work machine is stopped, wherein the hardware processor is configured to activate a third part of the hardware processor which third part is configured to activate the monitoring unit and is in a sleep state to cause the third part to activate the monitoring unit, in response to receiving the instruction from the external apparatus, while the work machine is stopped.

* * * * *